United States Patent
Irikura et al.

(10) Patent No.: US 6,312,354 B1
(45) Date of Patent: Nov. 6, 2001

(54) INTEGRAL HYDROSTATIC TRANSAXLE APPARATUS FOR DRIVING AND STEERING

(75) Inventors: Koji Irikura; Norihiro Ishii; Ryota Ohashi; Kenichi Takada; Hirohiko Kawada, all of Amagasaki (JP); Robert Abend, Morristown, TN (US); Keith J. Andrews, Morristown, TN (US); Toshiyuki Hasegawa, Morristown, TN (US); Hiroaki Shimizu, Morristown, TN (US)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/489,678

(22) Filed: Jan. 24, 2000

(30) Foreign Application Priority Data

| Jan. 22, 1999 | (JP) | 11-014917 |
| Jan. 22, 1999 | (JP) | 11-014918 |
| Mar. 31, 1999 | (JP) | 11-091405 |
| Jun. 21, 1999 | (JP) | 11-174647 |

(51) Int. Cl.⁷ .............................................. B62D 11/06
(52) U.S. Cl. ................................................ 475/24; 475/27
(58) Field of Search ................................... 475/23, 24, 27; 74/606 R

(56) References Cited

U.S. PATENT DOCUMENTS

| Re. 34,057 | 9/1992 | Middlesworth ................. 180/6.2 |
| 2,191,961 | 2/1940 | Howell . |

(List continued on next page.)

FOREIGN PATENT DOCUMENTS

| 249274 | 6/1947 | (CH) . |
| 4224887 | 9/1993 | (DE) . |

(List continued on next page.)

OTHER PUBLICATIONS

Popular Science, Tanks and dozers turn on a dime with new all gear steering, pp. 60–62, Jul. 1985.

The Engineer, Tank Steering Mechanisms, pp. 337–340, Mar. 3, 1967.

(List continued on next page.)

Primary Examiner—Dirk Wright
(74) Attorney, Agent, or Firm—Sterne, Kessler, Goldstein & Fox P.L.L.C.

(57) ABSTRACT

A transaxle apparatus is constructed so that left and right axles, two hydrostatic transmissions (HSTs), one for driving a vehicle and the other for steering it, and a differential unit for differentially connecting said axles with each other are together contained in a housing. The driving HST is disposed so that its hydraulic pump and motor are aligned along either a left or right side of the housing. The steering HST is disposed so that its hydraulic pump and motor are aligned along either a front or rear side of the housing. The differential unit is laterally opposite to the driving HST. Either the left or right axle crosses the driving HST between its hydraulic pump and motor. The two HSTs are provided with one or two flat center sections disposed in the housing. The cylinder blocks of the hydraulic pumps and motors of the two HSTs are mounted on either a top or bottom surface of the center section or sections. Power transmission mechanisms for transmitting output power from the hydraulic motors of the two HSTs into the differential unit are disposed on an opposite side of the center section(s) as the cylinder blocks. A charge pump may be attached onto the center section, and a conduit for sending fluid discharged from the charged pump into one or both HSTs may be partly extended outside the housing so as to be cooled by the atmosphere.

45 Claims, 40 Drawing Sheets

U.S. PATENT DOCUMENTS

| | | |
|---|---|---|
| 2,255,348 | 9/1941 | Brown . |
| 2,311,922 | 2/1943 | Allin . |
| 2,332,838 | 10/1943 | Borgward . |
| 2,336,911 | 12/1943 | Zimmermann . |
| 2,336,912 | 12/1943 | Zimmermann . |
| 2,391,735 | 12/1945 | Orshansky, Jr. . |
| 2,530,720 | 11/1950 | Paulson . |
| 2,745,506 | 5/1956 | McCallum . |
| 2,763,164 | 9/1956 | Neklutin . |
| 2,936,033 | 5/1960 | Gates ................................... 180/6.2 |
| 3,059,416 | 10/1962 | Campbell . |
| 3,371,734 | 3/1968 | Zaunberger et al. . |
| 3,376,760 | 4/1968 | Gordainer . |
| 3,395,671 | 8/1968 | Zimmermann, Jr. . |
| 3,450,218 | 6/1969 | Looker . |
| 3,492,891 | 2/1970 | Livezey ............................. 74/720.5 |
| 3,530,741 | 9/1970 | Charest . |
| 3,612,199 | 10/1971 | Vissers . |
| 3,717,212 | 2/1973 | Potter . |
| 3,901,339 | 8/1975 | Williamson . |
| 3,903,977 | 9/1975 | Gillette et al. . |
| 3,907,051 | 9/1975 | Weant et al. ........................ 180/6.2 |
| 3,978,937 | 9/1976 | Chichester et al. . |
| 4,133,404 | 1/1979 | Griffin . |
| 4,174,762 | 11/1979 | Hopkins et al. ..................... 180/6.44 |
| 4,245,524 | 1/1981 | Dammon . |
| 4,281,737 | 8/1981 | Molzahn . |
| 4,320,810 | 3/1982 | Hillmann . |
| 4,399,882 | 8/1983 | O'Neill et al. ....................... 180/6.48 |
| 4,471,669 | 9/1984 | Seaberg ................................ 74/687 |
| 4,577,711 | 3/1986 | Butler . |
| 4,718,508 | 1/1988 | Tervola .............................. 180/6.44 |
| 4,729,257 | 3/1988 | Nelson ................................. 74/675 |
| 4,732,053 | 3/1988 | Gleasman et al. ................. 74/665 L |
| 4,738,328 | 4/1988 | Hayden . |
| 4,776,235 | 10/1988 | Gleasman et al. ................. 74/720.5 |
| 4,776,236 | 10/1988 | Gleasman et al. ................. 74/720.5 |
| 4,782,650 | 11/1988 | Walker ................................. 56/16.6 |
| 4,790,399 | 12/1988 | Middlesworth ...................... 180/6.2 |
| 4,809,796 | 3/1989 | Yamaoka et al. . |
| 4,813,506 | 3/1989 | Smith . |
| 4,875,536 | 10/1989 | Saur et al. .......................... 180/6.32 |
| 4,882,947 | 11/1989 | Barnard . |
| 4,895,052 | 1/1990 | Gleasman et al. ................. 74/720.5 |
| 4,917,200 | 4/1990 | Lucius ................................. 180/6.2 |
| 4,949,823 | 8/1990 | Coutant et al. . |
| 5,004,060 | 4/1991 | Barbagli et al. . |
| 5,015,221 | 5/1991 | Smith .................................... 475/19 |
| 5,052,511 | 10/1991 | Hunt .................................... 180/305 |
| 5,094,326 | 3/1992 | Schemelin et al. . |
| 5,131,483 | 7/1992 | Parkes ................................ 180/6.48 |
| 5,279,376 | 1/1994 | Yang et al. ......................... 180/6.48 |
| 5,285,866 | 2/1994 | Ackroyd . |
| 5,307,612 | 5/1994 | Tomiyama et al. . |
| 5,335,739 | 8/1994 | Pieterse et al. . |
| 5,339,631 | 8/1994 | Ohashi . |
| 5,383,528 | 1/1995 | Nicol . |
| 5,505,279 | 4/1996 | Louis et al. ......................... 180/305 |
| 5,507,138 | 4/1996 | Wright et al. . |
| 5,517,809 | 5/1996 | Rich . |
| 5,535,840 | 7/1996 | Ishino et al. . |
| 5,553,453 | 9/1996 | Coutant et al. ...................... 60/327 |
| 5,560,447 | 10/1996 | Ishii et al. . |
| 5,564,518 | 10/1996 | Ishii et al. . |
| 5,644,903 | 7/1997 | Davis, Jr. ............................ 56/10.8 |
| 5,649,606 | 7/1997 | Bebernes et al. . |
| 5,667,032 | 9/1997 | Kamlukin . |
| 5,706,907 | 1/1998 | Unruh . |
| 5,722,501 | 3/1998 | Finch et al. . |
| 5,842,378 | 12/1998 | Zellmer . |
| 5,850,886 | 12/1998 | Kuono et al. . |
| 5,894,907 | 4/1999 | Peter . |
| 5,913,802 | 6/1999 | Mullet et al. . |
| 5,946,894 | 9/1999 | Eavenson et al. . |
| 5,947,219 | 9/1999 | Peter et al. . |
| 5,975,224 | 11/1999 | Satzler . |
| 5,997,425 | 12/1999 | Coutant et al. . |
| 6,026,634 | 2/2000 | Peter et al. . |
| 6,035,959 | 3/2000 | Schaeder . |
| 6,038,840 | 3/2000 | Ishimori et al. . |
| 6,126,564 | 10/2000 | Irikura et al. . |
| 6,129,164 | 10/2000 | Teal et al. . |
| 6,141,947 | 11/2000 | Borling . |

FOREIGN PATENT DOCUMENTS

| | | |
|---|---|---|
| 0 806 337 A1 | 12/1997 | (EP) . |
| 1147142 | 10/1960 | (FR) . |
| 2 303 829 A | 3/1997 | (GB) . |
| 57-140277 | 8/1982 | (JP) . |
| 63-227476 | 9/1988 | (JP) . |
| 6-264976 | 9/1994 | (JP) . |
| 08142906-A | * 6/1996 | (JP) . |
| 09202255-A | * 8/1997 | (JP) . |
| 09202258-A | * 8/1997 | (JP) . |
| 09202259-A | * 8/1997 | (JP) . |
| 09216522-A | * 8/1997 | (JP) . |
| 92/12889 | 8/1992 | (WO) . |
| WO 98/32645 | 7/1998 | (WO) . |
| WO 99/40499 | 8/1999 | (WO) . |
| WO 00/01569 | 1/2000 | (WO) . |

OTHER PUBLICATIONS

Excel Industries Inc., U–T–R The Ultimate Turning Radius, pp. 1–6, 1992.

Electric Tractor Corporation, An Idea Whose Time Has Come, 5 pages, date of publication unknown, published in Ontario, Canada.

Electric Tractor Corporation, Model #9620, The Ultimate Lawn and Garden Tractor, 6 pages, date of publication, Jul. 27, 1998.

Farm Show Magazine, Battery Powered Riding Mower, 1 page, date of publication, Mar.–Apr. 1996.

Deere & Company, 240, 245, 260, 265, 285 and 320 Lawn and Garden Tractors Technical Manual, front cover and pp. 10–2 to 10–4 and 10–6, date of publication, 1996.

Excel Industries, Inc., Hustler 4000 Series, 1995, pp. 1–8.

Woods Equipment Company, Woods Mow'n Machine, 1997, pp. 1–12.

Ex–Mark, ExMark Nobody Does It Better Professional Turf Care Equipment, 1997, pp. 1–20.

Dixon Industries, Inc. Dixon ZTR Riding Mowers, 1997, pp. 1–4.

Shivers Mfg., Zero Turn Radius Mower The Commercial Clipper, 1997, pp. 1–4.

Ferris Industries, Inc., The ProCut Z Zero–Turn Rider, 1997, pp. 1–2.

Zipper–TS Mower, The Zipper–TS Mowers, 1997, pp. 1–2.

Westwood, The Westwood Clipper Owner's Instruction Manual, date of publication unknown, pp. 1–19.

Brochure regarding differential steering pp. 4–15 no date.

Article regarding differential steering Jul. 1985 p. 61.

* cited by examiner

INTEGRAL HYDROSTATIC TRANSAXLE APPARATUS FOR DRIVING AND STEERING

BACKGROUND OF THE INVENTION

1. Field of the Invention

The present invention relates to an integral transaxle apparatus employing a hydrostatic and mechanical axle driving and steering system, including two hydrostatic transmissions (hereinafter, each hydrostatic transmission is called an "HST") of the same type; one for driving left and right axles, and the other for steering the axles.

2. Related Art

A well-known conventional system for driving and steering left and right axles for wheels or sprockets of tracks, which employs a pair of HSTs provided for the respective axles, is disclosed in U.S. Pat. No. 4,782,650 or Japanese Laid Open Gazette No. Hei 2-261,952, for example. Output rotary speeds of the two HSTs are equalized for straight driving of a vehicle and made different from each other for steering of it.

The conventional system has the problem that the equalization of output rotary speeds between the two HSTs must be precise and if there is difference of capacity between the two, a vehicle is steered differently between leftward and rightward cornering.

The present invention includes an axle driving and steering system including two HSTs and a differential unit. In this regard, one of the HSTs (a driving HST) interlocks with a speed changing operation tool such as a lever or a pedal and transmits power from an engine into the differential unit so as to drive left and right axles forwardly or reversely. The other HST (a steering HST) interlocks with a steering operation tool such as a steering wheel and transmits its output rotational force corresponding to the direction and degree of the steering operation tool into the differential unit so as to differentially drive the axles.

However, even in such a system, the problem still remains that the individual elements serving as the two HSTs and the differential unit, and power transmission mechanisms interlocking the hydraulic motors of the two HSTs with the differential unit are so complicated as to hinder the system from being compacted as an integral apparatus.

Furthermore, the two HSTs should be fed with efficiently cooled fluid while a charge pump therefor is preferably compact.

SUMMARY OF THE INVENTION

An object of the present invention is to provide a compact integral transaxle apparatus employing the above invented axle driving and steering system, so as to save its manufacturing cost and to ease its maintenance.

To attain the object, the integral transaxle apparatus is constructed so that a housing forming a fluid sump therein contains a pair of final output means, a differential unit for differentially connecting the final output means with each other, a first transmission system for steplessly driving the pair of final output means; including a first hydrostatic transmission (a first HST) and a first mechanical transmission, and a second transmission system for accelerating one of the pair of final output means and decelerating the other final output means, including a second hydrostatic transmission (a second HST) and a second mechanical transmission. Power of a prime mover is transmitted into the differential unit through the first HST and the mechanical transmission, and the second mechanical transmission driven by the second HST branches into two parallel drive trains drivingly connected to the pair of final output means, respectively, so that two oppositely directed equal rotational forces are applied onto the pair of final output means by the two drive trains.

The first transmission system is provided for driving a vehicle forward and backward, and the second transmission system is provided for steering the vehicle.

The first HST comprises a variable displacement first hydraulic pump and a first hydraulic motor fluidly connected with each other, and the second HST comprises a variable displacement second hydraulic pump and a second hydraulic motor fluidly connected with each other.

For horizontally compacting the integral transmission apparatus, the pair of final output means are a pair of axles disposed co axially with each other, the first hydraulic pump and the first hydraulic motor are aligned substantially in perpendicular to the axles, and the second hydraulic pump and the second hydraulic motor are aligned substantially in parallel to the axles.

Also, the first hydraulic pump and the first hydraulic motor are aligned along one side of the housing substantially perpendicular to the axles, and the second hydraulic pump and the second hydraulic motor are aligned along another side of the housing substantially parallel to the axles.

Also, the differential unit is opposed to the first HST in the direction of axes of the axles.

Also, the differential unit is disposed on abutting ends of the axles, and one of the axles crosses the first HST between the first hydraulic pump and the first hydraulic motor.

For vertically compacting the apparatus, in the case that the first HST comprises a first center section having fluid passages for fluidly connecting the first hydraulic pump and the first hydraulic motor with each other, cylinder blocks of the first hydraulic pump and the first hydraulic motor are disposed on the opposite side of the first center section as the first mechanical transmission. The motor shaft of the first hydraulic motor may penetrate the first center section.

Also, in the case that the second HST comprises a second center section having fluid passages for fluidly connecting the second hydraulic pump and said second hydraulic motor with each other, cylinder blocks of the second hydraulic pump and the second hydraulic motor are disposed on the opposite side of the second center section as the second mechanical transmission. The motor shaft of the second hydraulic motor may penetrate the center section.

Preferably, cylinder blocks of the first and second hydraulic pumps and the first and second hydraulic motors are disposed on opposite sides of the first and second center sections as the first and second mechanical transmissions.

The center sections of the first and second HSTs may be integral with each other, thereby reducing the number of parts.

The differential unit may comprise a pair of planetary gear units. Each planetary gear unit comprises a sun gear, a ring gear having an internal gear, a plurality of planet gears engaging with the sun gear and the internal gear of the ring gear, and a carrier rotatably supporting the plurality of planet gears and fixed onto each of the final output means. The sun gears of both planetary gear units are integral with each other.

The first mechanical transmission is a gear train engaging with the integral sun gears, and the second mechanical transmission branches into a pair of gear trains respectively engaging with the ring gears of the pair of planetary gear units.

A charge pump for fluidly feeding the two HSTs is disposed in the housing. A conduit for fluid discharged from the charge pump to be supplied into the first and second hydrostatic transmissions in the housing may be partly extended outwardly from the housing, so as to be cooled by the atmosphere. Also, fluid cooling means is preferably provided on the conduit outside the housing, thereby enhancing the effect of oil-cooling.

The charge pump disposed in the housing may be attached onto the center section fluidly connecting the first hydraulic pump and the first hydraulic motor of the first hydrostatic transmission with each other, so as to be driven by the first hydraulic pump of the first hydrostatic transmission and discharge fluid to the first hydrostatic transmission through a fluid passage formed within the center section.

For attaching the charge pump onto the center section, it is preferable that the charge pump integrally forms a seat to be attached onto the center section and a retainer for retaining a strainer. Also, for effective use of the inner space of the housing, cylinder blocks of the first hydraulic pump and the first hydraulic motor of the first hydrostatic transmission are mounted onto one side of the center section, and the charge pump is disposed on the opposite side of the center section as the cylinder blocks.

The conduit for fluid discharged from this charge pump to be supplied to the second hydrostatic transmission in the housing may be also partly extended outwardly from said housing. Additionally, fluid cooling means is preferably provided on the conduit outside the housing.

Alternatively, the conduit for fluid discharged from the charge pump to be supplied to the second hydrostatic transmission in the housing may be entirely contained in said housing, thereby visually simplifying the apparatus.

The center section may also fluidly connect the second hydraulic pump and the second hydraulic motor of the second hydrostatic transmission with each other. In this case, the charge pump attached onto the center section so as to be driven by the first hydraulic pump of the first hydrostatic transmission discharges fluid to the first and second hydrostatic transmissions through fluid passages formed within the center section. Also, in this case, four cylinder blocks of the first and second hydraulic pumps and the first and second hydraulic motors of the first and second hydrostatic transmissions may be mounted onto one side of the center section, so that the charge pump is disposed on the opposite side of the center section as the four cylinder blocks.

Alternatively, a first charge pump may be disposed in the housing for supplying the first hydrostatic transmission with fluid in the housing, and a second charge pump disposed in the housing for supplying the second hydrostatic transmission with fluid in the housing. In this case, the second hydraulic pump of the second hydrostatic transmission receives power of the prime mover thereby being driven independently of the first hydraulic motor of the first hydrostatic transmission.

In the case that at least one center section is disposed in the housing for fluidly connecting the first hydraulic pump with the first hydraulic motor and connecting the second hydraulic pump with the second hydraulic motor, the first charge pump is attached on to the center section so as to be driven by the first hydraulic pump and discharge fluid to the first hydrostatic transmission through fluid passages formed within the center section, and the second charge pump is attached onto the center section so as to be driven by the second hydraulic pump and discharge fluid to the second hydrostatic transmission through fluid passages formed within the center section.

Also, four cylinder blocks of the first and second hydraulic pumps and first and second hydraulic motors of the first and second hydrostatic transmissions may be mounted onto one side of the center section, so that the first and second charge pumps are disposed on the opposite side of the center section as the four cylinder blocks.

Alternatively, the charge pump for supplying the first and second hydrostatic transmissions with fluid may be disposed outside the housing. In this case, a conduit for fluid in the housing to be sucked into the charge pump, and that for fluid discharged from the charge pump to be supplied into the first and second hydrostatic transmissions in the housing are necessarily extended outside the housing so as to be subject to the atmosphere, thereby being cooled. Fluid cooling means is preferably provided on the conduit outside the housing.

These and other objects of the invention will become more apparent in the detailed description and examples which follow.

DETAILED DESCRIPTION OF THE PREFERRED EMBODIMENTS

Figure 1:
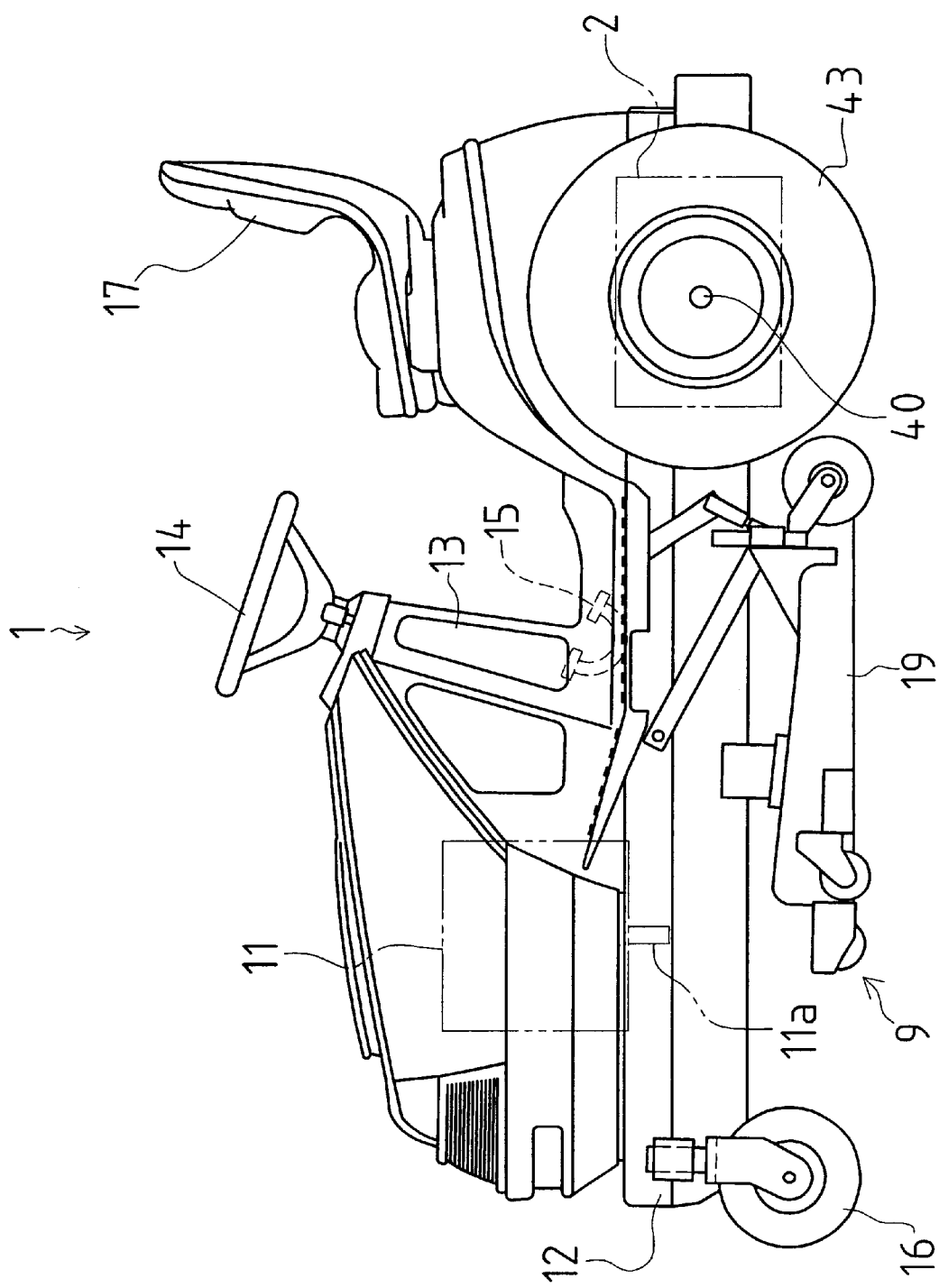
FIG. 1 is an entire side view of a mid-mount type lawn tractor 1 employing an integral transaxle apparatus 2 according to the present invention.

At first, description will be given on some embodiments about a lawn tractor serving as a vehicle employing the present invention. Referring to a lawn tractor 1 shown in FIG. 1, a front column 13 erected on the forward portion of a chassis 12 is provided thereabove with a steering wheel 14 serving as a steering operation tool, and beside the foot thereof with a speed change pedal 15 serving as a speed changing operation tool and a brake pedal (not shown).

Speed change pedal 15 shaped like a seesaw is pivoted at its intermediate portion and is provided at its front and rear ends with pedal surfaces. The front pedal surface is trod down so as to drive the vehicle forwardly, and the rear pedal surface is to drive it backwardly. The travelling speed of the vehicle corresponds to the degree of downward movement of each pedal surface. Pedal 15 is biased toward its neutral position by a spring (not shown).

A pair of casters 16 serving as front wheels are provided on respective left and right sides of the forward bottom portion of chassis 12. Alternatively, only one caster may be provided on the lateral middle thereof, or more than two casters may be provided.

An engine 11 is mounted on the forward portion of chassis 12 and is covered with a bonnet. A seat 17 is disposed above the rearward portion of chassis 12. A mower 9 is suspended downwardly from the longitudinally intermediate portion of chassis 12, thereby defining lawn tractor 1 as a mid-mount type. Mower 9 comprises a casing 19 containing at least one rotary blade which is driven by power from engine 11 transmitted through means such as a shaft, pulleys and a belt (not shown). A linkage is provided so as to enable mower 9 to move vertically.

An integral transaxle apparatus 2 of the invention is disposed at the rearward portion of chassis 12. Apparatus 2 receives rotational power of a vertically downward output shaft 11a of engine 11 through pulleys and a belt (not shown), and drives left and right axles 40 supported by the rearward portion of chassis 12. Left and right driving wheels 43 serving as rear wheels are fixedly mounted onto utmost ends of axles 40.

Figure 2:
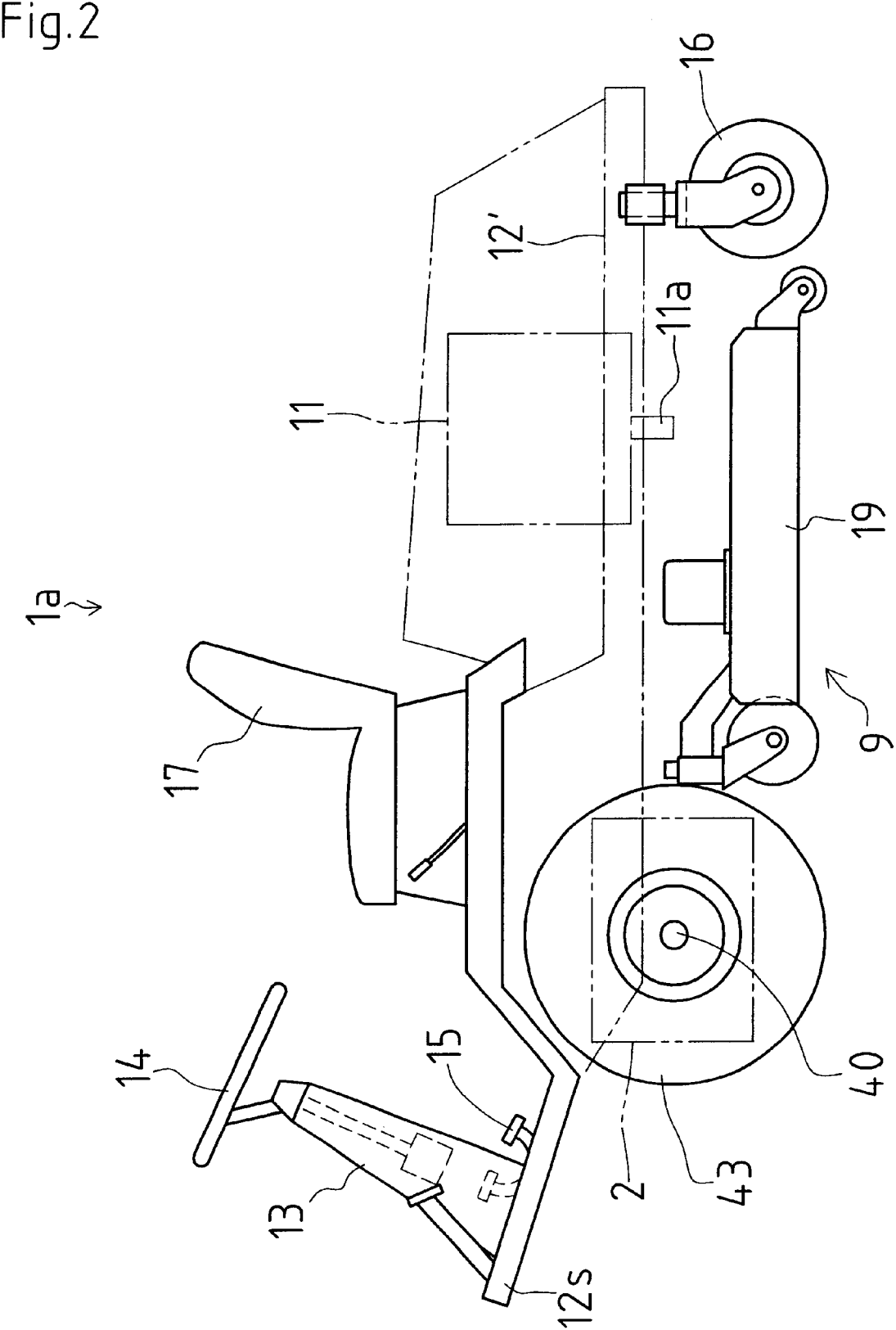
FIG. 2 is an entire side view of an alternative mid-mount type lawn tractor 1a employing the same.

Referring to FIG. 2, an alternative lawn tractor 1a has a chassis 12' forming a platform 12s at the top of forward portion thereof, on which front column 13 provided thereabove with steering wheel 14 is erected and speed change pedal 15 and the brake pedal are provided. Chassis 12' is provided on the bottom of rearward portion thereof with left and right casters 16 serving as rear wheels.

Engine 11 having vertically downward output shaft 11a is mounted on the rearward portion of chassis 12' and is covered with a bonnet. Mower 9 which is similar to that of FIG. 1 is suspended downwardly from the longitudinally intermediate portion of chassis 12' (behind driving wheels 43), thereby defining lawn tractor 1a as a mid-mount type. Transaxle apparatus 2 disposed at the forward portion of chassis 12' receives rotational power of output shaft 11a through pulleys and a belt (not shown) and drives left and right axles 40 supported by the forward portion of chassis 12'. Left and right driving wheels 43 serving as front wheels are fixedly mounted onto utmost ends of axles 40.

Figure 3:
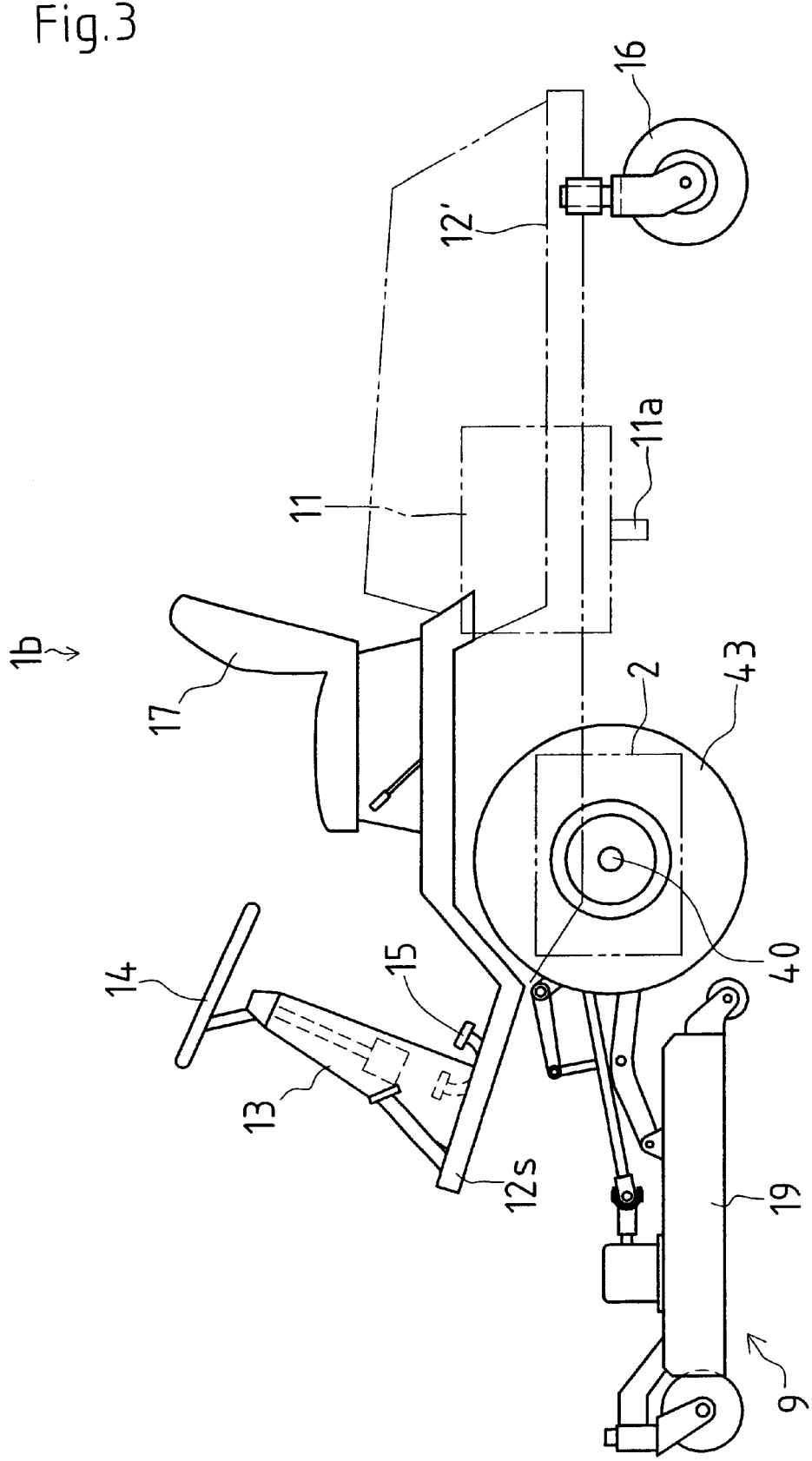
FIG. 3 is an entire side view of a front mount type lawn tractor 1b employing the same.

Referring to FIG. 3, a further alternative lawn tractor 1b is similar to lawn tractor 1a with the exception that mower 9 is disposed below the forward portion of chassis 12' before driving wheels 43, thereby defining lawn tractor 1b as a front mount type.

Next, description will be given on the internal system of internal transaxle apparatus 2 for driving and steering a vehicle such as lawn tractor 1, 1a or 1b in accordance with FIGS. 4–25, with some references to the external configuration thereof shown in FIGS. 27–32.

Figure 4:
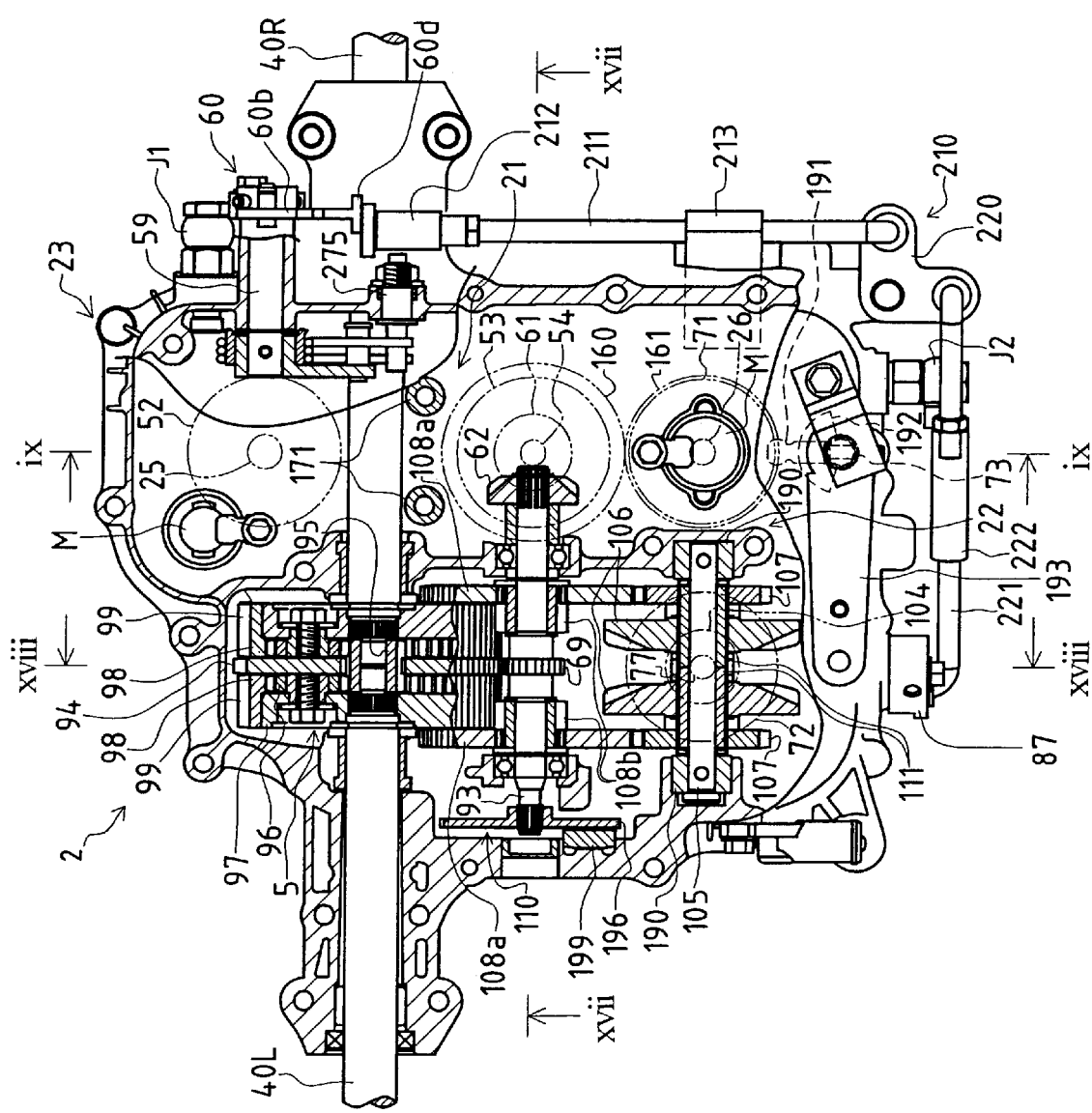
FIG. 4 is a plan view partly in section of the interior of an integral transaxle apparatus 2 of a dependent steering type.
Figure 5:
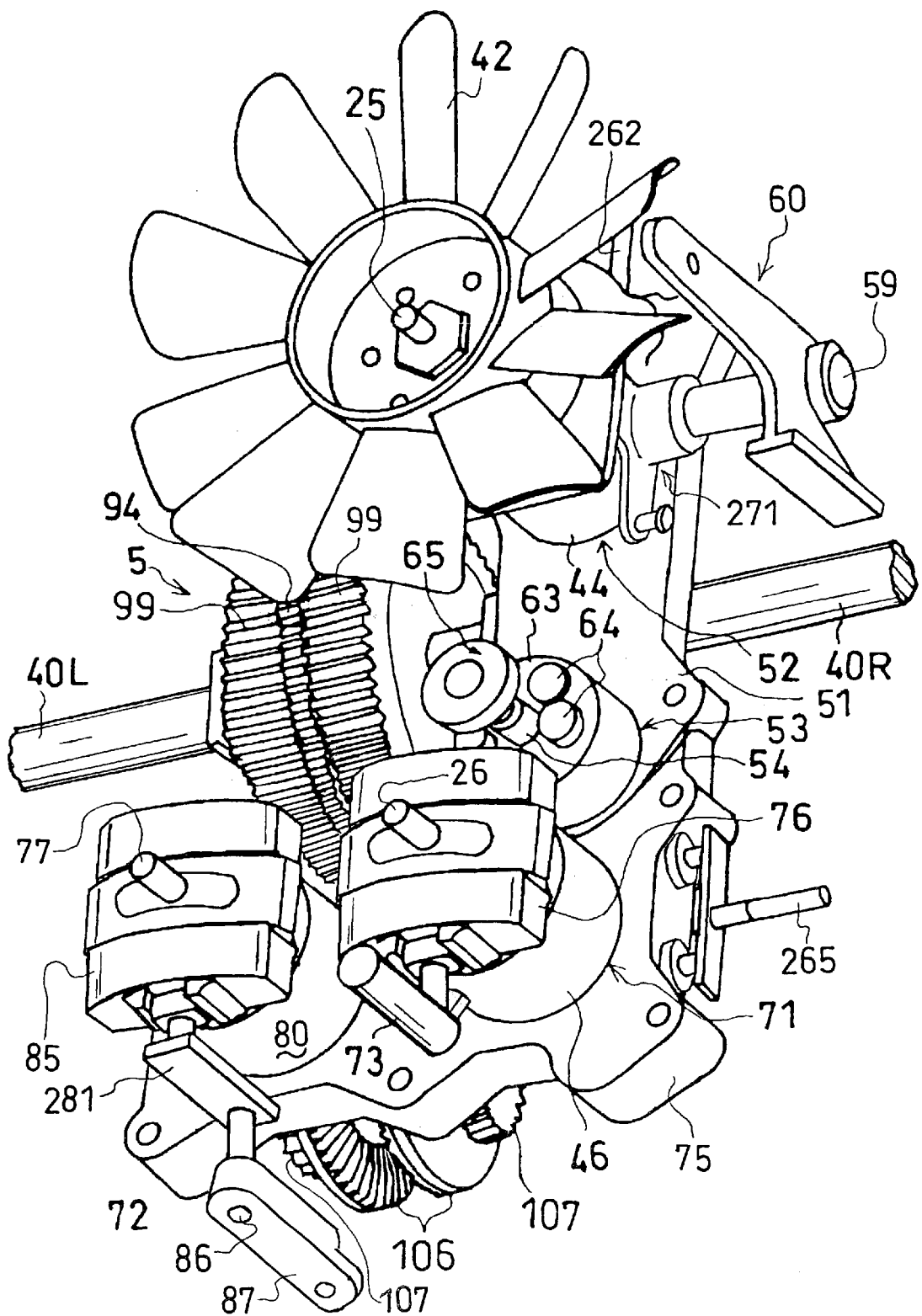
FIG. 5 is a perspective plan view of the same from which a housing 23 is removed.
Figure 6:
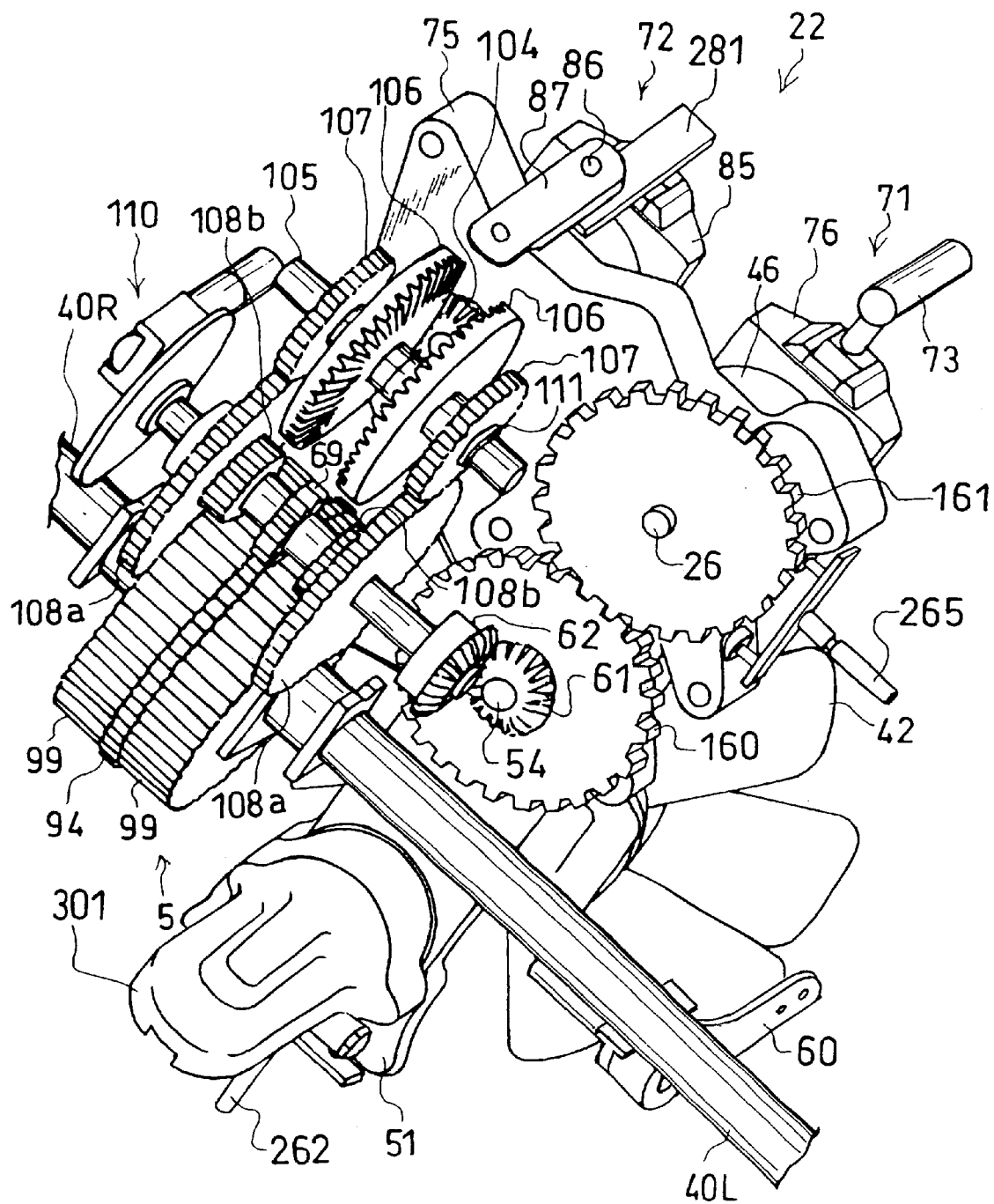
FIG. 6 is a perspective bottom view of the same.

As shown in FIG. 4, apparatus 2 comprises a driving HST 21 for driving a vehicle forwardly and rearwardly, a steering HST 22 for steering the vehicle, left and right axles 40L and 40R, a differential gear unit 5 including planetary gears for differentially connecting axles 40L and 40R, and some drive trains (gear trains) interlocking component elements 21, 22 and 5 with one another.

Figure 9:
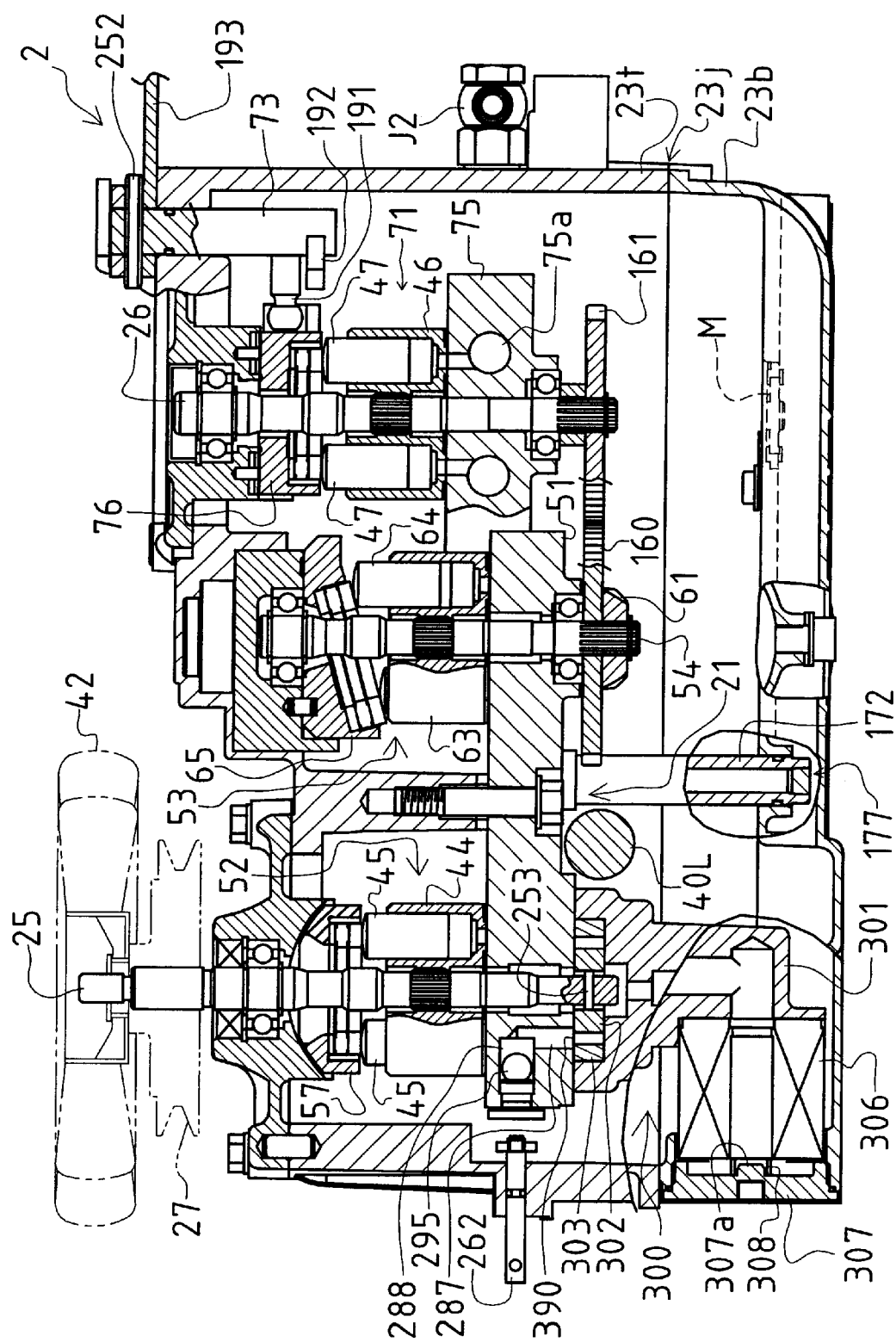
FIG. 9 is a cross-sectional view taken on line ix—ix of FIG. 4.
Figure 17:
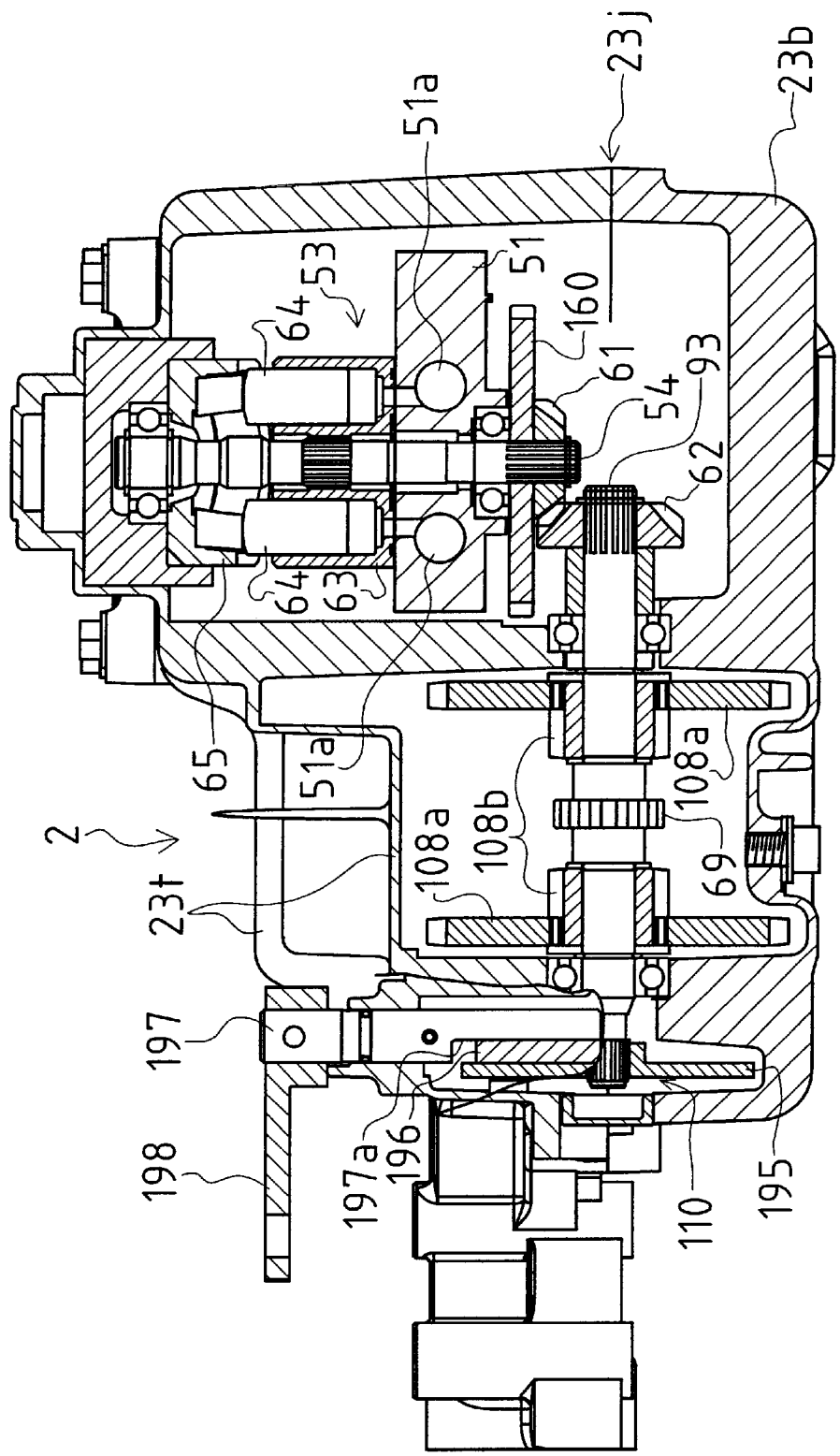
FIG. 17 is a cross-sectional view taken on line xvii—xvii of FIG. 4.
Figure 18:
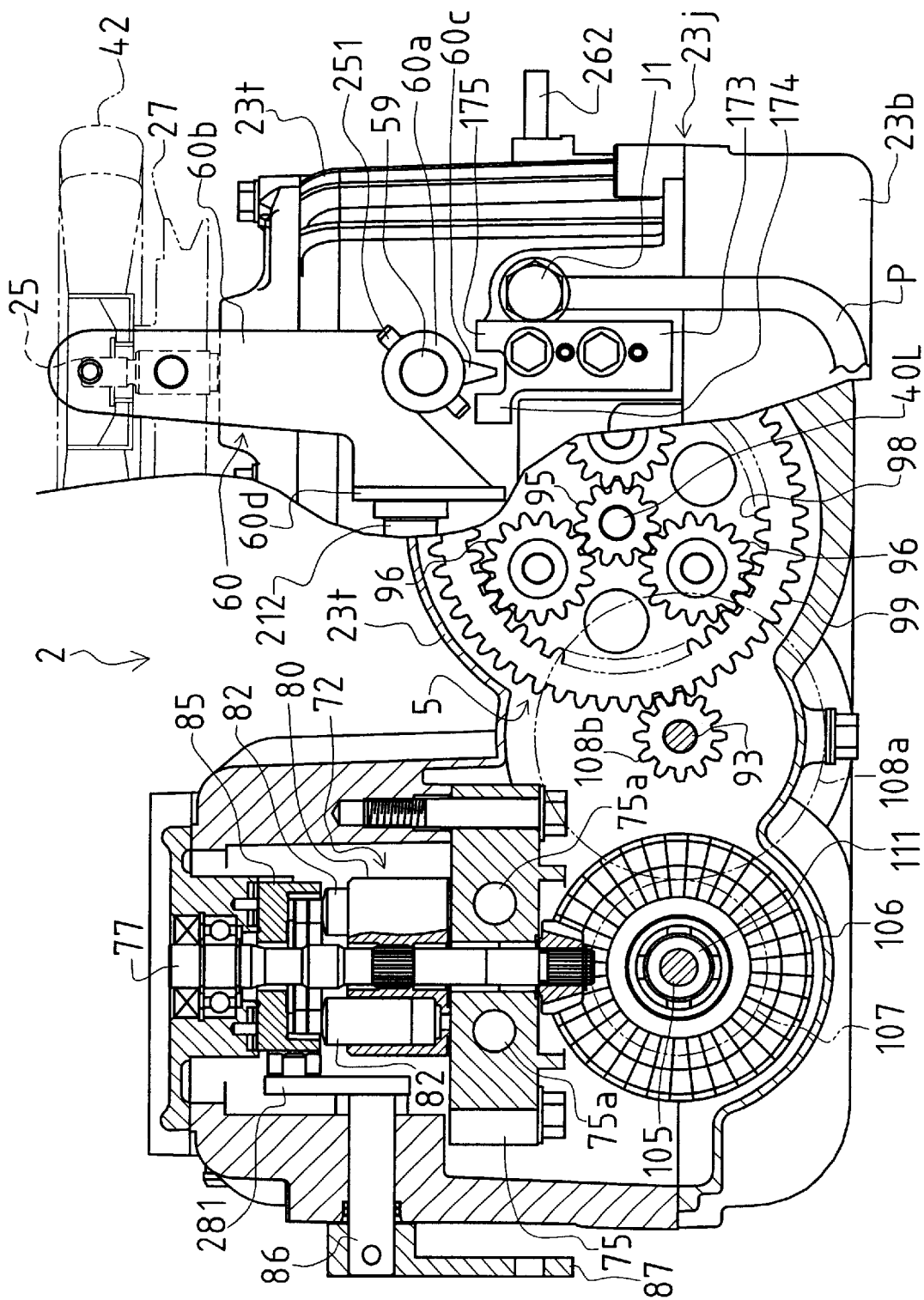
FIG. 18 is a cross-sectional view taken on line xviii—xviii of FIG. 4.

A housing 23 contains all of elements 21,22 and 5, axles 40L and 40R and the above-said driving trains. As shown in FIGS. 9 and 27–32, housing 23 consists of an upper half 23t and a lower half 23b joined with each other along a horizontal surrounding joint surface 23j (shown in FIG. 9). Bearing portions for a support shaft 105 and a transmission shaft 93 as discussed below are formed by halves 23t and 23b, whereby shafts 105 and 93 journalled therethrough are horizontally disposed with their axes on surface 23j, as shown in FIGS. 17 and 18. Bearing portions for axles 40L and 40R are formed by upper half 23t above surface 23j, as shown in FIGS. 9 and 18.

Housing 23 is full of a predetermined amount of oil. A magnet M as a filter is properly disposed in housing 23, as shown in FIGS. 4 and 9. Metallic dust which has floated in the oil sump with in housing 23 sticks to magnet M, thereby cleaning the oil in housing 23.

Figure 27:
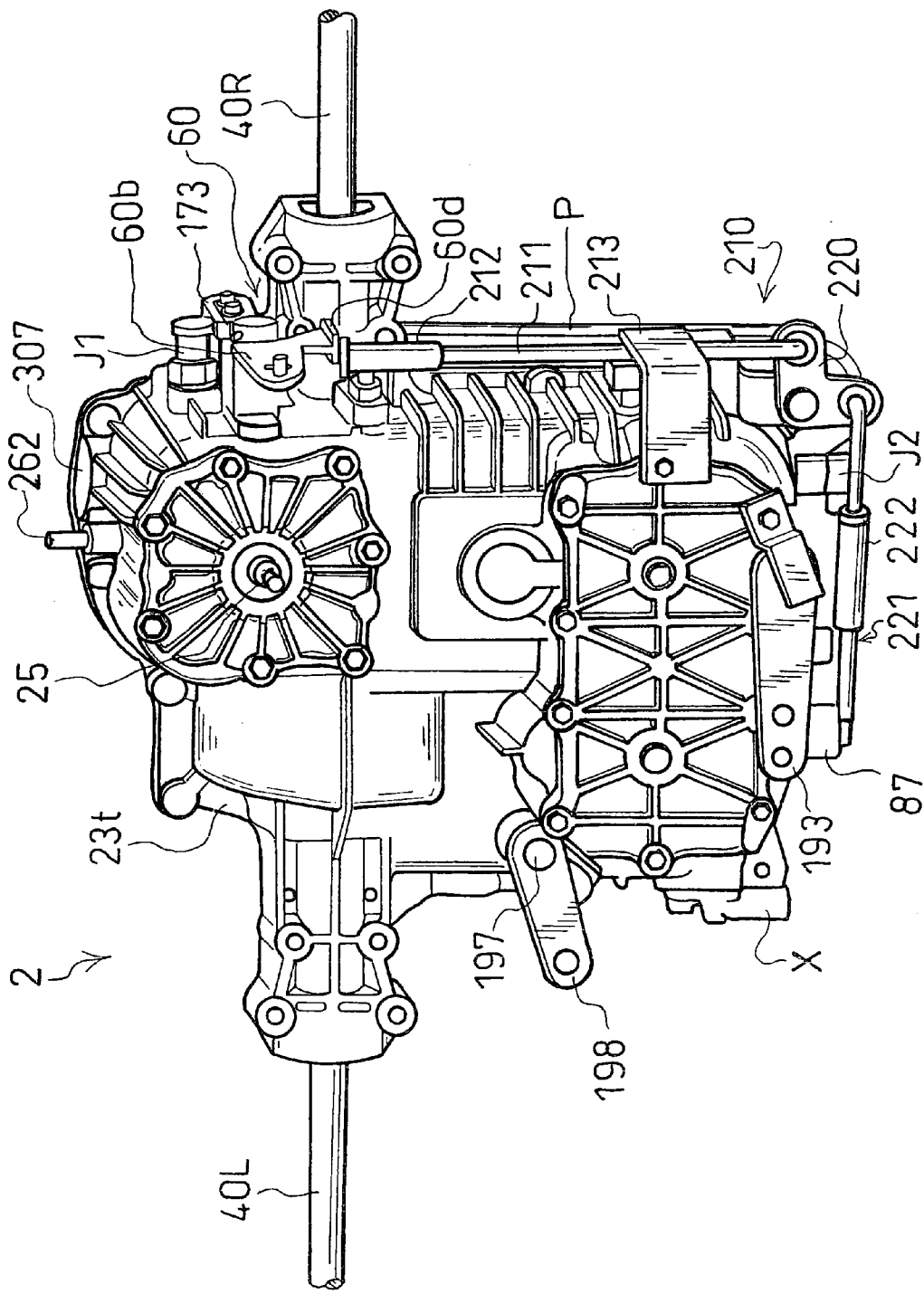
FIG. 27 is a perspective plan view of apparatus 2.
Figure 28:
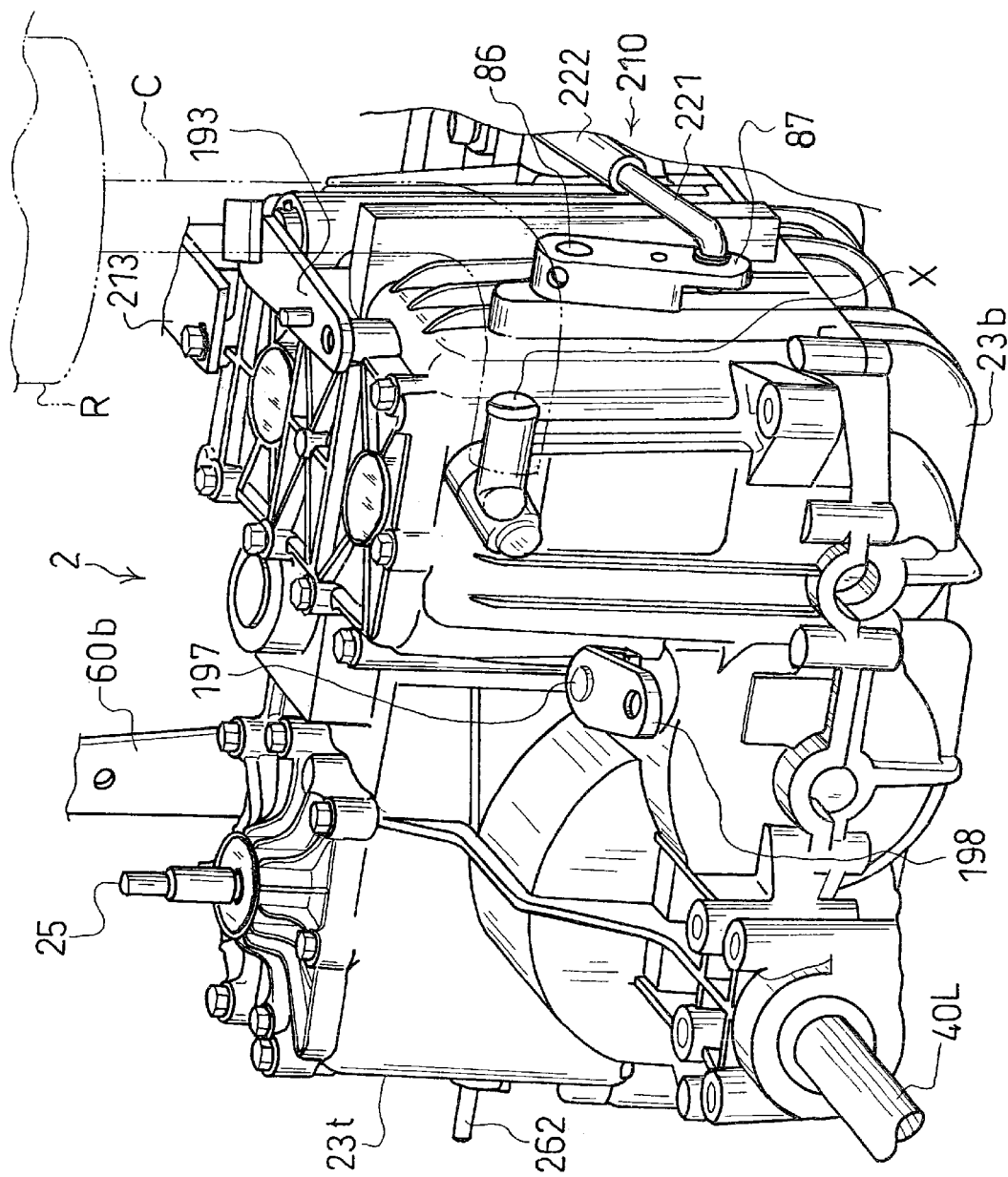
FIG. 28 is a perspective right side view of the same.
Figure 29:
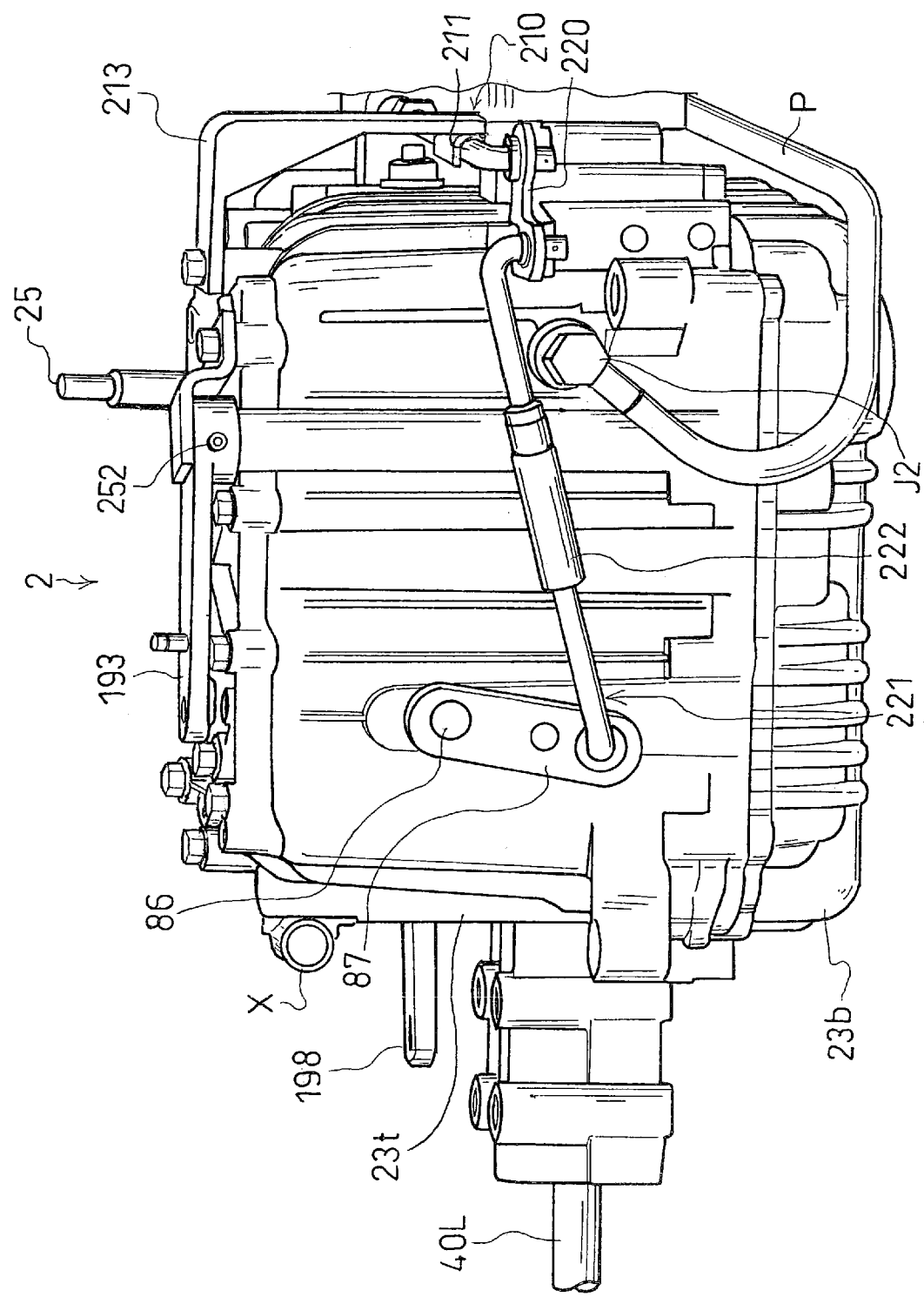
FIG. 29 is a perspective front view of the same.

As shown in FIGS. 27–29 and 32, a joint X projects from a side surface of upper half 23t. As shown in FIG. 28, an external oil reservoir R is disposed outside (above) housing 23 so as to be connected to joint X through a conduit C as drawn in phantom lines, thereby fluidly communicating with the interior of housing 23. Referring to the interior of housing 23 as shown in FIGS. 5–8, a center section 51 is disposed along the inner right side wall of housing 23, and a center section 75 is disposed along the inner rear wall of housing 23 perpendicular to center section 51. Center sections 51 and 75 shaped like flat plates may be identical with each other, so as to save manufacturing costs. They are both oriented horizontally. A hydraulic pump 52 and a hydraulic motor 53 are mounted onto the top surface of center section 51, thereby constituting driving HST 21. Hydraulic pump 52 and motor 53 of driving HST 21 are aligned in a row along the inner right side wall of housing 23. A hydraulic pump 71 and a hydraulic motor 72 are mounted onto the top surface of center section 75, thereby constituting steering HST 22. Hydraulic pump 71 and motor 72 are aligned in a row along the inner rear side wall of housing 23. Pumps 52, 71 and motors 53, 72 have vertical rotary axes.

Axles 40L and 40R are differentially connected to each other through differential gear unit 5 including planetary gears. Utmost ends of axles 40L and 40R project laterally outwardly from housing 23, as shown in FIG. 4. In plan view as shown in FIG. 4, differential gear unit 5 is laterally opposed to center section 51, and is disposed before center section 75.

The positional relationship among HSTs 21 and 22 and differential gear unit 5 best shown in FIG. 4 as an example. Alternatively, it may be thought that HST 21 and differential gear unit 5 are exchanged and HST 22 is laterally reversed (pump 71 and motor 72 are exchanged). Further alternative arrangements may be utilized.

Figure 10:
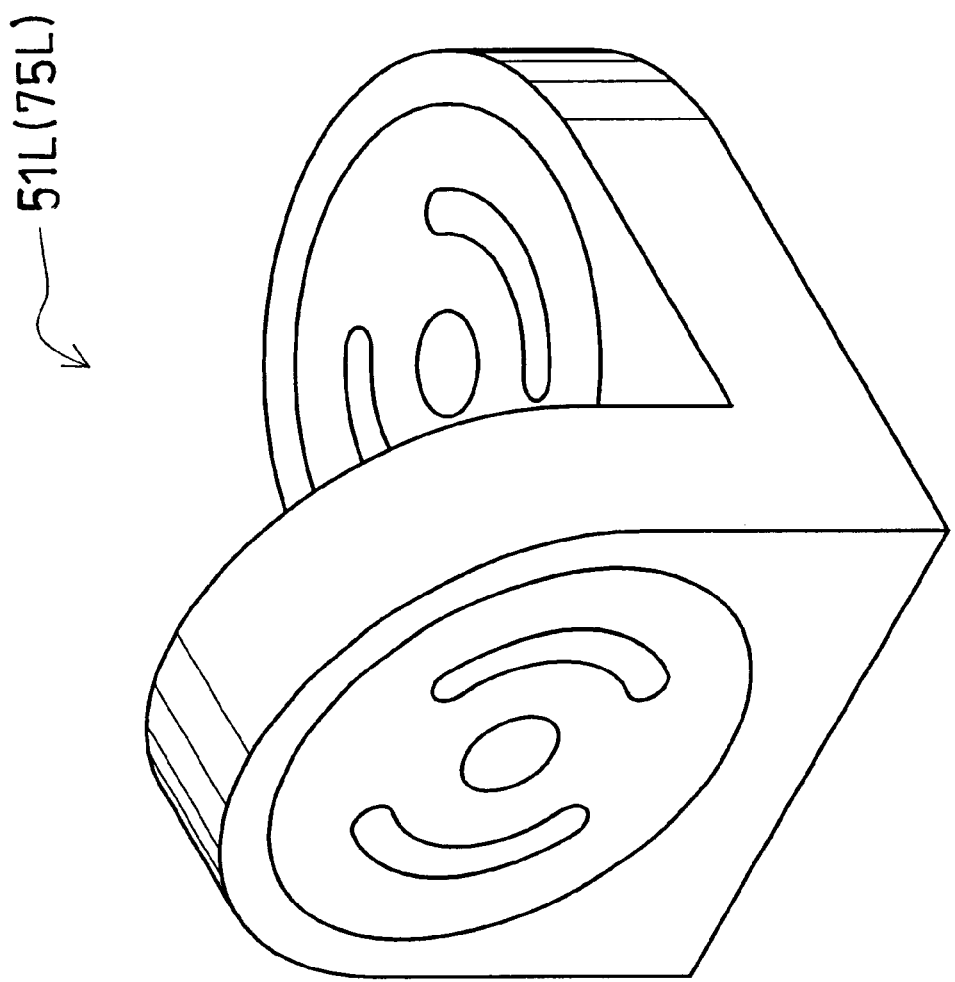
FIG. 10 is a perspective view of an alternative L-like shaped center section.
Figure 11:
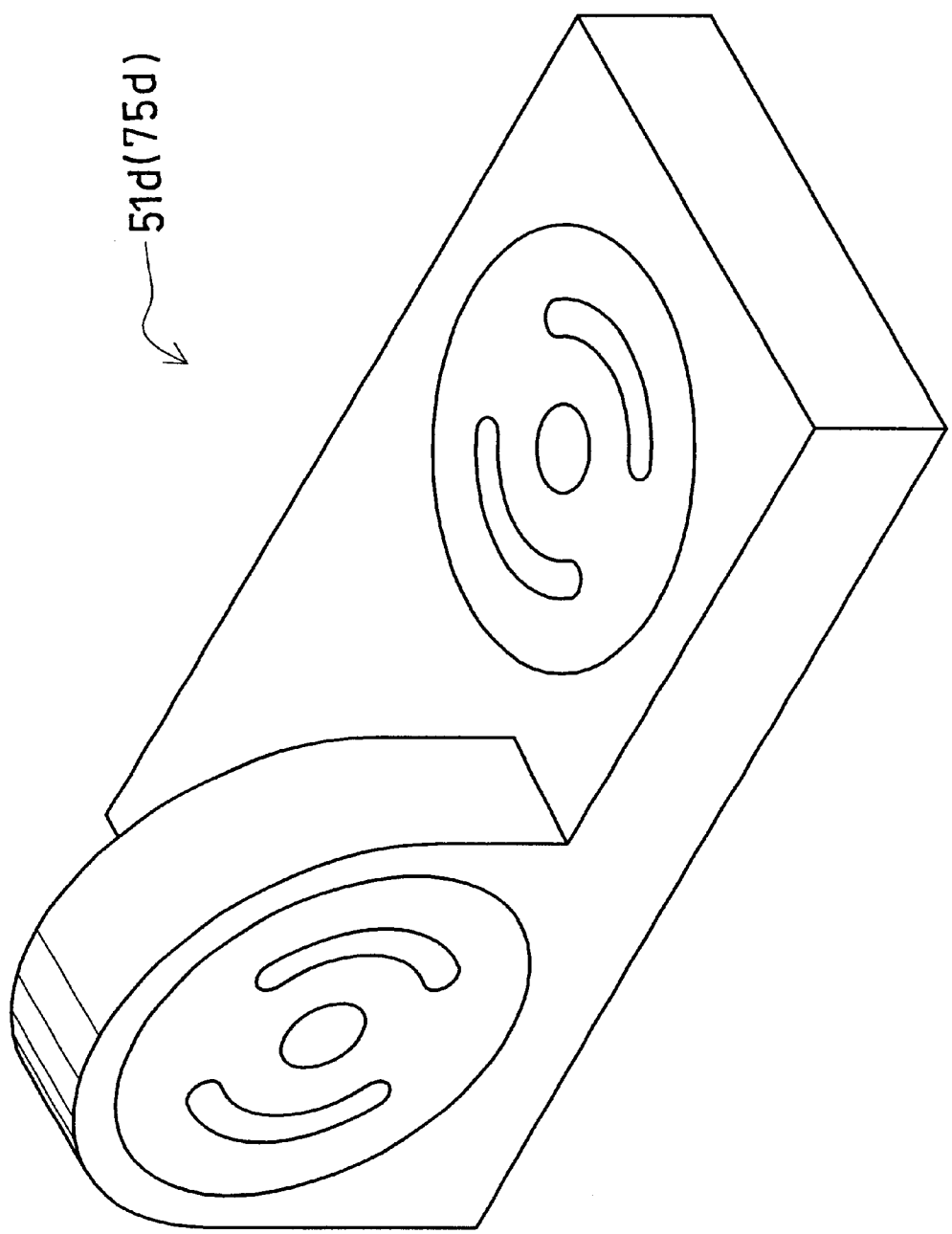
FIG. 11 is a perspective view of an alternative d-like shaped center section.

Center sections 51 and 75 may be replaced with center sections 51L and 75L shown in FIG. 10, which are L-like shaped when viewed in section. Alternatively, they may be replaced with center sections 51d and 75d shown in FIG. 11, which are d-like shaped when viewed in section. Alternatively, one of HSTs 21 and 22 may use an L-like shaped center section, and the other may use a d-like shaped center section. In case that either two L-like shaped center sections or two d-like shaped center sections are employed, one for HST 21 may be identical with the other for HST 22, thereby saving manufacturing costs.

If a center section finely fit to the inner form of housing 23 is chosen among the various center sections, apparatus 2 can be nicely compact. The type of center section may be chosen in correspondence to such a case that differential gear unit 5 comprises bevel gears replacing planetary gears.

For an embodiment employing the above L-like or d-like shaped center sections, the given center section may be provided with a horizontal pump mounting surface and a vertical motor mounting surface. In this case, the pump mounting surface may coincide with joint surface 23j or alternatively be offset therefrom.

Figure 7:
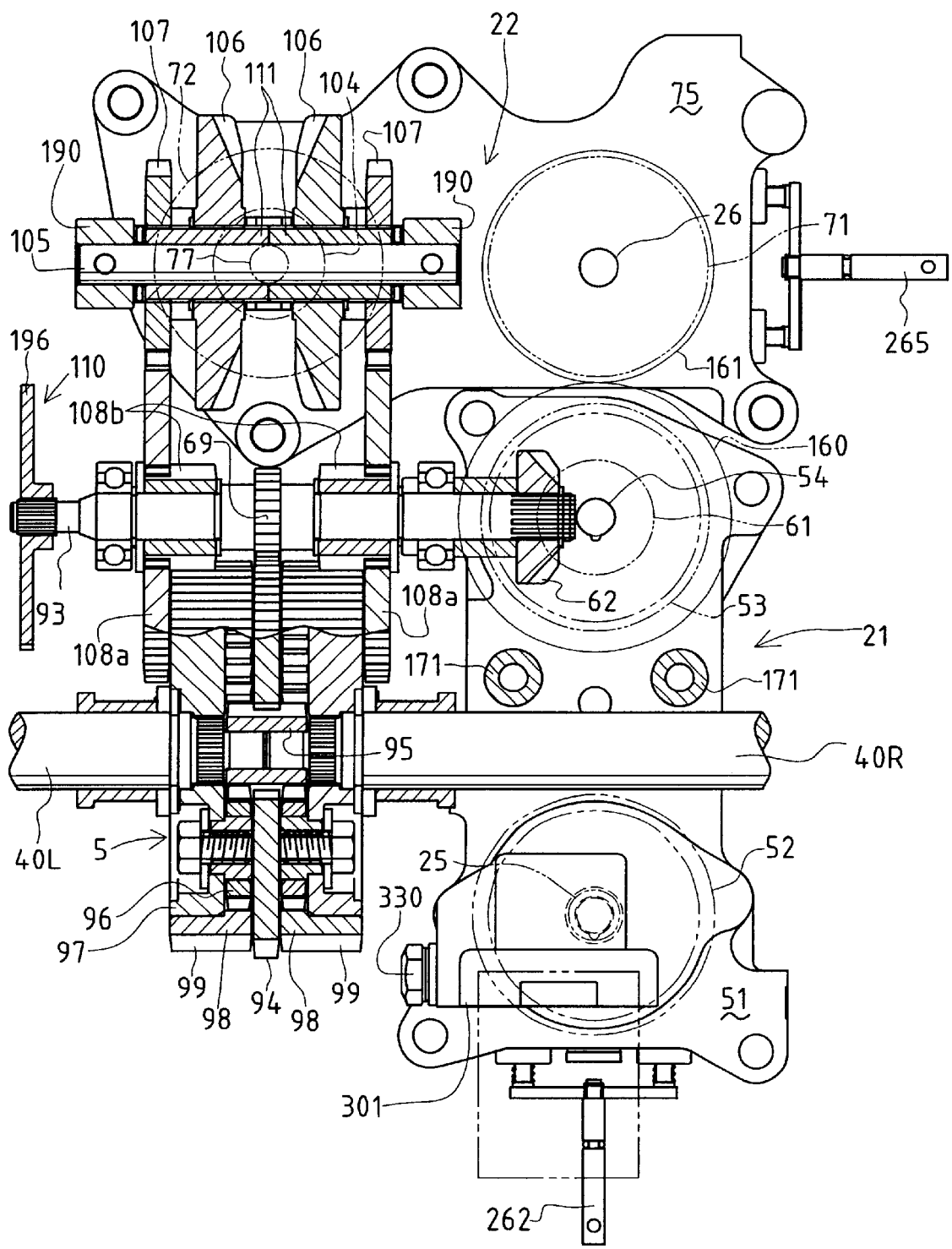
FIG. 7 is a bottom view partly in section of the same.
Figure 8:
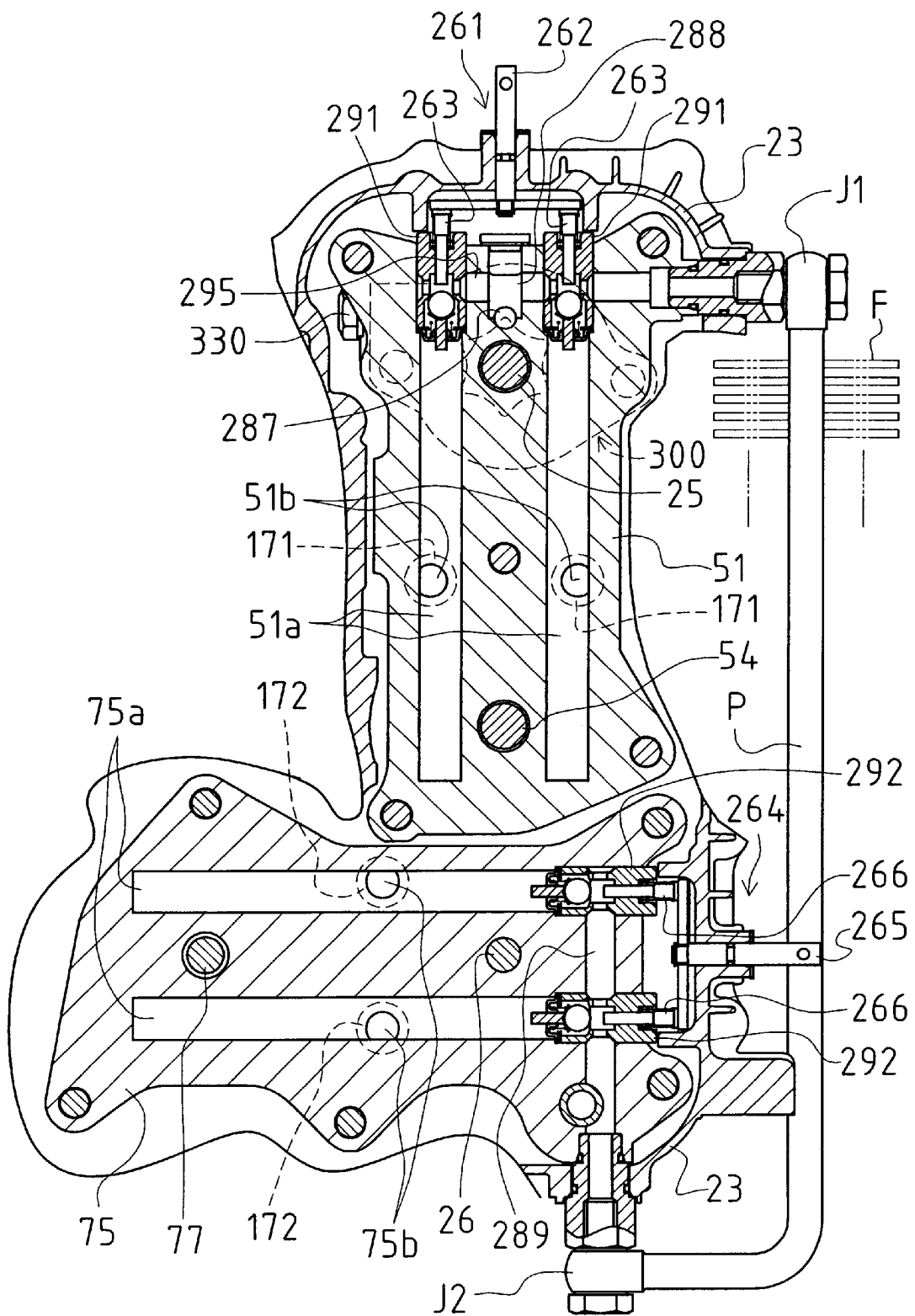
FIG. 8 is a sectional plan view of center sections 51 and 75 of twin HSTs 21 and 22.
Figure 32:
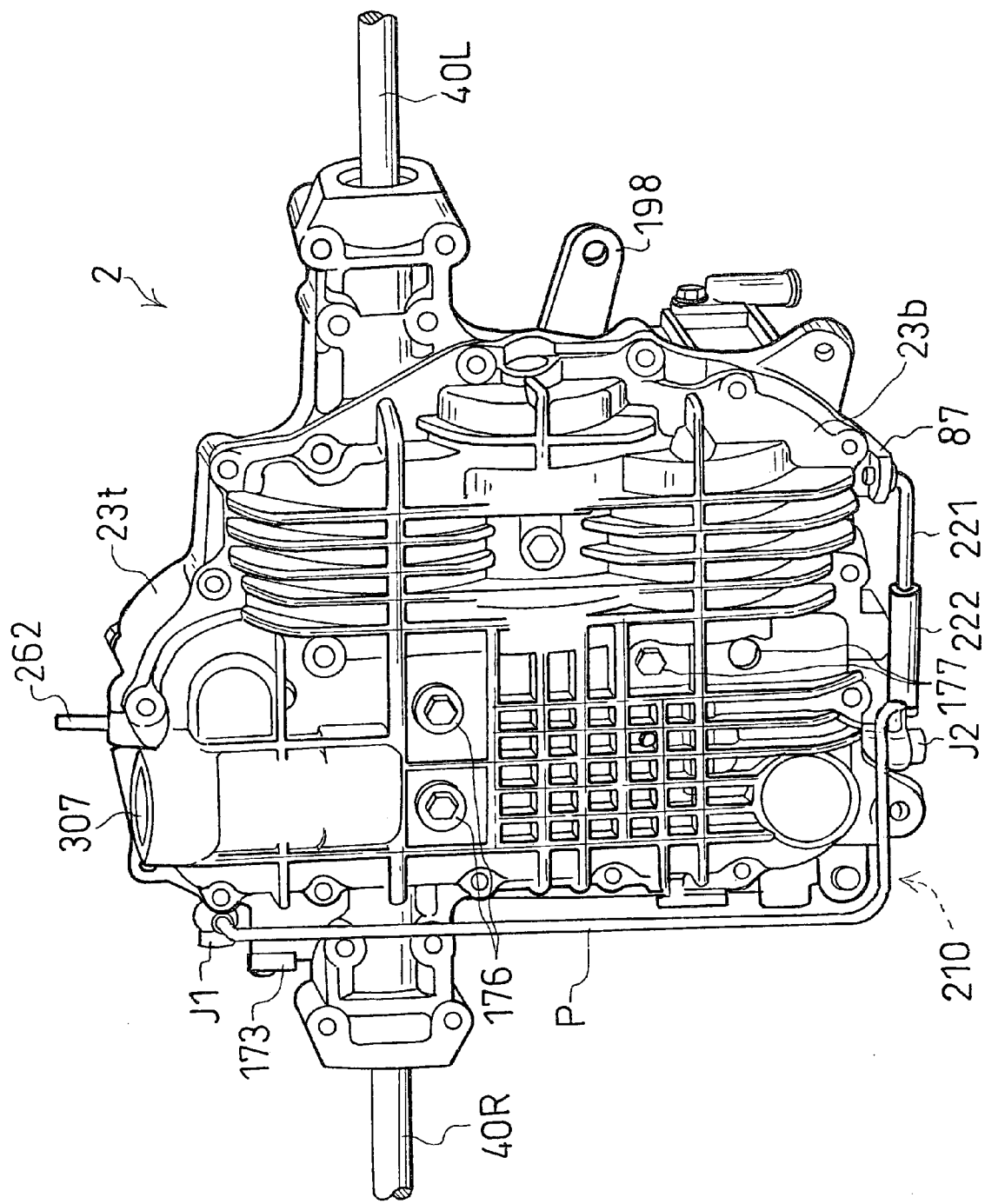
FIG. 32 is a perspective bottom view of the same.

Referring to FIG. 8, center sections 51 and 75 are provided therein with two horizontally parallel oil passages 51a and 75a for fluidly connecting corresponding hydraulic pump and motor to each other. Vertical oil passages 51b are downwardly extended from respective oil passages 51 a so as to be open at the bottom of center section 51. Similarly, vertical oil passages 75b are extended from respective oil passages 75a and are open at the bottom of center section 75. Corresponding to respective oil passages 51b and 75b, two draining holes 176 and two draining holes 177 are bored through the bottom of housing 23, as shown in FIG. 32. As shown in FIGS. 7, 8 and 9, each of two vertical draining pipes 171 is interposed between the bottom opening of each passage 51b and each hole 176, and each of two vertical draining pipes 172 between the bottom opening of each passage 75b and each hole 177, thereby enabling the oil in center sections 51 and 75 to be drained downwardly from housing 23. The bottom opening of each of pipes 171 and 172 is regularly plugged.

Vertically opposite to the hydraulic pumps and motors for two HSTs 21 and 22, gear trains, which interlock motor shafts 54 and 77 of hydraulic motors 53 and 72 to differential gear unit 5, are disposed below center sections 51 and 75.

Figure 25:
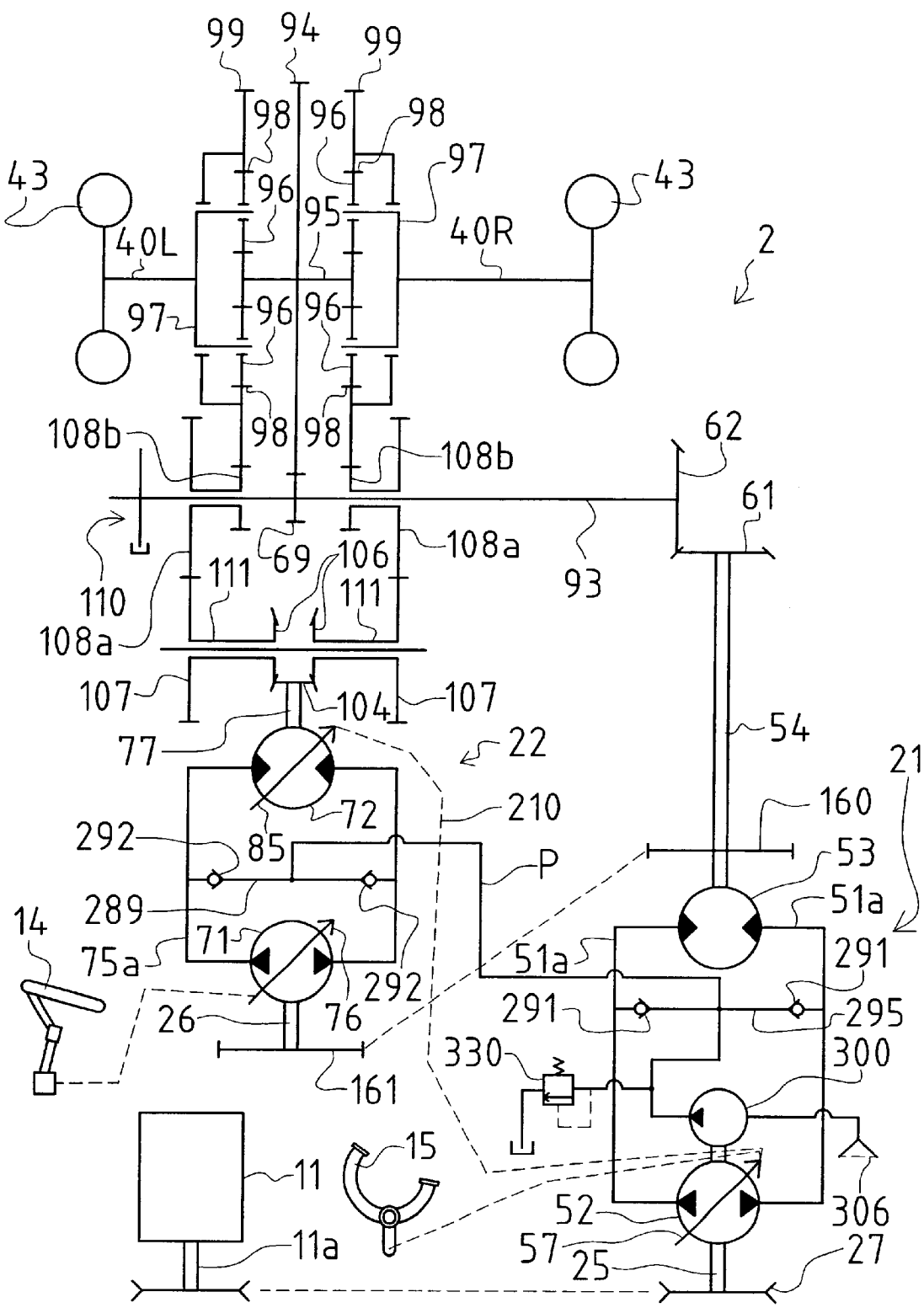
FIG. 25 is a diagram illustrating hydraulic circuits and gear mechanisms of dependent steering type apparatus 2, wherein hydraulic motor 72 of steering HST 22 is of a variable displacement type whose swash plate 85 interlocks with swash plate 76 through linkage 210.

As shown in FIGS. 9 and 27–32, a pump shaft 25 of hydraulic pump 52 projects upwardly from the top of housing 23 (upper half 23t) so as to serve as an input shaft, which is provided thereon with an input pulley 27 and a cooling fan 42 (omitted in FIGS. 27–32). As shown in FIG. 25, a belt is interposed between input pulley 27 and an output pulley fixed on output shaft 11a of engine 11.

As shown in FIG. 9, pump(input) shaft 25 projects downwardly through center section 51 so as to transmit power into a charge pump 300 attached onto the bottom surface of center section 51. Charge pump 300 driven by pump shaft 25 absorbs oil in housing 23 through a strainer 306, so as to compensate for leak of operating oil in two HSTs 21 and 22.

Figure 13:
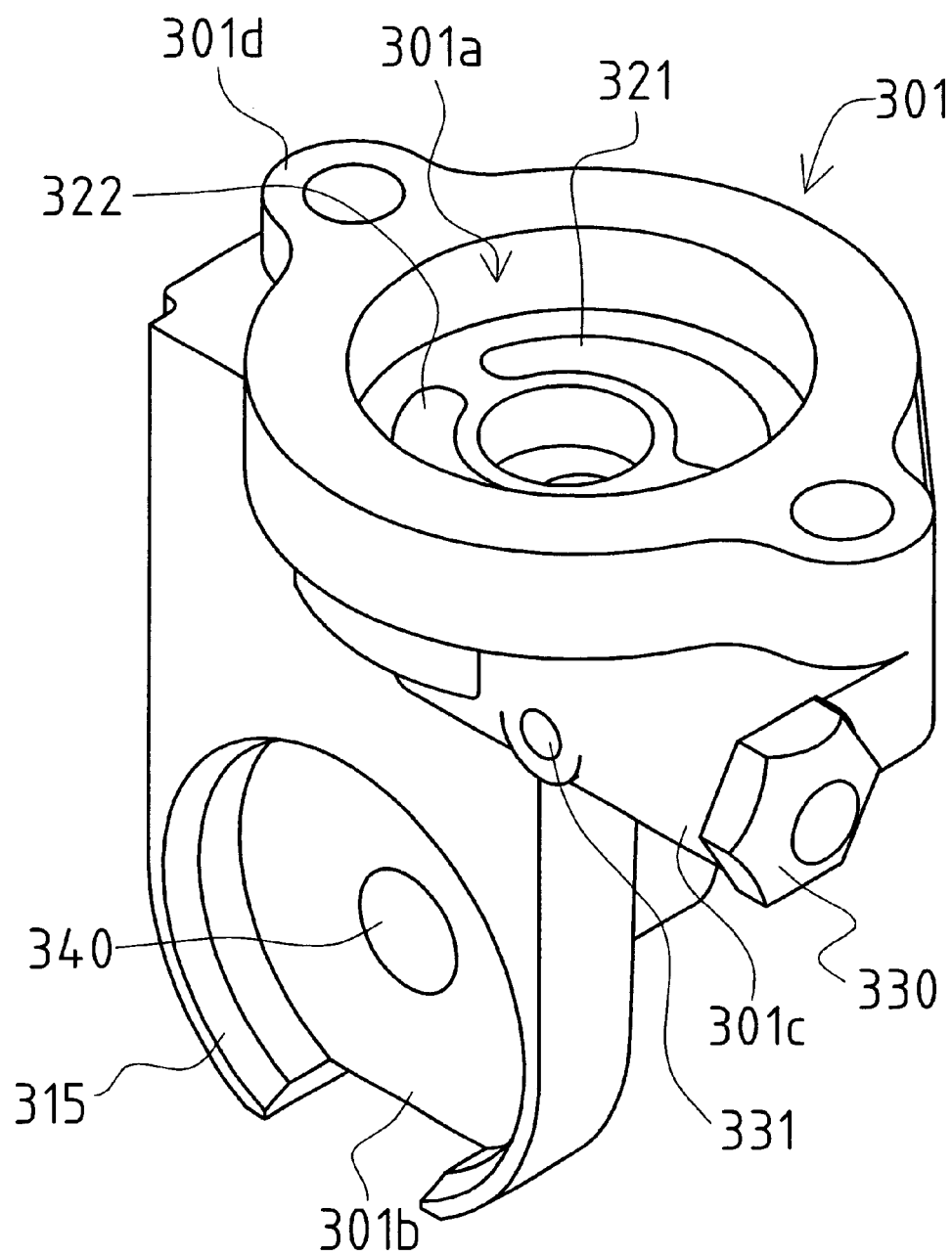
FIG. 13 is a perspective view of a charge pump casing 301.

Detailed description will now be given on charge pump 300. Center section 51 is provided on the bottom surface thereof with a charge pump mounting surface onto which a pump casing 301 is attached. As shown in FIG. 13, casing 301 is provided at the top portion thereof with a seat 301d having a horizontal surface to be stuck to the bottom surface of center section 51, and also with a downwardly recessed rotor chamber 301a for containing rotors, an inner rotor 302 and an outer rotor 303. Casing 301 is extended downwardly and bent laterally so as to integrally form retainers 301b and 301c for strainer 306 and a charge relief valve 330, respectively.

Figure 12:
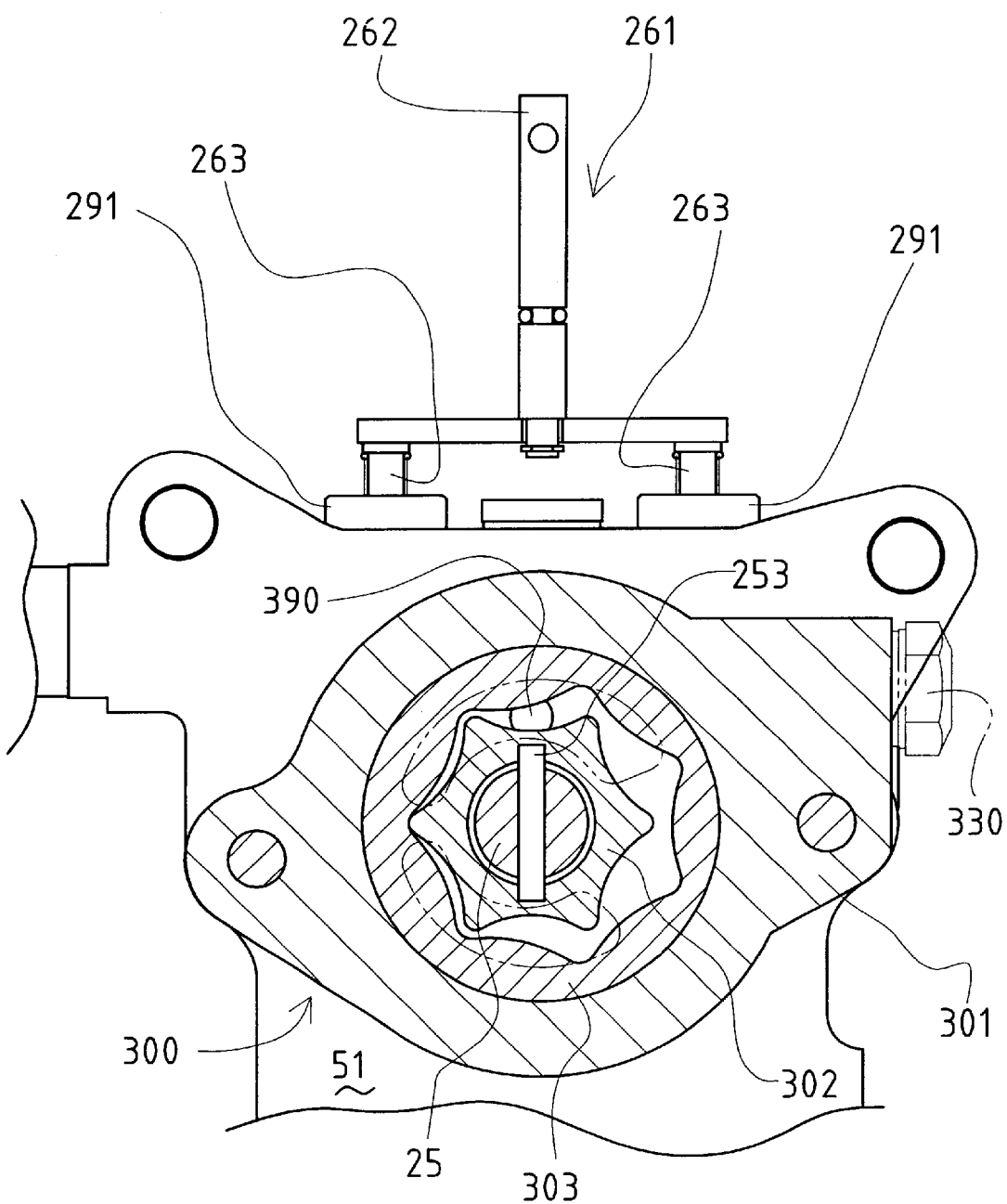
FIG. 12 is a bottom view partly in section of a charge pump 300 attached onto center section 51 of a driving HST 21.
Figure 14:
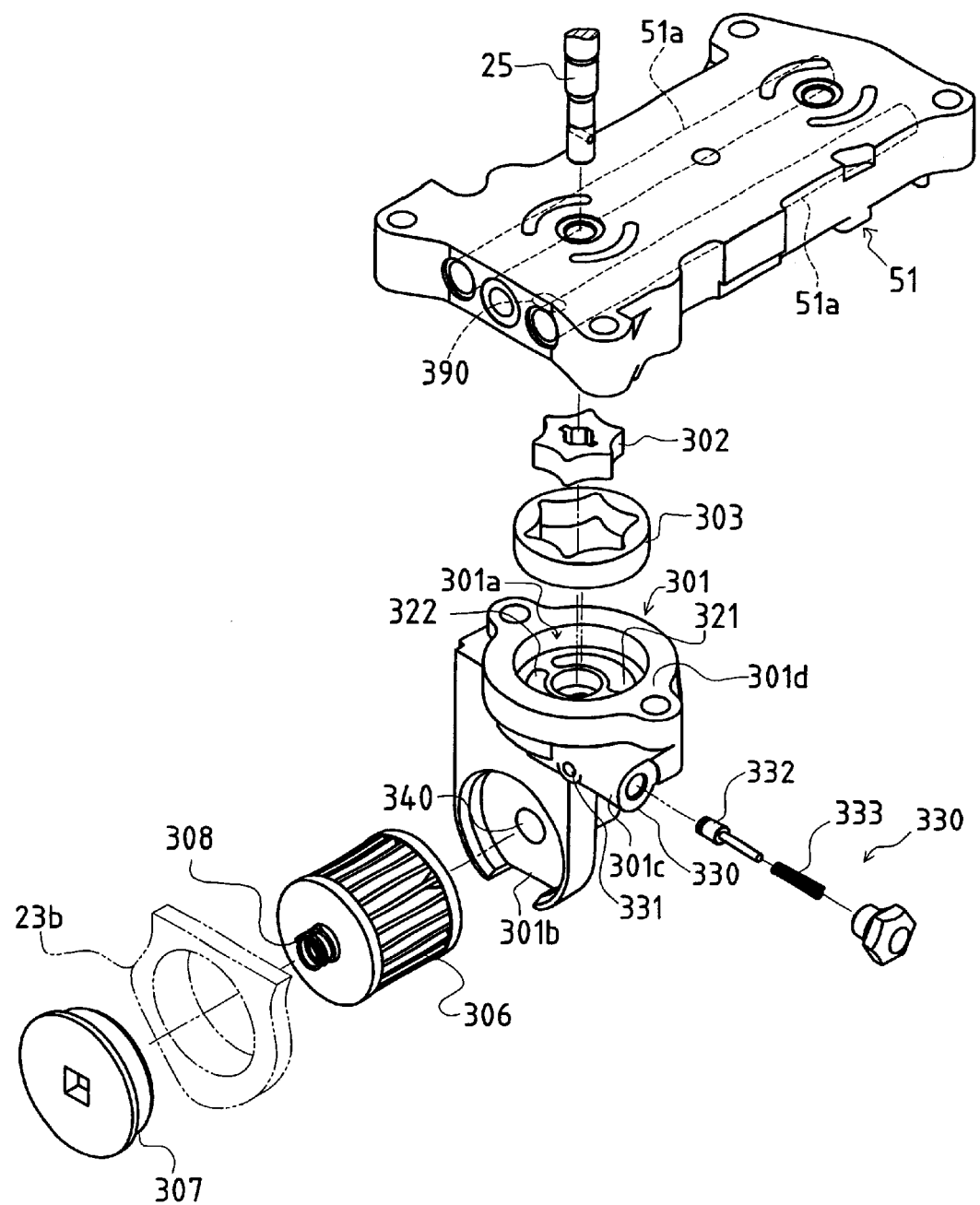
FIG. 14 is an exploded view in perspective of a strainer 306 and a charge relief valve 330 being attached to charge pump casing 301 and parts of charge pump 300 including casing 301 being attached to center section 51 as they appear during assembly thereof.

As shown in FIGS. 9 and 14, inner rotor 302 and outer rotor 303 are disposed within rotor chamber 301a. The lower end of pump shaft 25 is also disposed vertically in rotor chamber 301a so as to pass through an axial through-put hole of inner rotor 302, as shown in FIGS. 12 and 14, and fixed to inner rotor 302 with a pin 253 horizontally crossing through pump shaft 25 as shown in FIG. 9, thereby transmitting its rotational force to inner rotor 302. Inner rotor 302 is torochoidal at its surrounding outer side surface. The outer rotor 303 has a torochoidally shaped internal gear of which torochoid is diametrically larger than that of inner rotor 302. Outer rotor 303 is rotatably retained by casing 301 so as to be disposed off center of inner rotor 302, so that the internal gear of outer rotor 303 engages with the external gear of inner rotor 302. As a result, outer rotor 303 is rotated according to rotation of inner rotor 302 driven by pump shaft 25.

Figure 15:
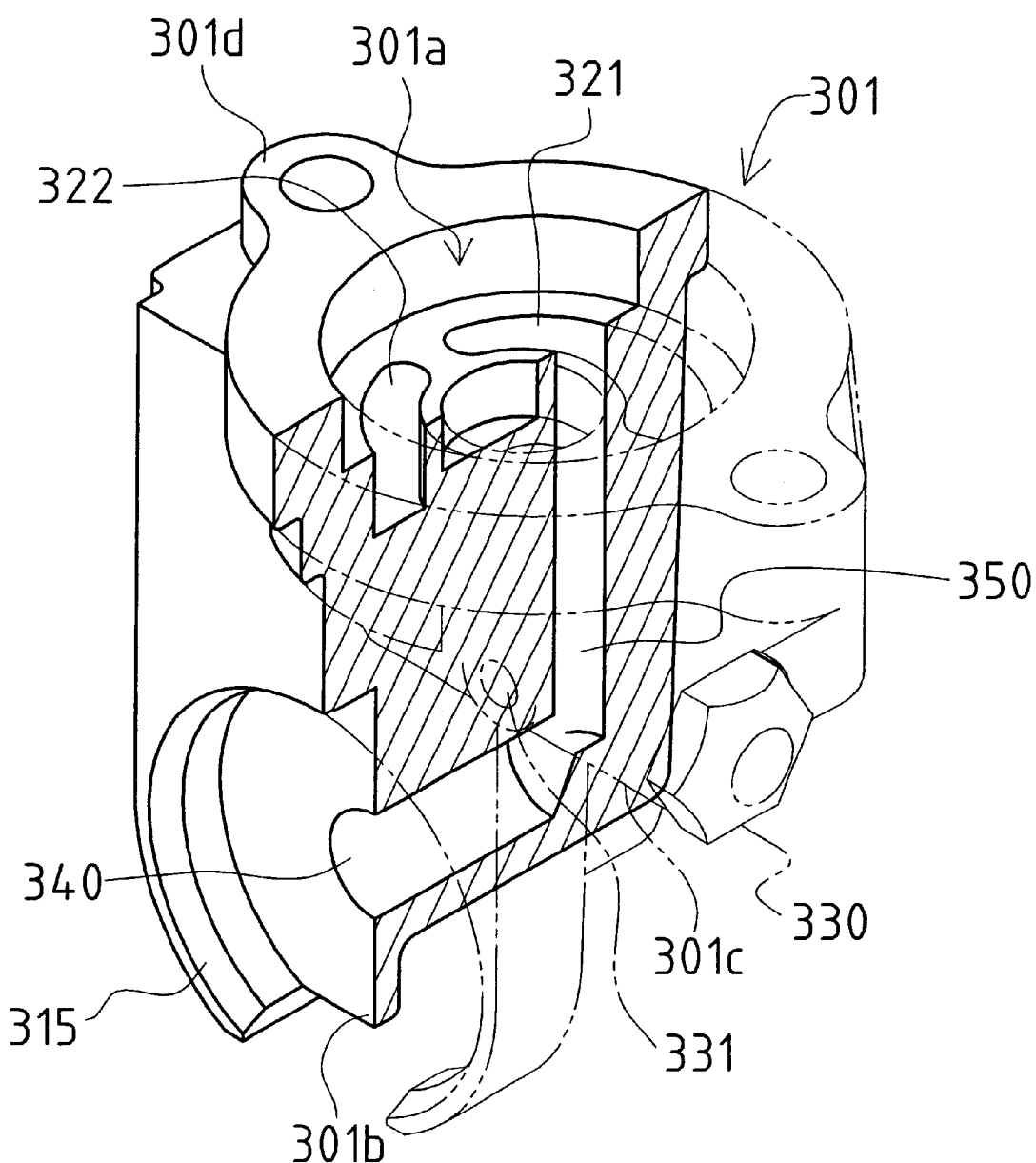
FIG. 15 is a perspective view partly in section of casing 301 illustrating its inner oil passages.
Figure 16:
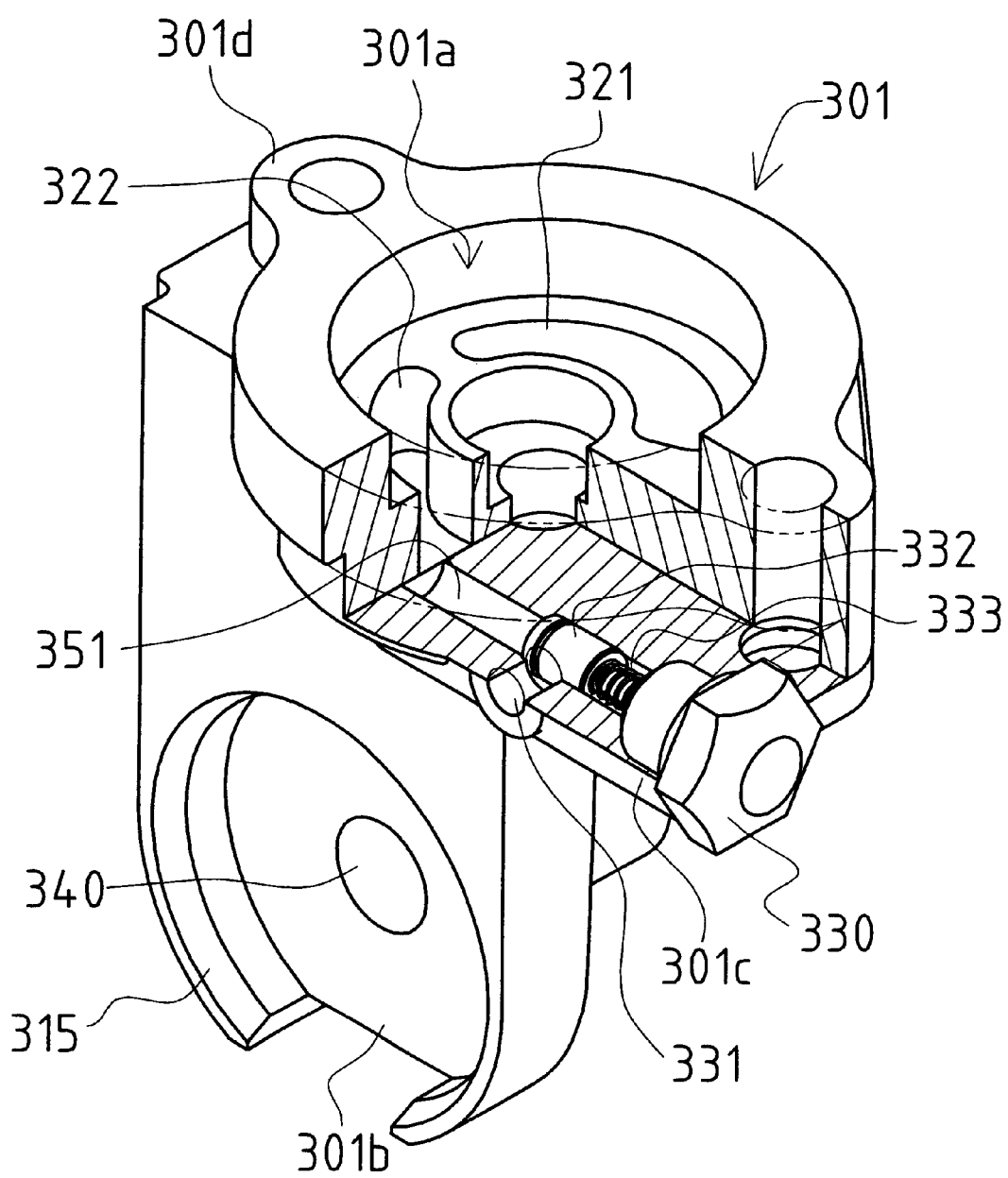
FIG. 16 is a perspective view partly in section of the same illustrating charge relief valve 330 disposed therein.

During the rotation of rotors 302 and 303, there appear an expanding space and a reducing space between rotors 302 and 303. In casing 301 is bored a suction port 321 which is open toward the reducing space in rotor chamber 301a. As shown in FIG. 15, in casing 301 is bored an oil passage 350 vertically extending from suction port 321 and an oil passage 340 horizontally extending between oil passage 350 and the interior of retainer 301b.

As shown in FIG. 13, retainer 301b is formed in a circular shape at the lower side portion of casing 301 and is slantingly cut away at its inner peripheral edge so as to form a guide surface 315. As shown in FIG. 14, retainer 301b is disposed co-axially with an opening of the side wall of lower half 23b. Cylindrical strainer 306 is inserted at the inward end thereof along guide surface 315 into retainer 301b. As shown in FIGS. 9, 14, 31 and 32, a discoid lid 307 is removably plugged into the opening of lower half 23b. A projection 307a inwardly extending from the inner surface of lid 307, as shown in FIG. 9, is inserted into a spring 308 provided on the outward end of strainer 306. As a result, strainer 306 is fixedly interposed between lid 307 and retainer 301b, as shown in FIG. 9.

A discharge port 322 is bored in casing 301 so as to be open toward the expanding space in rotor chamber 301a. A charge relief valve 330 is provided into retainer 301c. In casing 301 is bored an oil passage 351 extending between discharge port 322 and the interior of retainer 301c, and a drain port 331 outwardly extending from the interior of retainer 301c.

Charge relief valve 330 comprises a spool 332 and a spring 333. Charge relief valve 330 limits the charge pressure of charge pump 300. If the pressure in discharge port 322 is increased beyond a predetermined degree, spool 332 pushed against spring 333 by the oil discharged from charge pump 300 makes drain port 331 communicate with the interior of retainer 301c, so that the excessively discharged oil is drained through drain port 331, thereby keeping the charge pressure equal to or lower than the predetermined.

In center section 51, an oil supplying passage 295 is interposed between two oil passages 51a, as shown in FIG. 8, and oil passages 287 and 288 are extended from the intermediate portion of passage 295, so as to be connected to a charge port 390 which is open at the bottom surface of center section 51, as shown in FIGS. 9 and 14.

Charge port 390 is open toward the expanding space between two rotors 302 and 303 in rotor chamber 301a. Oil passages 51a are charged therein with the operating oil pressurized by the pumping action of rotors 302 and 303 through charge port 390 and oil passages 287, 288 and 295 within center section 51. Each passage 51a is provided therein with ball check valve 291, as shown in FIG. 8, which is made open during the oil charging and checks the oil from passage 51a to passage 295. Passages 51a are thereby prevented from lack of hydraulic pressure.

A neutral returning member 261, as shown in FIG. 8, is slidably disposed in the side wall of housing 23 for making a short path between two valves 291 through passage 295. Member 261 projects outwardly from housing 23 so as to provide an operating portion 262, as shown in FIGS. 8, 9, 27, 28, 31 and 32, and is provided at the inward end thereof with two spools 263, as shown in FIG. 8, which are inserted into respective passages 51a so as to be disposed adjacently to balls of valves 291.

In such a case that a vehicle which has apparatus 2 is drawn by another vehicle, operating portion 262 is pushed so as to make neutral returning member 261 slide inwardly so that both spools 263 push balls of valves 291 against springs, whereby oil is drained from one passage 51a which is pressurized higher than the other. Thus, motor shaft 54 of driving HST 21 is made freely rotatable, so that wheels 43 fixed on axles 40L and 40R drivingly connected with motor shaft 54 are freely rotated without resistance during the traction.

Oil in passage 295 can be extracted from housing 23 through a joint J1. Similarly to center section 51 having passage 295 and check valves 291, center section 75 includes oil supplying passage 289 interposed between two passages 75a and check valves 291 disposed in respective passages 75a. Passage 289 is fluidly connected with a joint J2 projecting from housing 23. As shown in FIGS. 8, 27, 29–32, an external conduit P is interposed between joints J1 and J2 surrounding the bottom portion of housing 23, so as to make the oil in passage 295 flow into corresponding passage 75a through passage 289 and valve 292, thereby compensating for lack of oil in steering HST 22. While flowing through conduit P, the oil is cooled by the atmosphere. Additionally, conduit P may be provided therearound with fins F for enhancing the cooling effect as drawn in phantom lines in FIG. 8.

Also, similarly to neutral returning member 261 for driving HST 21, two oil passages 75a of steering HST 22 can be equal to each other in hydraulic pressure by neutral returning member 264, whose external portion projecting outwardly from housing 23 is provided thereon with an operation portion 265. Due to the above mentioned construction, both HSTs 21 and 22 are compensated for lack of oil by the pumping action of charge pump 300.

Detailed description will now be given on driving HST 21 which is constructed so that hydraulic pump 52 and hydraulic motor 53 are mounted on the top of center section 51 as mentioned above. Referring to variable displacement hydraulic pump 52 as shown in FIG. 9, a cylinder block 44 is rotatably and slidably mounted on the pump mounting surface at the top of center section 51. Vertical pump shaft 25 is axially and is not relatively rotatably disposed in cylinder block 44. A plurality of pistons 45 are reciprocally slidably inserted with respective biasing springs (not shown) into cylinder block 44. The heads of pistons 45 abut against a movable swash plate 57 which is operated slantwise so as to control the amount and direction of oil discharged from hydraulic pump 52.

A control shaft 59 is supported by the wall of housing 23 in parallel to axles 40 so as to operate swash plate 57 slantwise, as shown in FIG. 4, 18–20 and 30. An arm member 271 is fixed onto the inward end of control shaft 59 in housing 23.

Figure 19:
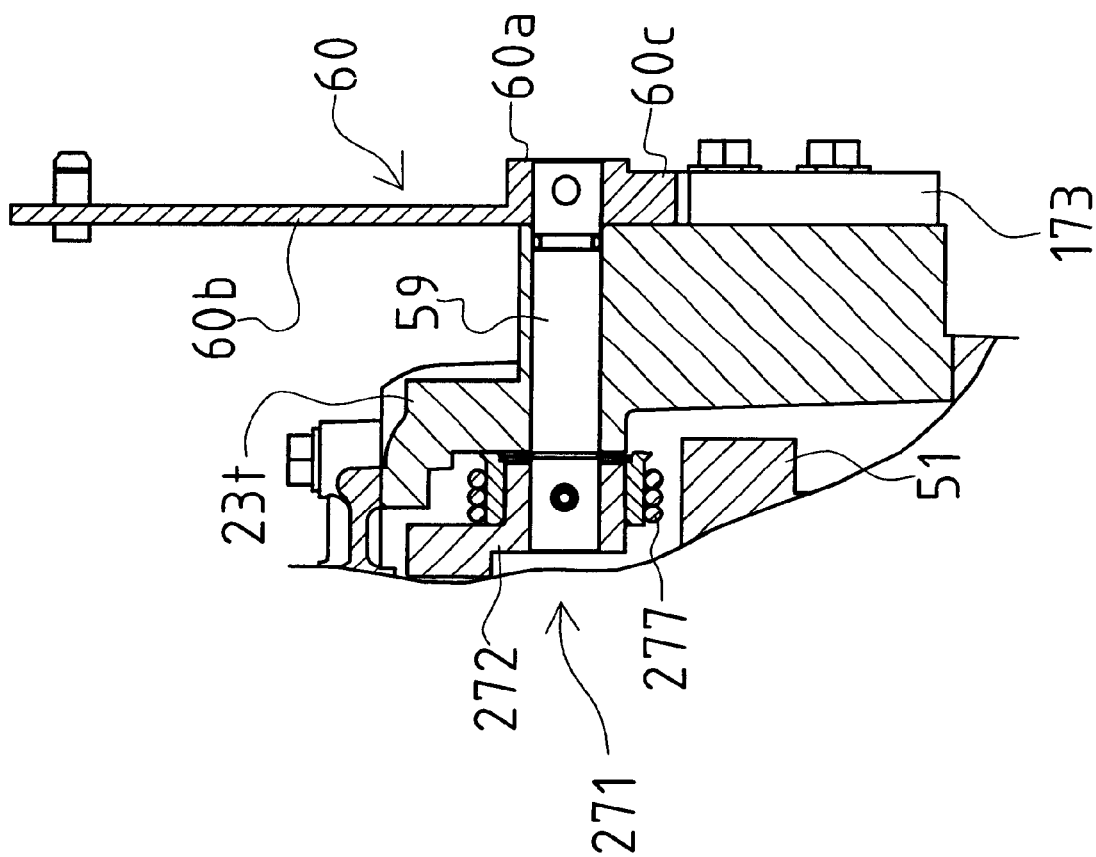
FIG. 19 is a sectional fragmentary side view, on an enlarged scale, of a control shaft 59 for rotating a movable swash plate 76 of a hydraulic pump 52 of driving HST 21 and its surroundings.

Referring to FIG. 19, a swash plate arm 272 as an integral part of arm member 271 is extended from a boss 280 of arm member 271 fixed around control shaft 59 so as to engage at the utmost end thereof with swash plate 57.

Figure 20:
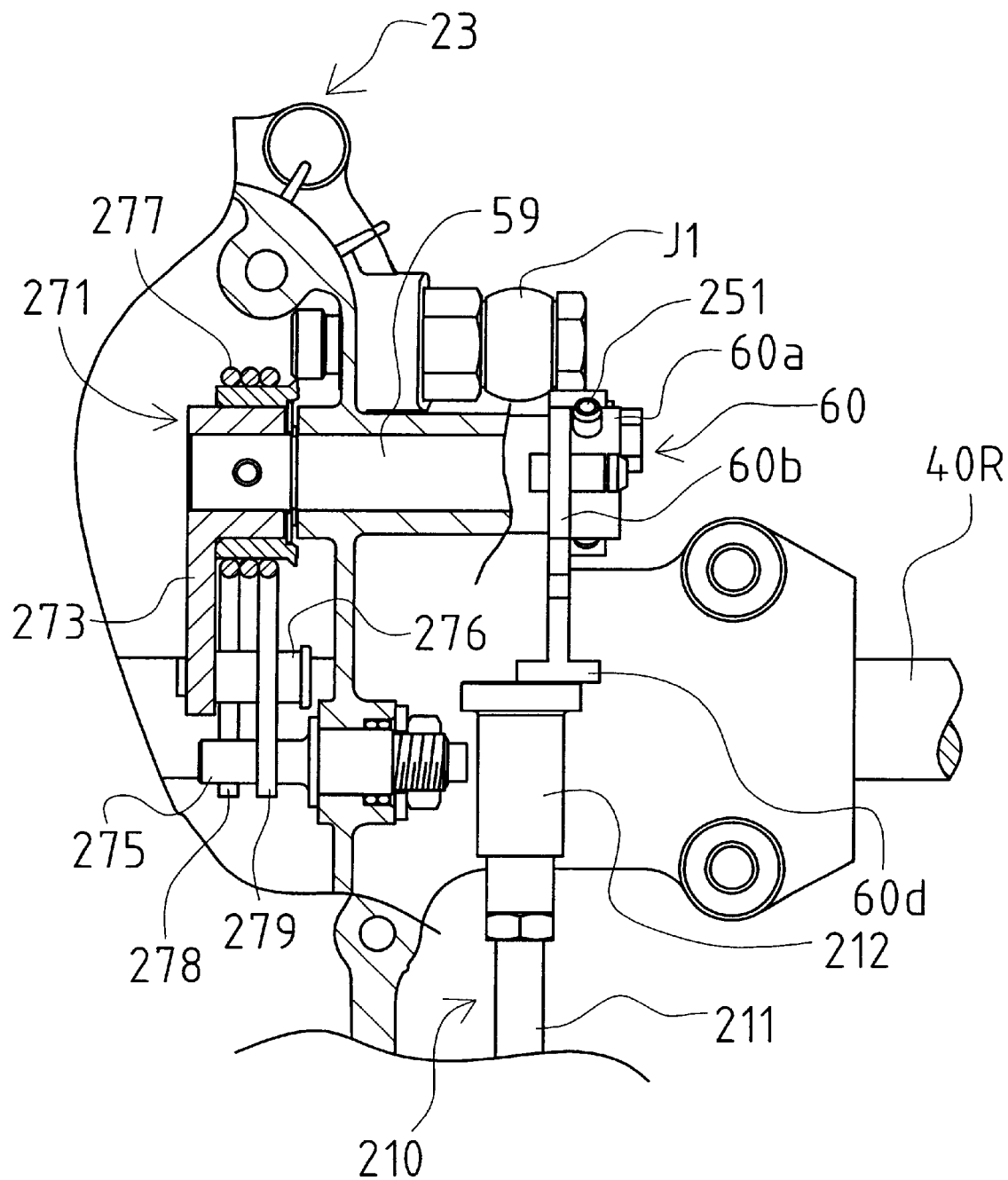
FIG. 20 is a sectional fragmentary plan view, on an enlarged scale, of the same.

Referring to FIG. 20, a neutral holding arm 273 as another integral part of arm 271 is extended backwardly from boss 280. An inward projection 275 is provided on the inner side wall of housing 23 behind control shaft 59. A neutral biasing spring 277 is provided around boss 280. Both end portions 278 and 279 of spring 277 are extended backwardly so as to sandwich projection 275 up and down. A projection 276 is integrally provided on the utmost end of arm 273. The utmost end of projection 276 is disposed between end portions 278 and 279 of spring 277.

Figure 30:
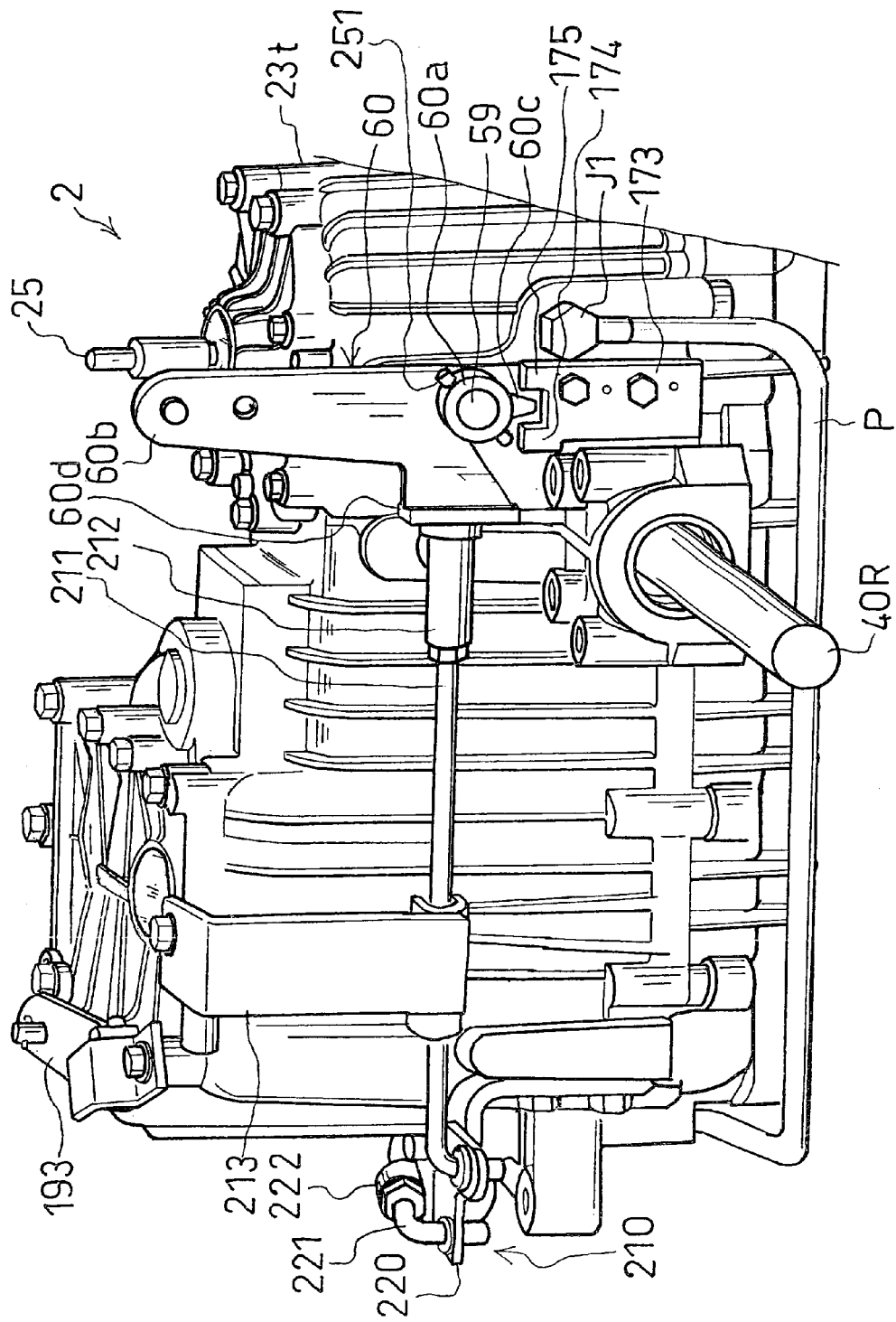
FIG. 30 is a perspective left view of the same.
Figure 31:
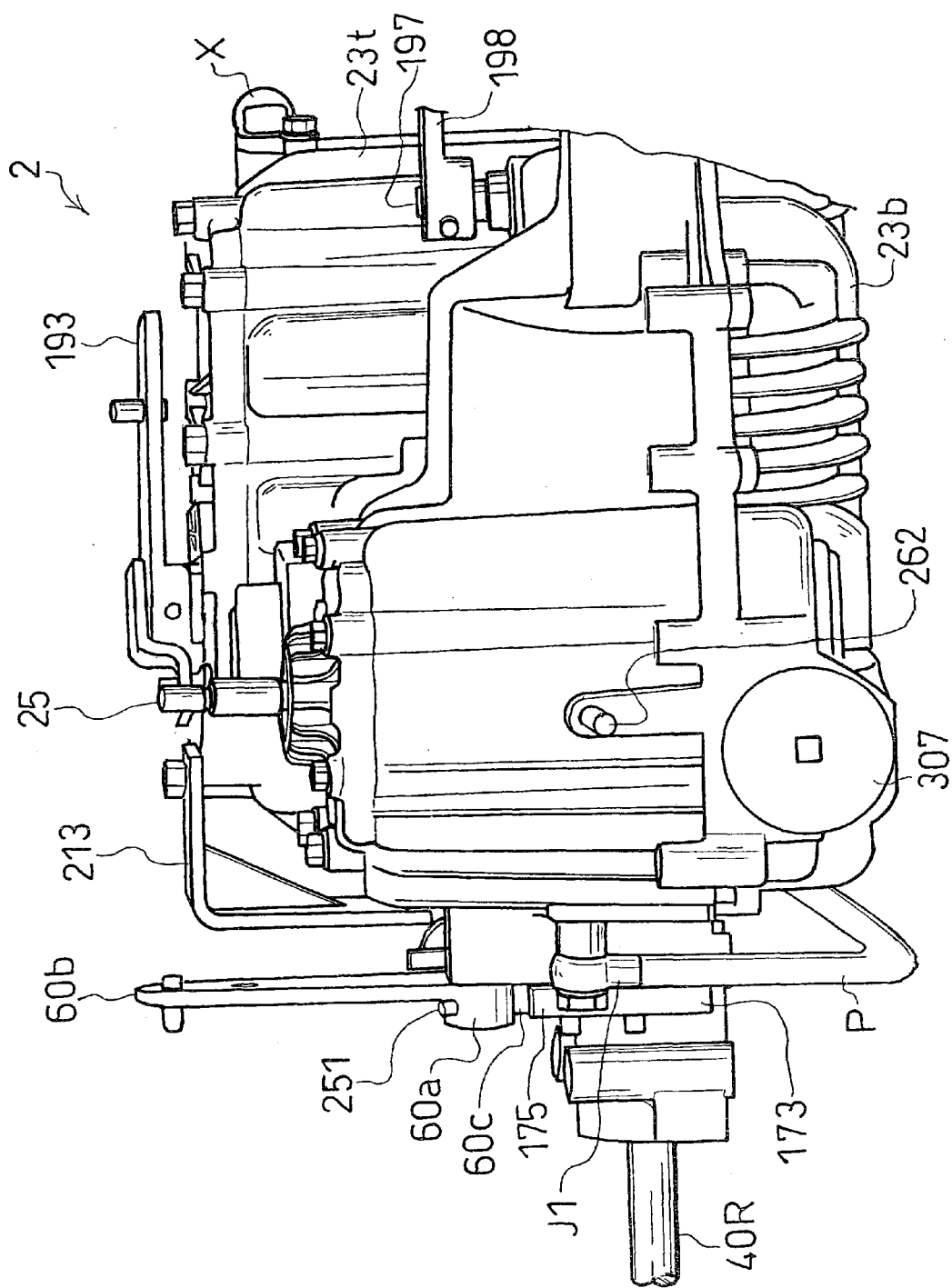
FIG. 31 is a perspective rear view of the same.

As shown in FIGS. 4, 18, 20, 27, 30 and 31, a control arm 60 is fixed onto control shaft 59 outside housing 23. As best shown in FIG. 30, control arm 60 is integrally provided with a boss 60a, and arm 60b, a projection 60c and a push edge 60d. Boss 60a is fixed onto control shaft 59 with a pin 251. Arm 60b projects upwardly from boss 60a, so as to interlock with a speed change operating tool (in this embodiment, speed change pedal 15) though a linkage or the like. Projection 60c projects downwardly from boss 60a. Push edge 60d projects backwardly from boss 60a.

As shown in FIG. 19, a limiter 173 is fixed onto the external side surface of housing 23 below control shaft 59, so as to limit the rotational range of control arm 60. Projection 60c of control arm 60 is disposed between two projections 174 and 175 as integral parts of limiter 173. Either of projections 174 and 475 abuts against projection 60c rotated to a certain degree.

Due to the above construction, when speed change pedal 15 is trod down, control arm 60 interlocking with pedal 15 is rotated together with control shaft 59, so that swash plate 57 connected to control shaft 59 through arm 272 is rotated slantwise, thereby controlling the amount and direction of oil discharged from hydraulic pump 52.

As shown in FIGS. 8, 17 and 25, pressure oil discharged from hydraulic pump 52 is circulated between pump 52 and motor 53 through two oil passages 51a.

Referring to fixed displacement hydraulic motor 53, center section 51 forms the motor mounting surface on the top thereof so as to be disposed behind axle 40R opposite to the pump mounting surface thereof, as shown in FIGS. 4 and 9. Cylinder block 63 is rotatably and slidably mounted onto the motor mounting surface, as shown in FIGS. 9 and 17. Similarly to hydraulic pump 52, a plurality of pistons 64 with respective biasing springs are reciprocally slidably inserted into cylinder block 63 and abut at the heads thereof against a fixed swash plate 65. Vertical motor shaft 54 is axially and not relatively rotatably disposed in cylinder block 53.

As shown in FIGS. 9 and 17, motor shaft 54 penetrates center section 51 and projects downwardly so as to be fixedly provided thereon with a bevel gear 61. Bevel gear 61 engages with a bevel gear 62 fixed on driving transmission shaft 93 rotatably disposed in parallel to axles 40 in housing 23, as shown in FIG. 17. Shaft 93 forms a driving gear 69 which engages with a center gear 94 of differential gear unit 5.

Motor shaft 54 is also fixedly provided thereon with a steering driving gear 160 for driving pump shaft 26 of hydraulic pump 71 of steering HST 22.

Figure 21:
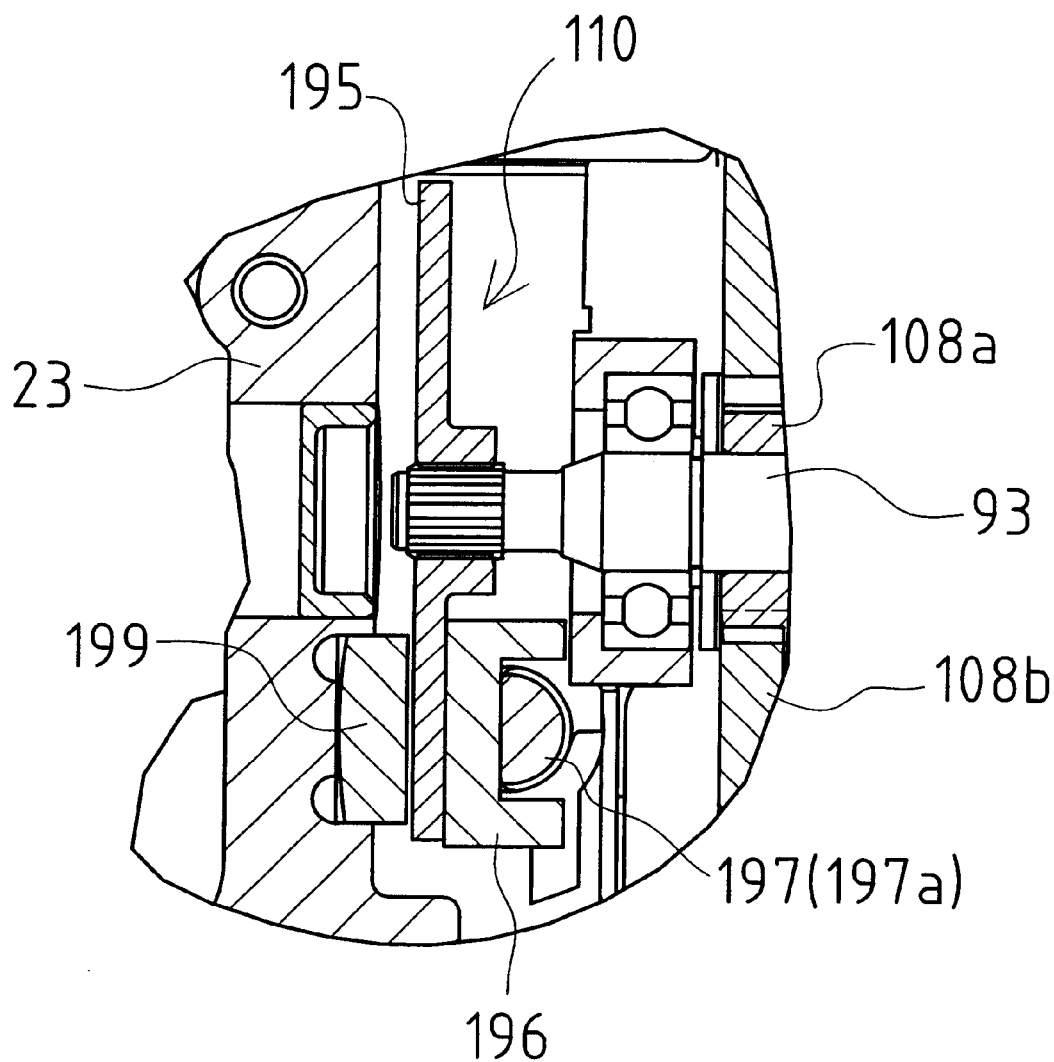
FIG. 21 is a sectional fragmentary plan view, on an enlarged scale, of a brake 110 and its surroundings.

Detailed description will now be given on a brake 110 disposed on shaft 93. As shown in FIGS. 17 and 21, a brake disk 195 is not relatively rotatably but slidably provided on an end of shaft 93. A brake pad 196 is disposed adjacently to brake disk 195, and a brake pad 199 is caught in the inner wall of housing 23 so as to be disposed adjacently to brake disk 195 opposite to brake pad 196. A brake control shaft 197 integrally forming a cam 197a is vertically disposed in contact with brake pad 196. Brake control shaft 197 projects upwardly from housing 23 so as to be fixedly provided thereon with a brake control lever 198, as shown in FIGS. 17, 27 and 28. Lever 198 interlocks with the abovementioned brake pedal through a linkage or the like. When the brake pedal is trod down, shaft 197 is rotated so that cam 197a of shaft 197 presses brake pad 196 against brake disk 195.

Brake disk 195 is pushed outwardly by cam 197a through pad 196 and is pressed against brake pad 199. Thus, brake disk 195, sandwiched between pads 196 and 199, and shaft 93 are braked.

Next, detailed description will be given on steering HST 22 comprising hydraulic pump 71 and hydraulic motor 72 mounted on center section 75. In this embodiment described hereinafter, center section 75 of steering HST 22 is separate from center section 51 of HST 21. Alternatively, a single center section may be disposed so as to be shared by both HSTs 21 and 22.

Referring to variable displacement hydraulic pump 71, vertical pump shaft 26 rotatably penetrates center section 75 and projects downwardly so as to be fixedly provided thereon with an input gear 161, as shown in FIGS. 4 and 25. Input gear 161 engages with steering driving gear 160 fixed on motor shaft 54 of driving HST 21, so that the rotational force of motor shaft 54 is transmitted to pump shaft 26.

Pump shaft 26 projects upwardly axially from the pump mounting surface formed at the top of center section 75, so as to be axially and not relatively rotatably disposed in a cylinder block 46 which is rotatably slidably mounted on the pump mounting surface, as shown in FIG. 9.

A plurality of pistons 47 with respective biasing springs are reciprocally slidably inserted into cylinder block 46 so as to abut at the heads thereof against a movable swash plate 76. Swash plate 76 is operated slantwise so as to control the amount and direction of oil discharged from hydraulic pump 71.

A control shaft 73 is vertically supported by the ceiling of housing 23 so as to operate swash plate 76, as shown in FIGS. 4 and 9. An arm 191 projects from control shaft 73 in housing 23, so as to engage at the utmost end thereof with swash plate 76, as shown in FIG. 9. A control lever 193 is fixed onto control shaft 73 through a pin 252 above housing 23, as shown in FIGS. 4, 9, and 27–31. Control lever 193 is connected with a steering operating means (steering wheel 14 in this embodiment through a linkage (not shown).

Swash plate 76 is biased toward the neutral position. The biasing force and the neutral position may be adjustable. In housing 23, a limiter 192, shaped like a sector in plan view as shown in FIG. 4 and 9, is fixed onto shaft 73. When lever 193 is rotated to some degree, one of the two radial edges of limiter 192 comes to abut against the internal wall of housing 23, so as to limit the rotational range of lever 193.

Due to the above construction, when steering wheel 14 is rotated so as to rotate control lever 193 and control shaft 73, swash plate 76 is moved slantwise through arm 191 for changing the direction and volume of operating oil discharged from hydraulic pump 71.

As shown in FIGS. 8 and 18, the oil is circulated between hydraulic pump 71 and motor 72 through both of second oil passages 75a.

Hydraulic motor 72, according to this embodiment, is of a variable displacement type. However, in the embodiment shown in FIG. 26 discussed below, hydraulic motor 72' is of a fixed displacement type. In this regard, a cylinder block 80 is rotatably and slidably mounted onto the motor mounting surface which is formed on the top of center section 75 leftward to the pump mounting surface on the same. Cylinder block 80 is provided there in with a plurality of reciprocally movable pistons 82 and springs for biasing them. A moveable swash plate 85 abuts against the heads of pistons 82. A vertical motor shaft 77 is axially disposed in cylinder block 80 so as to fixedly engage therewith. Swash plate 85 is so operated as to change the rotary speed of shaft 77.

As shown in FIG. 18, a control shaft 86 is horizontally journalled by the side wall of housing 23 for operating swash plate 85 slantwise. A swing arm 281 is fixed at the basic end thereof onto the inward end of shaft 86 in housing 23. The utmost end of arm 281 engages with swash plate 85.

As shown in FIGS. 4, 18, 27–29 and 32, a control lever 87 fixed onto shaft 86 outside housing 23 interlocks through a linkage 210 with control arm 60 which operates swash plate 57 of hydraulic pump 52 in driving HST 21.

Description will now be given on linkage 210 in accordance with FIGS. 4, 18, and 27–32. A first link rod 211 is disposed along the outside of housing 23 and is slidably supported by a supporter 213 fixed onto housing 23. A head 212 of rod 211 is disposed adjacent to push edge 60d of control arm 60.

An L-like shaped arm 220 is pivoted at the intermediate portion thereof onto a rearward outside corner of housing 23. First link rod 211 is pivotally connected to one end of arm 220. A second link rod 220 is pivotally interposed along the rear outside end of housing 23 between the other end of arm 220 and control lever 87. Rods 211 and 220 are disposed substantially perpendicular to each other.

Figure 22:
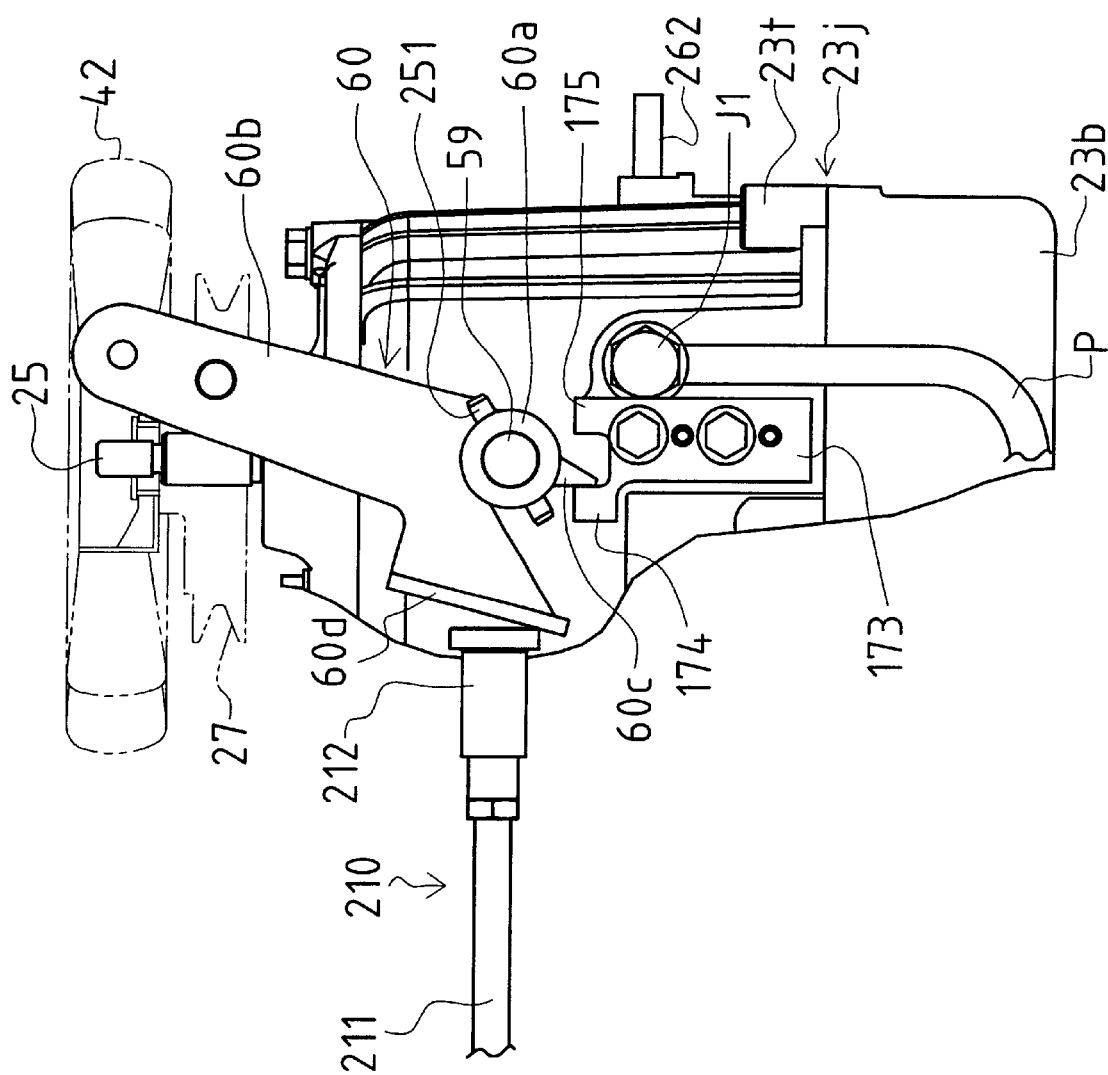
FIG. 22 is a fragmentary side view of apparatus 2 illustrating a control arm 60 is rotated so as to push a first link rod 211 of a linkage 210 which interlocks a movable swash plate 85 of a hydraulic motor 72 of a steering HST 22 with movable swash plate 76.
Figure 23:
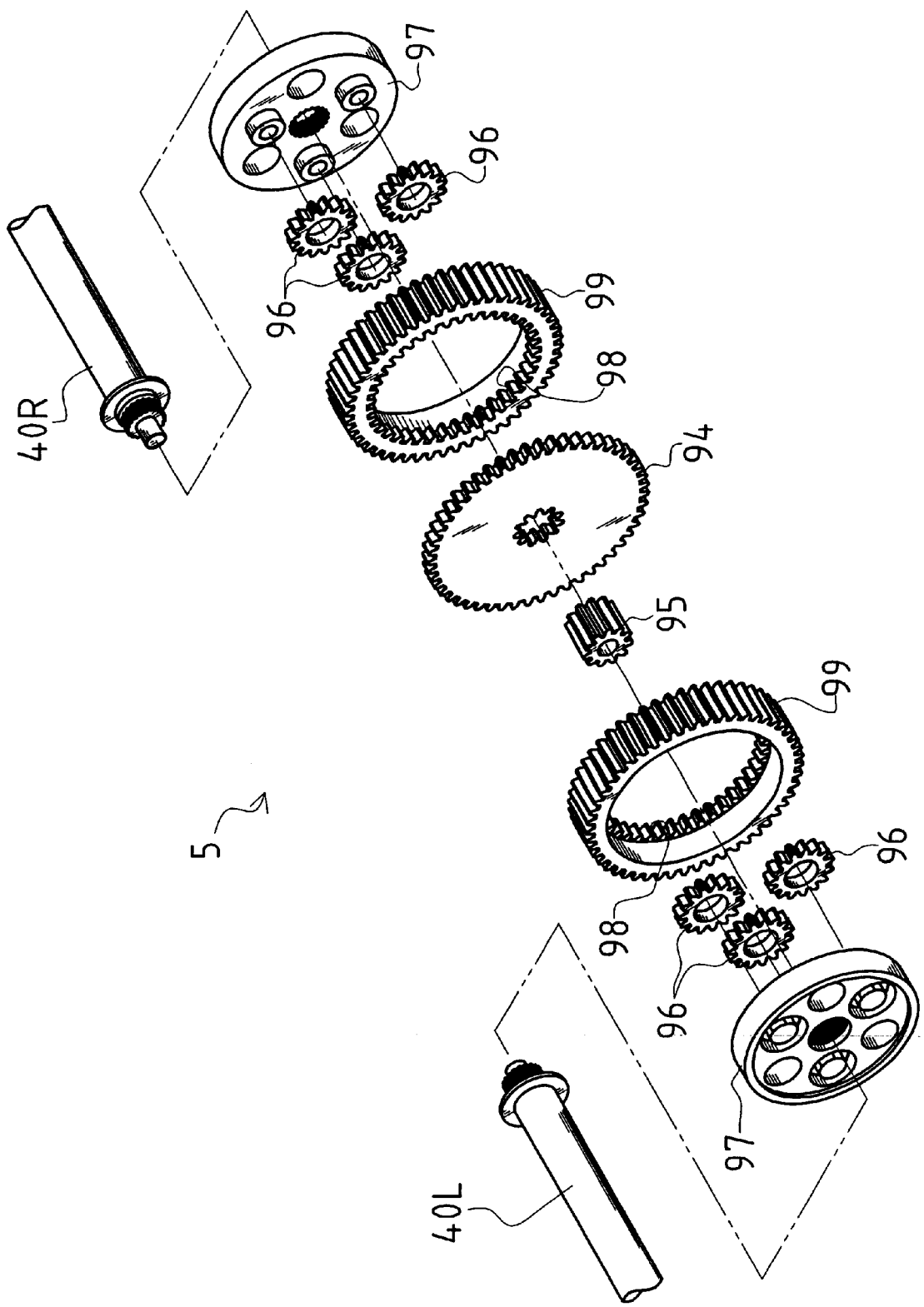
FIG. 23 is a perspective view of axles 40L and 40R and parts of differential gear unit 5 as they appear during assembly thereof.

When an operator treads down speed change pedal 15, control arm 60 is rotated so as to change the position of swash plate 57 of hydraulic pump 52 in driving HST 21. Simultaneously, whether arm 60 is rotated regularly or reversely, edge 60d of rotated arm 60 is pressed against head 212 of first link rod 211, as shown in FIG. 22, so as to thrust rod 211 toward arm 220 so that arm 220 is rotated to pull control lever 87 through second link rod 221, thereby tilting swash plate 85 of hydraulic motor 72 in steering HST 22. As a result, the rotary speed of motor shaft 77 is reduced as the rotary speed of motor shaft 54 is increased whether the rotational direction of shaft 54 is regular or reverse. Thus, the faster the vehicle employing apparatus 2 travels, the more the steering response to operation of steering wheel 14 becomes dull, thereby preventing the vehicle from hard cornering during fast travelling.

A turnbuckle 222 is interposed at the intermediate portion of second link rod 221 for adjusting the length thereof, thereby enabling the relationship between the driving speed and the steering response to be changed within a certain region.

Figure 26:
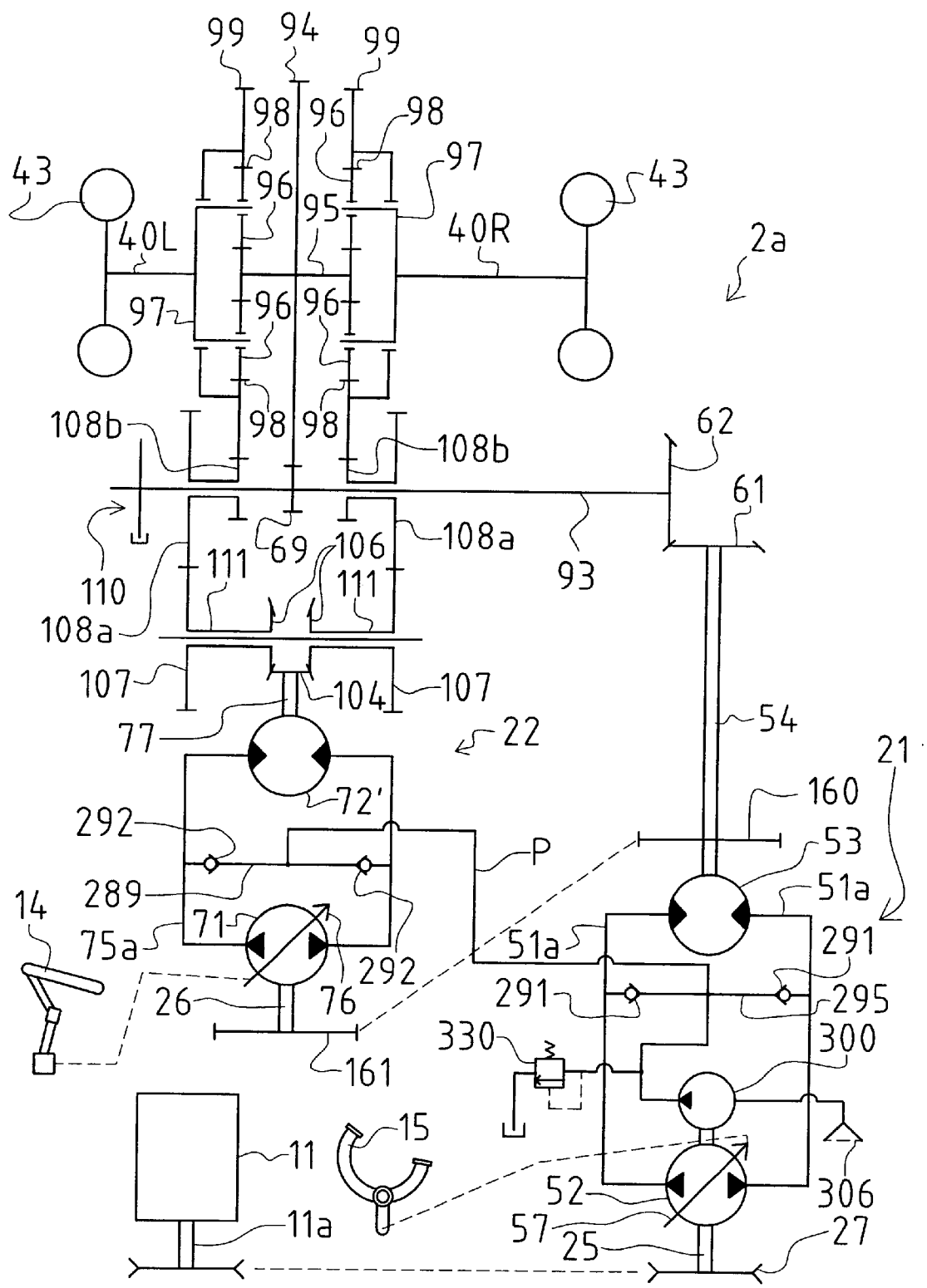
FIG. 26 is a diagram illustrating the same of a dependent steering type integral transaxle apparatus 2a, wherein a hydraulic motor 72' replacing that 72 is of a fixed displacement type.

In apparatus 2 hitherto discussed, hydraulic motor 72 of steering HST 22 is of a variable displacement type device, as best shown in FIG. 25, wherein movable swash plate 85 of motor 72 of steering HST 22 interlocks with movable swash plate 57 of hydraulic pump 52 of driving HST 21 through linkage 210. Meanwhile, an integral transaxle apparatus 2a shown in FIG. 26 defined as a modification of apparatus 2 is provided with a fixed displacement hydraulic motor 72' for its steering HST 22, thereby removing linkage 210. Therefore, the volume of steering HST 22 is not changed according to the travelling speed. However, apparatus 2a of FIG. 26 is of a dependent steering type, similarly with apparatus 2 shown in FIG. 25, so that hydraulic pump 71 is driven by the output of driving HST 21 (the rotation of motor shaft 54).

As shown in FIG. 18, motor shaft 77 passes through center section 75 and projects downwardly so as to be fixedly provided on the bottom end thereof with a bevel gear 104. Shaft 105 is disposed below bevel gear 104 in parallel to axles 40. As shown in FIG. 4, the both ends of shaft 105 are fixedly inserted into sleeves 190 fixed in two opposed bosses formed by lower half 23b. A pair of adjacent sleeves 111 are rotatably provided on shaft 105. Bevel gears 106 are fixed onto respective sleeves 111, so that both bevel gears 106 are laterally symmetrically disposed with respect to motor shaft 77, so as to engage with bevel gear 104.

The output power of hydraulic motor 72 is shared between left and right bevel gears 106 which are rotated in opposite directions.

As shown in FIG. 4, two sleeves 111 are also fixedly provided thereon with respective gears 107. Shaft 93 is provided thereon with two laterally juxtaposed speed-reduction gears 109, each of which consists of a diametrically large gear 108a and a diametrically small gear 108b. Both gears 108b are rotatably provided on shaft 93 so as to be disposed laterally oppositely to each other with respect to driving gear 69. Each gear 108a engages at the inner periphery thereof with the outer periphery of each gear 108b, so that gears 108a and 108b engaging with each other are not relatively rotatable. Both gears 108a engage with respective gears 107. Differential gear unit 5, as discussed below, includes a pair of ring-like shaped internal gears 98 which form respective gears 99 at their outer peripheral surfaces. Gears 108b engage with respective gears 99.

Description will now be given on differential gear unit 5 which differentially connect left and right axles 40L and 40R in accordance with FIGS. 4–7, 17, 18, and 23–26. As shown in FIG. 4, a sun gear 95 is rotatably provided on the abutting proximal ends of axles 40L and 40R so as to integrally engage with the inner peripheral teeth of a center gear 94. Driving gear 69 fixed on shaft 93 engages with center gear 94.

Left and right carriers 97 are fixed onto respective axles 40L and 40R, and fixedly provided at the outer peripheries thereof with respective internal gears 98. A plurality of planet gears 96 are rotatably supported by each carrier 97 so as to be interposed between sun gear 94 and each internal gear 98.

If internal gears 98 were directly supported onto axles 40L and 40R apart from carriers 99, differential gear unit 5 would be laterally wide along the axes of axles 40L and 40R. Internal gears 98 according to the preferred embodiment are provided on the outer peripheries of carriers 99, thereby compacting differential gear unit 5 which is made laterally narrow along axles 40L and 40R.

Figure 40:
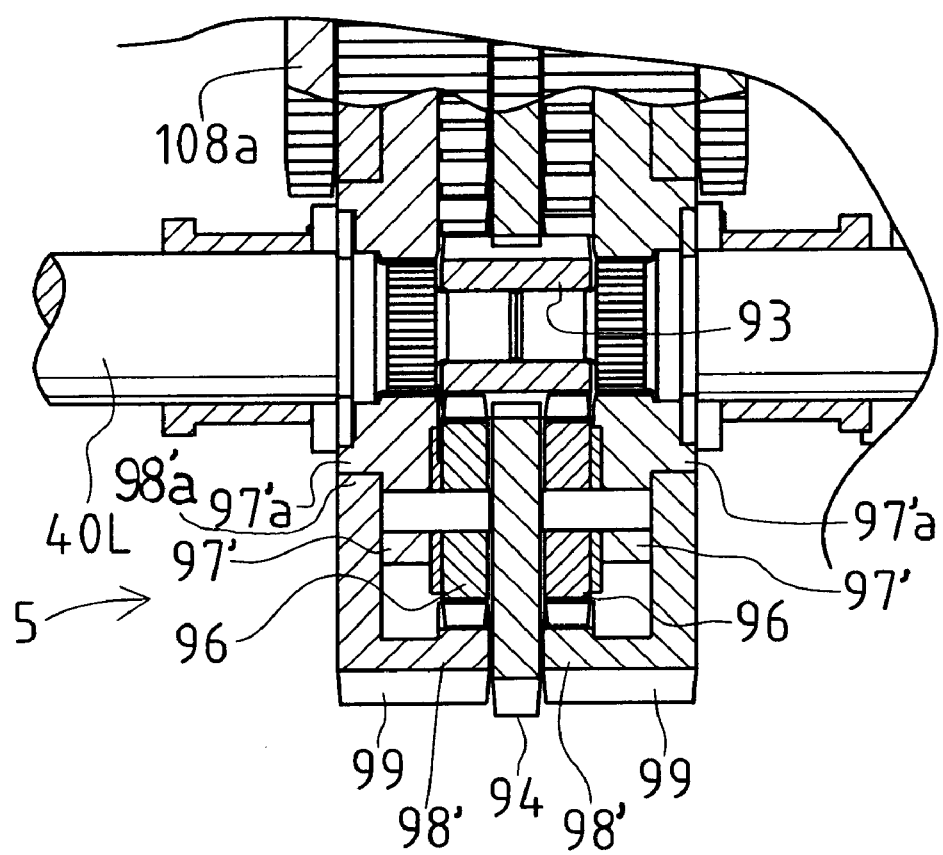
FIG. 40 is a sectional fragmentary an view, on an enlarged scale, of modified differential gear unit 5' illustrating a carrier 97' and an internal gear 98' which have diametrically differences.

The above embodiment of differential gear unit 5 is merely exemplary and alternate embodiments may be utilized. For example, carrier 97 and internal gear 98 of the above embodiment, wherein the whole of outer peripheral surface of carrier 97 abuts against internal gear 98 as shown in FIG. 7 may be replaced with an alternative carrier 97' and an alternative internal gear 98' as shown in FIG. 40. The outer periphery of carrier 97' has a diametric difference, and the inner periphery internal gear 98' except its internal teeth has an almost similar diametric difference, so that only one of the two diametrically different outer peripheral surfaces of carrier 97' abuts against the corresponding one of the two diametrically different inner peripheral surfaces of gear 98' (while the other outer peripheral surface of carrier 97' is apart from the corresponding inner peripheral surface of gear 98'). In FIG. 40, the diametrically smaller surfaces 97'a and 98'a of carrier 97' and gear 98' abut against each other, however, they may be replaced with the diametrically larger peripheral surfaces of both 97' and 98'. The resulting area of carrier 97' and gear 98' abutting against each other can be smaller than that of carrier 97 and gear 98 according to the embodiment as shown in FIG. 7, thereby reducing the loss of frictional torque.

Figure 24:
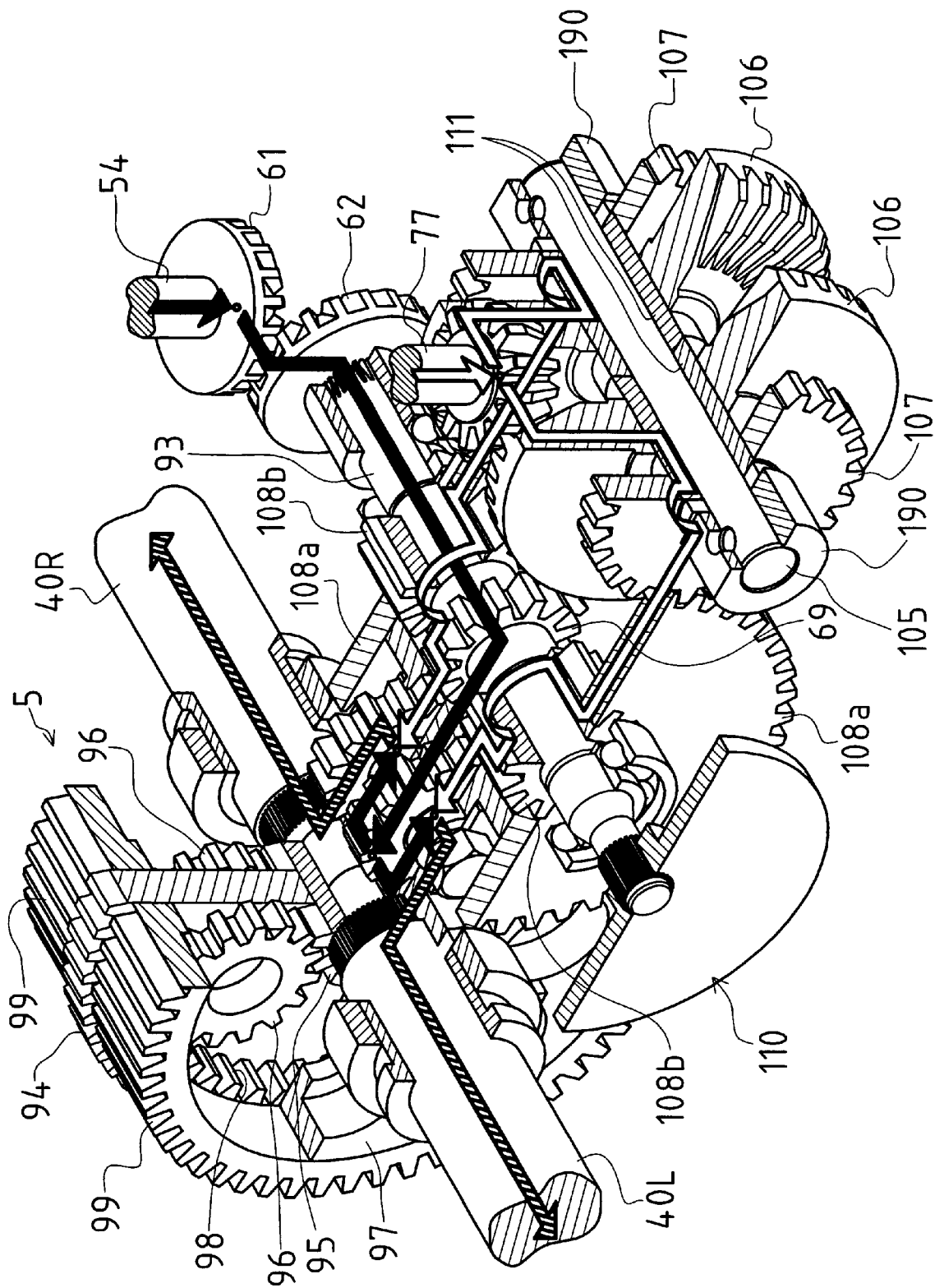
FIG. 24 is a perspective view partly in section of a transmission mechanism illustrating arrows as the directions of power transmitted from motor shafts 54 and 77 of HSTs 21 and 22 to axles 40L and 40R through differential gear unit 5.

In FIG. 24, a bold arrow describes the power transmission from motor shaft 54 of hydraulic motor 53 in driving HST 21 to sun gear 94 of differential gear unit 5 through bevel gears 61 and 62, shaft 93, gear 69 and center gear 94. Also in FIG. 24, a hollow arrow describes the power transmission from motor shaft 77 of hydraulic motor 72 in steering HST 22 to left and right internal gears 98 of differential gear unit 5, wherein two bevel gears 106 sharing the rotary power of bevel gear 104 are rotated in opposite directions so as to rotate internal gears 98 in opposite directions through speed-reduction gears 108.

Accordingly, one of the two sets of planet gears 96 disposed on opposite sides of center gear 94 receives the rotational force of corresponding internal gear 98 in addition to that of sun gear 95, and the other set of gears 96 receives the rotational force of sun gear 95 reduced by that of corresponding gear 98.

As a result, the rotary speed of left and right carriers 97 differ from each other, so that axles 40L and 40R are differentially rotated so as to steer the vehicle.

Referring to FIGS. 33–36, there will now be described some exemplary embodiments of operating oil supplying circuit from charge pump 300 to HSTs 21 and 22. FIGS. 33–36 show the circuits to be employed by the above-mentioned apparatus 2 as shown in FIGS. 8, 25, and 27–32. However, these hydraulic circuits may be alternatively employed by apparatus 2a as shown in FIG. 26 wherein steering HST 22 is provided with a fixed displacement hydraulic motor 72'.

Figure 33:
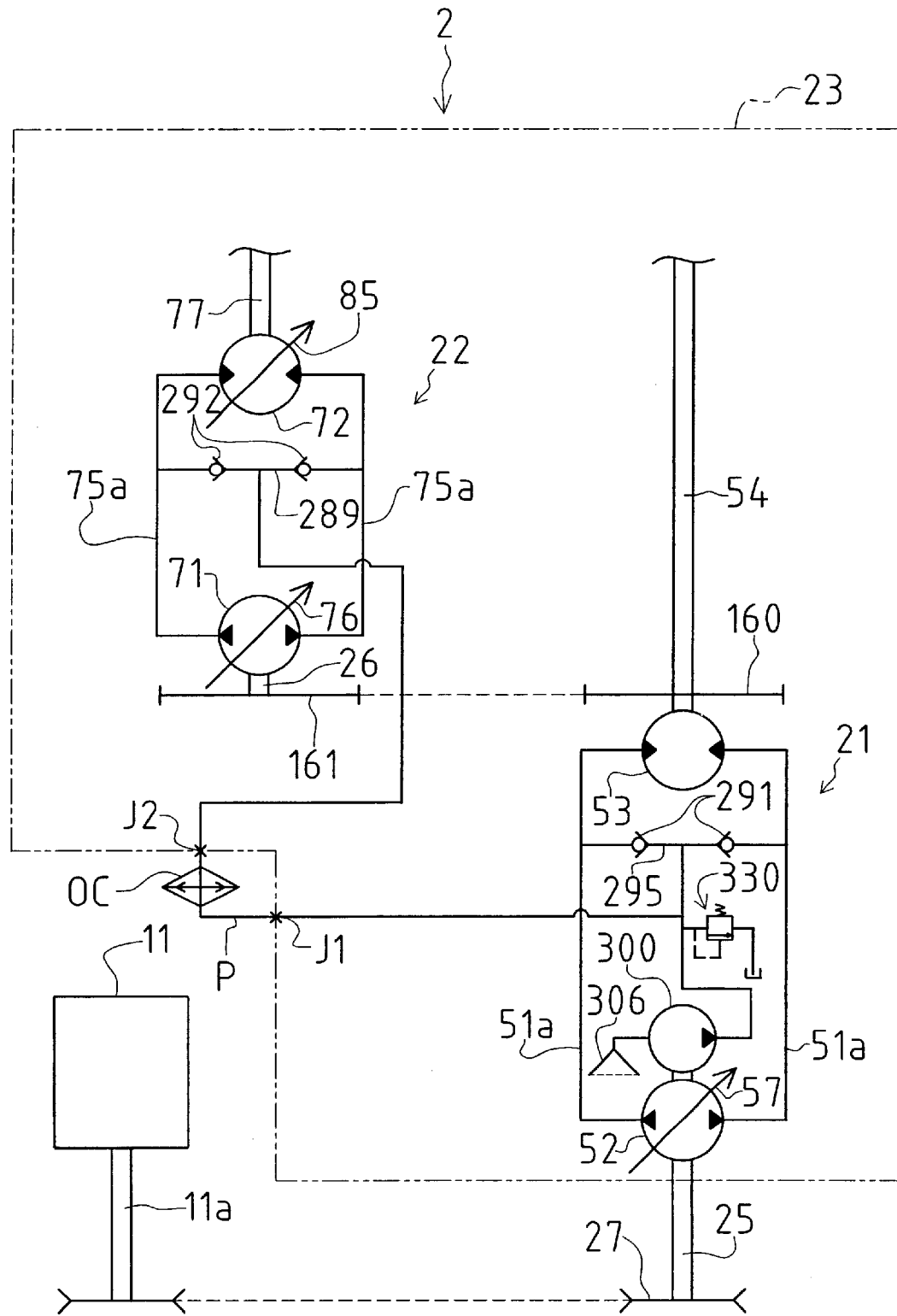
FIG. 33 is a hydraulic circuit diagram of apparatus 2, wherein a conduit P, through which the oil discharged from charge pump 300 attached onto driving HST 21 flows into steering HST 22, is partly extended outwardly from housing 23.

Referring to FIG. 33, as the above mentioned, oil supplying passage 295 is connected to oil passages 51a of driving HST 21 through check valves 291. Similarly, an oil supplying passage 289 is disposed so as to connect through check valves 292 to the pair of oil passages 75a between hydraulic pump 71 and hydraulic motor 72 of steering HST 22. Both passages 295 and 289 are connected with each other through a conduit P disposed outside housing 23. Steering HST 22 is supplied with operating oil cooled by the atmosphere through conduit P, thereby restricting the reduction of hydraulic efficiency caused by the rising of temperature of steering HST 22.

Oil cooling means OC (for example, an oil cooler or fins F as shown in FIG. 8) is preferably disposed on conduit P for enhancing the oil cooling effect.

Figure 34:
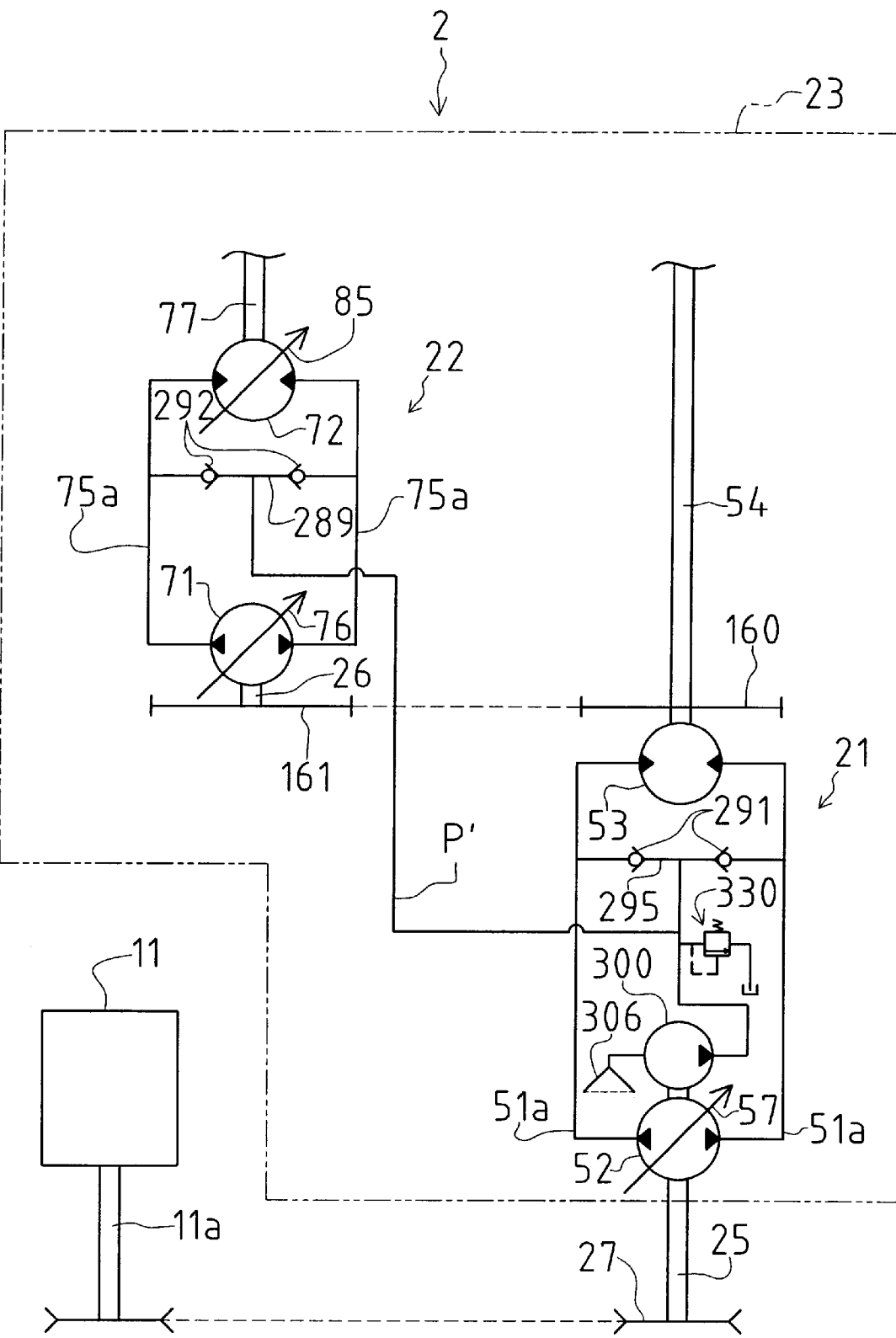
FIG. 34 is a hydraulic circuit diagram of a modified apparatus 2, wherein a conduit P', through which the oil discharged from charge pump 300 attached onto driving HST 21 flows into steering HST 22, is entirely contained in housing 23.

Referring to FIG. 34, conduit P' interposed between passages 295 and 289 is contained in housing 23, thereby visually simplifying housing 23.

If a single center section is shared between both HSTs 21 and 22, such a conduit P or P' can be replaced with an oil passage bored in the center section which connects oil supplying passages corresponding to passages 295 and 289 with each other. In this case, no space for disposal of such a conduit as P or P' is required either outside or within housing 23, so that resulting apparatus 2 is simplified and made more compact.

Figure 35:
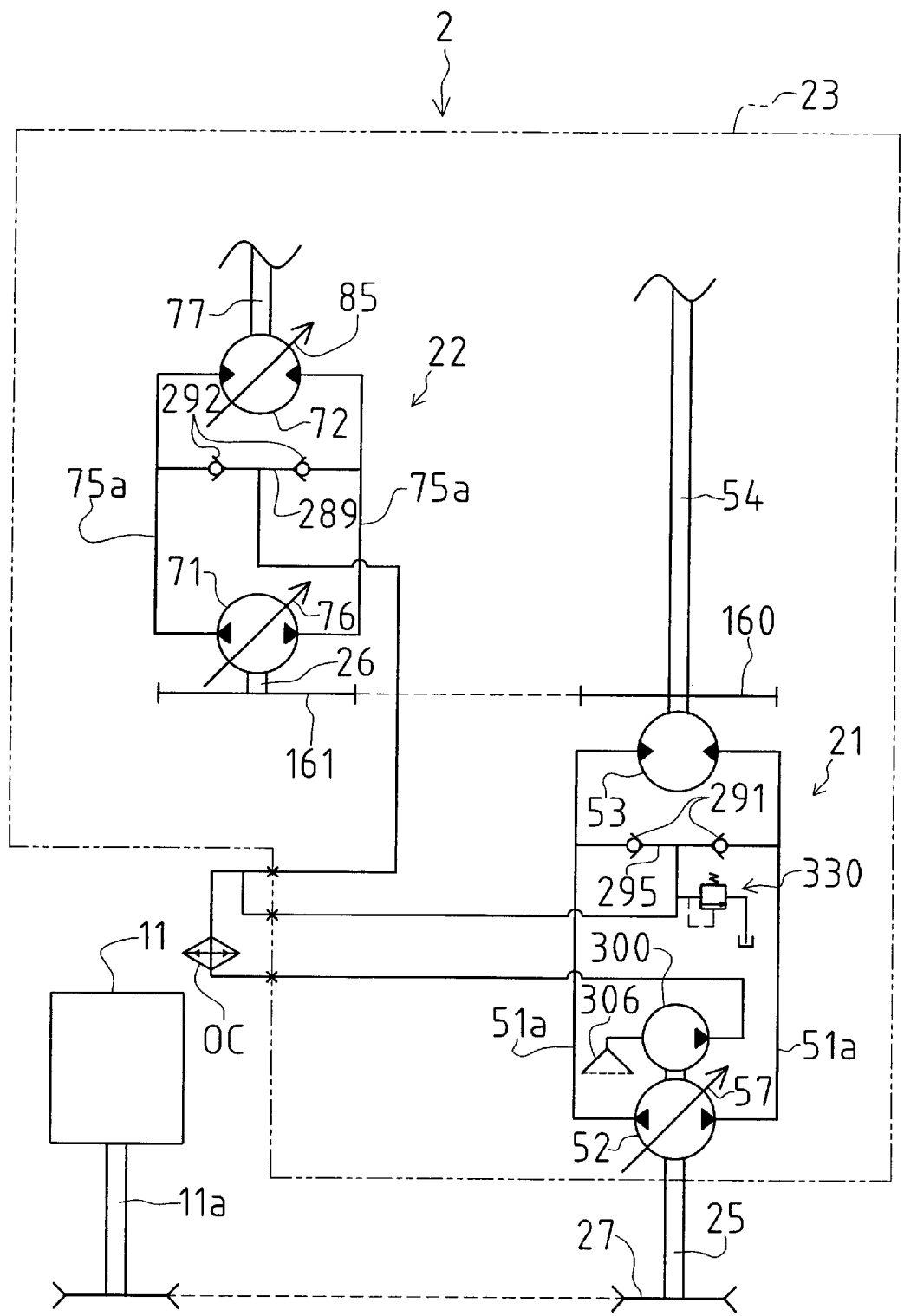
FIG. 35 is a hydraulic circuit diagram of a further modified apparatus 2, wherein a conduit P", through which the oil discharged from charge pump 300 within housing 23 distributively flows into both HSTs 21 and 22, is partly extended outwardly from housing 23.

Referring to FIG. 35, the flow of oil discharged from charge pump 300, which is directly introduced into passage 295 through center section 51 in FIG. 33, is alternatively removed from housing 23 so as to branch into both passages 295 and 289. In this regard, an alternative discharge port replacing discharge port 322 may be disposed at the lower surface of charge pump casing 301, to which a conduit extending outwardly from housing 23 is connected. The conduit may be preferably provided at the external portion thereof outside housing 23 with oil cooling means OC as described above. Due to this embodiment, the oil cooling effect extends to driving HST 21 in addition to steering HIT 22, thereby preventing both HSTs 21 and 22 from reduced efficiency caused by the excessive rising of oil temperature.

Figure 36:
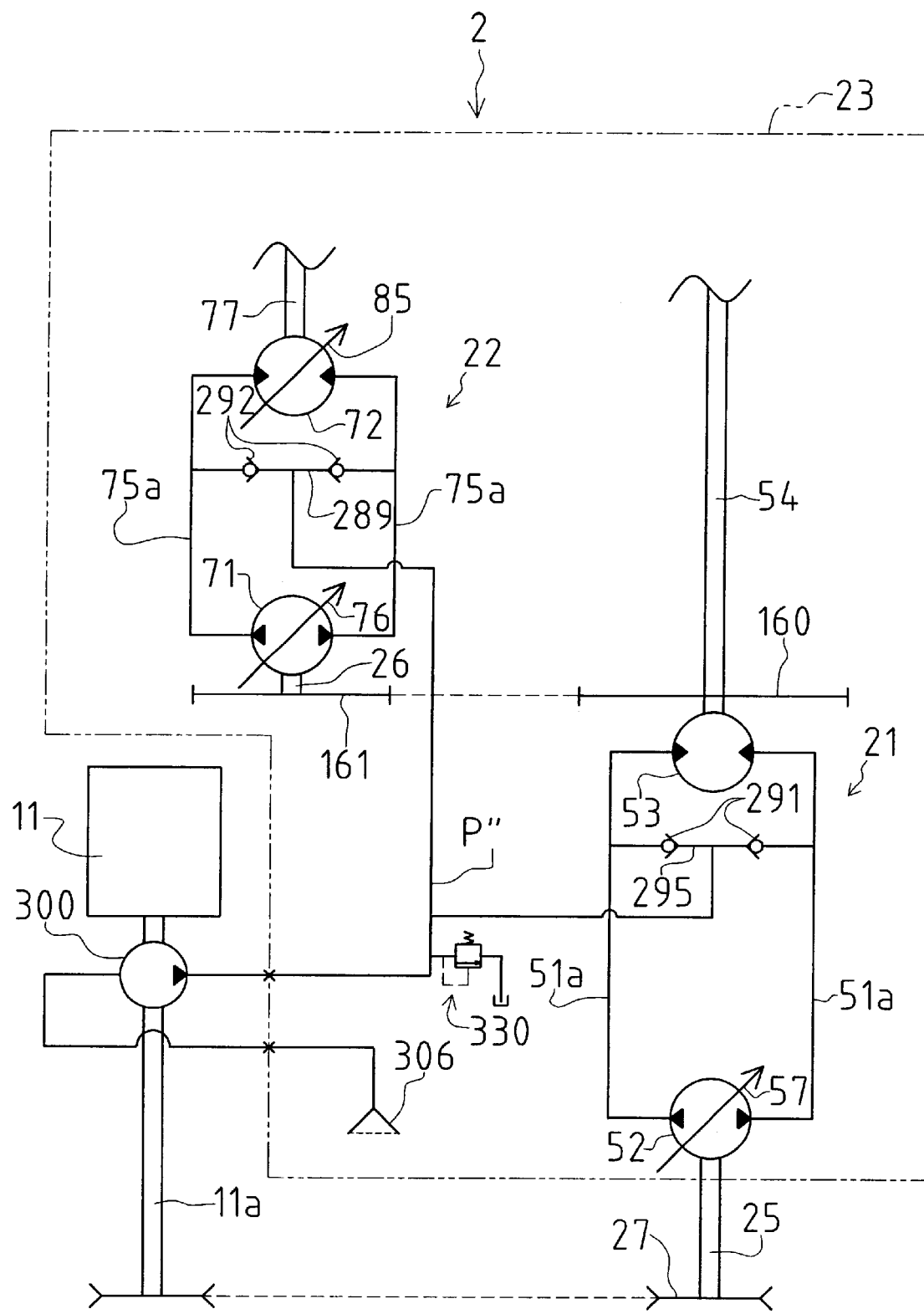
FIG. 36 is a hydraulic circuit diagram of a further modified apparatus 2, wherein charge pump 300 is disposed on an output shaft 11a of an engine 11.

Referring to FIG. 36, charge pump 300 is disposed on output shaft 11a of engine 11. Both of an oil passage from the interior of housing 23 to charge pump 300 and an oil passage P''' from charge pump 300 branching to both HSTs 21 and 22 in housing 23, which are disposed outside of housing 23, are subject to the atmosphere so as to be cooled, preferably being provided thereon with oil cooling means like the OC described above, thereby ensuring the oil cooling effect onto both HSTs 21 and 22. Also, apparatus 2 having both HSTs 21 and 22, from which charge pump 300 and means relevant thereto are removed, is lighter and more compact.

Apparatus 2 (2a) of each embodiment discussed hitherto is of a dependent steering type wherein pump shaft (second input shaft) 26 of hydraulic pump 71 in steering HST 22 interlocks with motor shaft 54 of hydraulic motor 53 in driving HST 21 by use of such means like gears 160 and 161 as shown in FIGS. 33–36, so that steering HST 22 is drive by hydraulic motor 53 of driving HST 21.

Meanwhile, apparatuses 2' and 2a' discussed below are of an independent steering type wherein motor shaft 26 of steering HST 22 is driven by engine 11 independently of hydraulic motor 53 of driving HST 21.

Description will be given on independent steering type apparatuses 2' and 2a' in accordance with FIGS. 37–39. Gears 160 and 161 as shown in FIGS. 33–36 are removed. Additionally, pump shaft 26 projects outwardly (upwardly) above housing 23, so as to be fixedly provided thereon with a second input pulley 28. A belt is interposed between pulley 28 and another pulley which is fixed on shaft 11a in addition to the pulley fixed on shaft 11a for transmitting the engine power to pulley 27 on shaft 25. Thus, the driving of HST 22 is independent of output of HST 21. In other words, the steering response to operation of steering wheel 14 is essentially independent of travelling speed but dependent on output rotary speed of engine 11.

Figure 37:
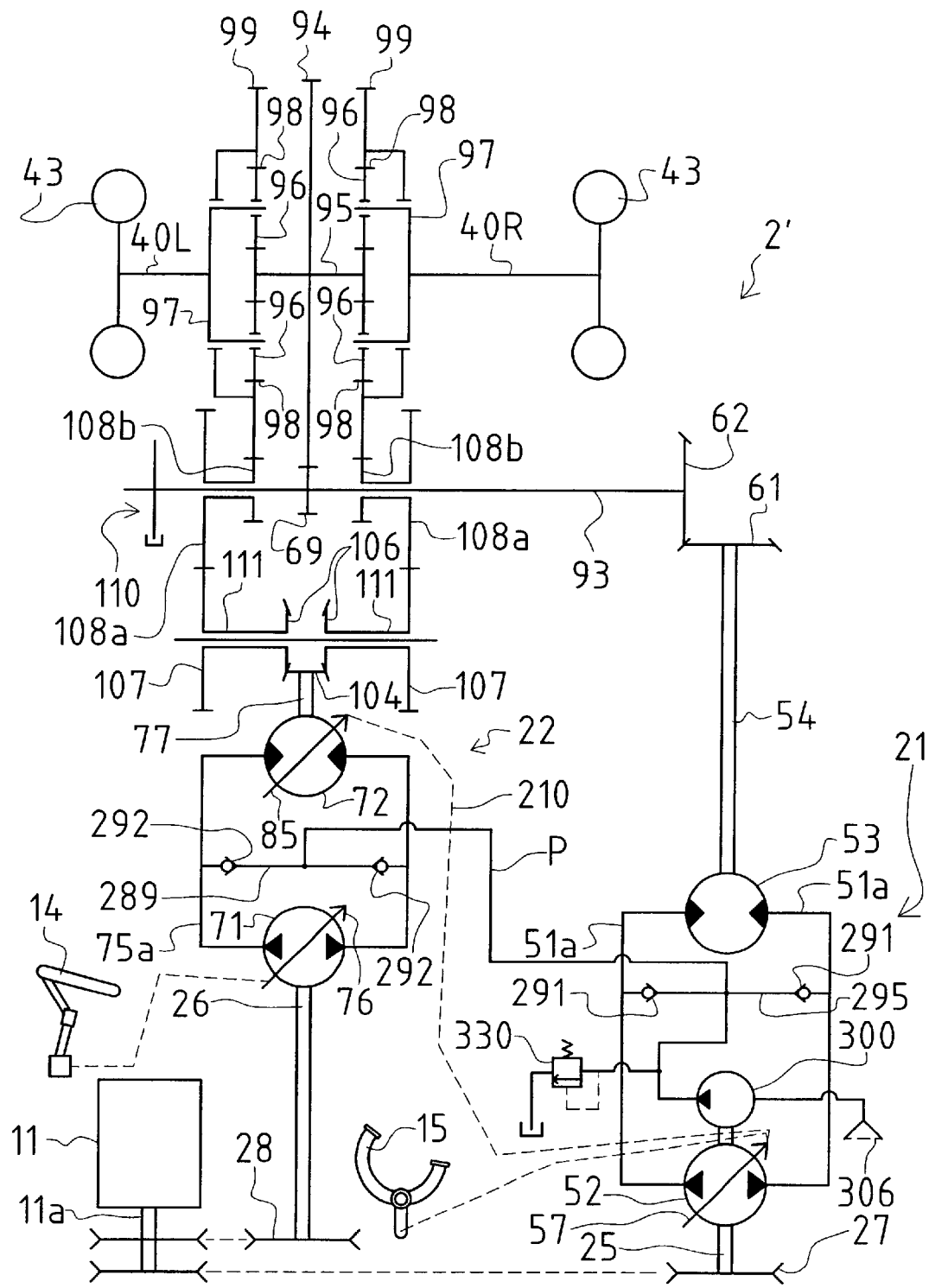
FIG. 37 is a diagram illustrating hydraulic circuits and gear mechanisms of an independent-steering type integral transaxle apparatus 2', wherein hydraulic motor 72 of steering HST 22 is of a variable displacement type whose swash plate 85 interlocks with swash plate 76 through linkage 210.

However, referring to apparatus 2' of FIG. 37, movable swash plate 85 of variable displacement hydraulic motor 72 in steering HST 22 interlocks with movable swash plate 57 of hydraulic pump 52 in driving HST 21 through linkage 210, so that the output rotary speed of HST 22 is reduced while that of HST 21 is increased, thereby avoiding hard cornering during high-speed travelling. Referring to apparatus 2a' of FIG. 38, hydraulic motor 72' is of a fixed displacement type, so that the output of HST 22 is purely due to output rotary speed of engine 11 and operation of steering wheel 14 independently of the travelling speed caused by output of HST 21.

Referring to apparatus 2' of FIG. 39, due to the above mentioned removal of gear 161, there is an increased free space below center section 75 in housing 23, where a second charge pump 300' is disposed in addition to charge pump 300 below center section 51. In this regard, center section 75 is provided therein with other oil passages from charge pump 300' connected to oil passages 75a so as to supply passages 75a with oil. Charge pump 300' may be an identical or similar torochoid pump as charge pump 300 or different therefrom. HSTs 21 and 22 are thereby independent of each other in oil feeding, so that they can be made different in determination of oil charging pressure. Also, all hydraulic circuits of both HSTs 21 and 22 including charge pumps 300 and 300' are contained in housing 23, thereby visually simplifying apparatus 2'.

Alternatively, independent steering apparatus 2' or 2a' may employ charge pump 300 disposed on output shaft 11a of engine 11 similar to dependent steering type apparatus 2 (2a) as shown in FIG. 36. In this case, conduits from charge pump 300 are extended into housing 23 of apparatus 2' or 2a' for extracting the oil in housing 23 and for feeding both HSTs 21 and 22 with the oil. Outside housing 23, the conduits are subject to the atmosphere so as to be cooled.

Figure 38:
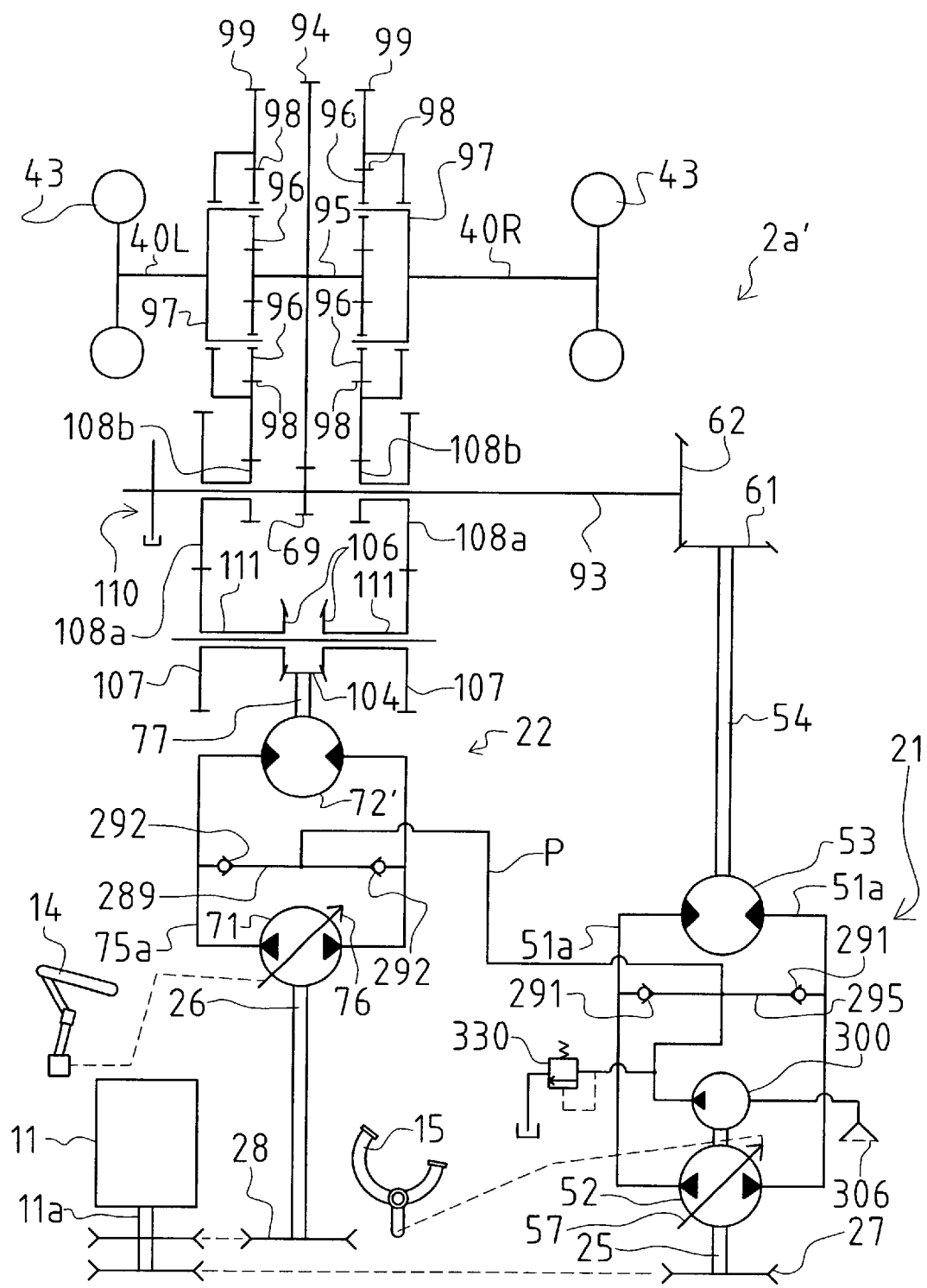
FIG. 38 is a diagram illustrating the same of an independent-steering type integral transaxle apparatus 2a', wherein a hydraulic motor 72' is of a fixed displacement type.

Also, referring to FIGS. 37 and 38, a conduit for distributing oil discharged from charge pump 300 to both HSTs 21 and 22 may be extended outwardly from housing 23 so as to be cooled by the atmospheric air. It may be provided with oil cooling means like OC as described above.

Figure 39:
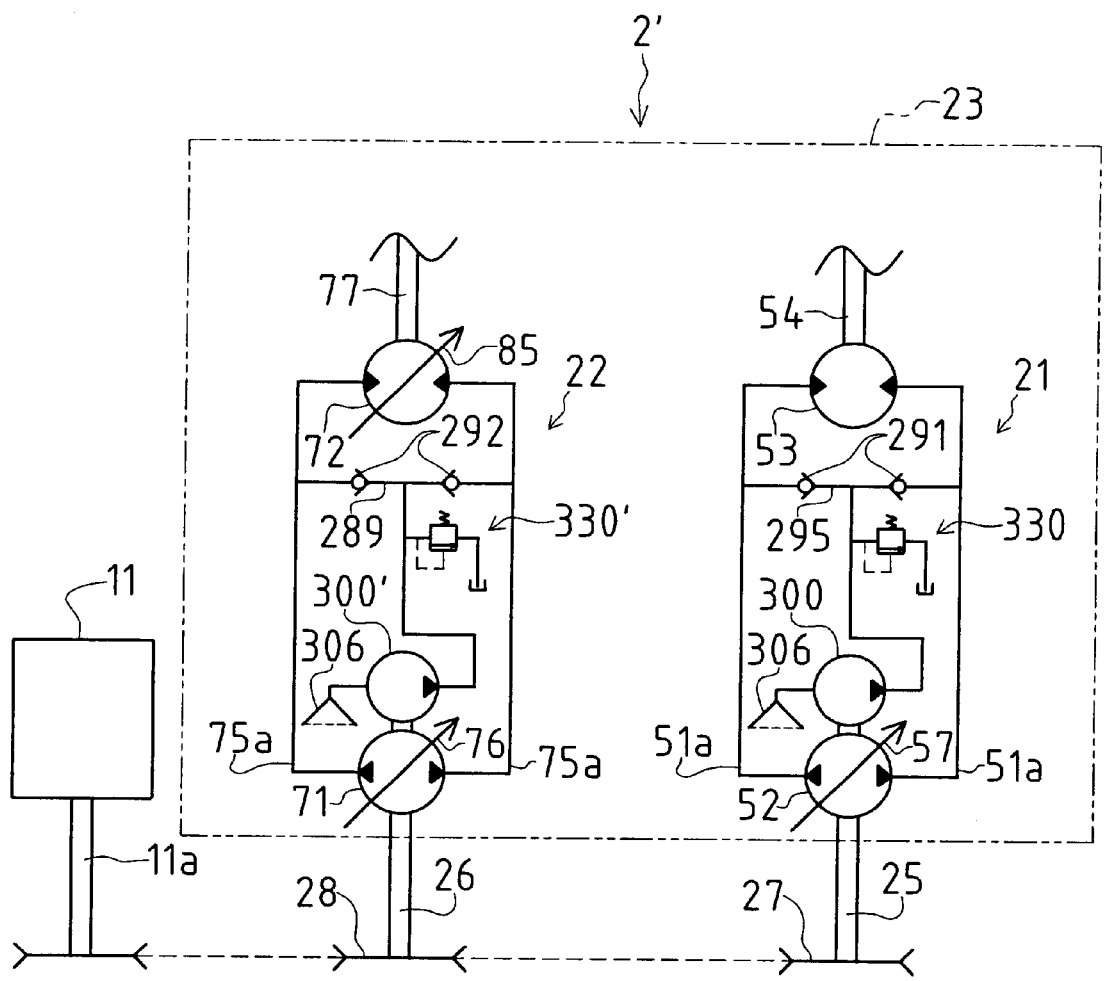
FIG. 39 is a diagram illustrating the same of modified apparatus 2', wherein housing 23 contains a charge pump 300' attached to HST 22 together with charge pump 300 attached to HST 21.

Regarding independent steering type apparatus 2' as shown in any of FIGS. 37–39 or of any other embodiment, fan 42 may be provided on shaft 26 above housing 23 in addition to fan 42 on shaft 25, thereby making apparatus 2' cooled by the air more effectively than apparatus 2 having a single fan 42.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An integral transaxle apparatus for driving and steering a vehicle, comprising:

a housing forming a fluid sump therein;

a pair of final output means disposed in said housing;

a differential unit disposed in said housing for differentially connecting said final output means with each other;

a first transmission system disposed in said housing for steplessly driving said pair of final output means, including a first hydrostatic transmission and a first mechanical transmission, wherein power of a prime mover is transmitted into said differential unit through said first hydrostatic transmission and then said mechanical transmission, and a second transmission system disposed in said housing for accelerating one of said pair of final output means and decelerating the other of said pair of final output means, including a second hydrostatic transmission and a second mechanical transmission, wherein said second mechanical transmission driven by said second hydrostatic transmission branches into two parallel drive trains drivingly connected to said pair of final output means, respectively, so that two oppositely directed equal rotational forces are applied onto said pair of final output means by said two drive trains.

2. The integral transaxle apparatus as set forth in claim 1, wherein said first transmission system is provided for driving a vehicle forward and backward, and said second transmission system is provided for steering said vehicle.

3. The integral transaxle apparatus as set forth in claim 1, wherein said first hydrostatic transmission comprises a variable displacement first hydraulic pump unit and a first hydraulic motor fluidly connected with each other, and said second hydraulic transmission comprises a variable displacement second hydraulic pump and a second hydraulic motor fluidly connected with each other.

4. The integral transaxle apparatus as set forth in claim 3, wherein said pair of final output means are a pair of axles disposed co-axially with each other, said first hydraulic pump and said first hydraulic motor are aligned substantially perpendicular to said axles, and said second hydraulic pump and said second hydraulic motor are aligned substantially in parallel to said axles.

5. The integral transaxle apparatus as set forth in claim 4, wherein said first hydraulic pump and said first hydraulic motor are aligned along one side of said housing substantially in perpendicular to said axles, and said second hydraulic pump and said second hydraulic motor are aligned along an other side of said housing substantially in parallel to said axles.

6. The integral transaxle apparatus as set forth in claim 5, wherein said differential unit is opposed to said first hydrostatic transmission in the direction of axes of said axles.

7. The integral transaxle apparatus as set forth in claim 6, wherein said differential unit is disposed on abutting ends of said axles, and one of said axles crosses said first hydrostatic transmission between said first hydraulic pump and said first hydraulic motor.

8. The integral transaxle apparatus as set forth in claim 3, wherein said first hydrostatic transmission further comprises a center section having fluid passages for fluidly connecting said first hydraulic pump and said first hydraulic motor with each other, and wherein cylinder blocks of said first hydraulic pump and said first hydraulic motor are disposed on an opposite side of said center section as said first mechanical transmission.

9. The integral transaxle apparatus as set forth in claim 8, wherein a motor shaft of said first hydraulic motor penetrates said center section.

10. The integral transaxle apparatus as set forth in claim 3, wherein said second hydrostatic transmission further comprises a center section having fluid passages for fluidly connecting said second hydraulic pump and said second hydraulic motor with each other, and wherein cylinder blocks of said second hydraulic pump and said second hydraulic motor are disposed on an opposite side of said center section as said second mechanical transmission.

11. The integral transaxle apparatus as set forth in claim 10, wherein a motor shaft of said second hydraulic motor penetrates said center section.

12. The integral transaxle apparatus as set forth in claim 8, wherein said second hydrostatic transmission further comprises a center section having fluid passages for fluidly connecting said second hydraulic pump and said second hydraulic motor with each other, and wherein cylinder blocks of said first and second hydraulic pumps and said first and second hydraulic motors are disposed on opposite sides of said center section as said first and second mechanical transmissions.

13. The integral transaxle apparatus as set forth in claim 10, wherein said center sections of said first and said second hydrostatic transmissions are integral with each other.

14. The integral transaxle apparatus as set forth in claim 1, wherein said differential unit comprises a pair of planetary gear units, each planetary gear unit comprising:
- a sun gear, said sun gears of both planetary gear units being integral with each other;
- a ring gear having an internal gear;
- a plurality of planet gears engaging with said sun gear and said internal gear of said ring gear, and
- a carrier rotatably supporting said plurality of planet gears and fixed onto each of said final output means.

15. The integral transaxle apparatus as set forth in claim 14, wherein said first mechanical transmission is a gear train engaging with said integral sun gears, and said second mechanical transmission branches into a pair of gear trains respectively engaging with said ring gears of said pair of planetary gear units.

16. The integral transaxle apparatus as set forth in claim 1, further comprising:
- a charge pump for supplying said first and second hydrostatic transmissions with fluid in said housing, said charge pump being disposed in said housing.

17. The integral transaxle apparatus as set forth in claim 16, further comprising:
- a conduit for fluid discharge from said charge pump to be supplied into said first and second hydrostatic transmissions in said housing, said conduit being partly extended outside of said housing.

18. The integral transaxle apparatus as set forth in claim 17, further comprising:
- fluid cooling means provided on said conduit outside said housing.

19. The integral transaxle apparatus as set forth in claim 3, further comprising:
- a center section disposed in said housing for fluidly connecting said first hydraulic pump and first hydraulic motor of said first hydrostatic transmission with each other, and
- a charge pump for supplying said first and second hydrostatic transmissions with fluid in said housing, said charge pump being disposed in said housing, wherein said charge pump is attached onto said center section so as to be driven by said first hydraulic pump of said first hydrostatic transmission and to discharge fluid to said first hydrostatic transmission through a fluid passage formed within said center section.

20. The integral transaxle apparatus as set forth in claim 19, wherein said charge pump integrally forms a seat to be attached onto said center section and a retainer for retaining a strainer.

21. The integral transaxle apparatus as set forth in claim 19, further comprising:
- cylinder blocks of said first hydraulic pump and first hydraulic motor of said first hydrostatic transmission, said cylinder blocks being mounted onto one side of said center section, wherein said charge pump is disposed on an opposite side of said center section as said cylinder blocks.

22. The integral transaxle apparatus as set forth in claim 19, further comprising:
- a conduit for fluid discharged from said charge pump to be supplied to said second hydrostatic transmission in said housing, said conduit being partly extended outside of said housing.

23. The integral transaxle apparatus as set forth in claim 22, further comprising:
- fluid cooling means provided on said conduit outside said housing.

24. The integral transaxle apparatus as set forth in claim 19, further comprising:
- a conduit for fluid discharged from said charge pump to be supplied to said second hydrostatic transmission in said housing, said conduit being entirely contained in said housing.

25. The integral transaxle apparatus as set forth in claim 19, wherein said center section also fluidly connects said second hydraulic pump and second hydraulic motor of said second hydrostatic transmission with each other, wherein said charge pump attached onto said center section so as to be driven by said first hydraulic pump discharges fluid to said first and second hydrostatic transmissions through fluid passages formed within said center section.

26. The integral transaxle apparatus as set forth in claim 25, further comprising:
- four cylinder blocks of said first and second hydraulic pumps and first and second hydraulic motors of said first and second hydrostatic transmissions, said cylinder blocks being mounted onto one side of said center section, wherein said charge pump is disposed on an opposite side of said center section as said four cylinder blocks.

27. The integral transaxle apparatus as set forth in claim 3, further comprising:
- a first charge pump disposed in said housing for supplying said first hydrostatic transmission with fluid in said housing, and a second charge pump disposed in said housing for supplying said second hydrostatic transmission with fluid in said housing.

28. The integral transaxle apparatus as set forth in claim 27, wherein said second hydraulic pump of said second hydrostatic transmission receives power of said prime mover thereby being driven independently of said first hydraulic motor of said first hydrostatic transmission.

29. The integral transaxle apparatus as set forth in claim 27, further comprising:
- at least one center section disposed in said housing for fluidly connecting said first hydraulic pump with said first hydraulic motor and connecting said second hydraulic pump with said second hydraulic motor, wherein said first charge pump is attached onto said center section so as to be driven by said first hydraulic pump and to discharge fluid to said first hydrostatic transmission through fluid passages formed within said center section, and wherein said second charge pump is attached onto said center section so as to be driven by said second hydraulic pump and to discharge fluid to said second hydrostatic transmission through fluid passages formed within said center section.

30. The integral transaxle apparatus as set forth in claim 29, further comprising:
- four cylinder blocks of said first and second hydraulic pumps and first and second hydraulic motors of said first and second hydrostatic transmissions, said four cylinder blocks being mounted onto one side of said center section, wherein said first and second charge pumps are disposed on an opposite side of said center section as said four cylinder blocks.

31. The integral transaxle apparatus as set froth in claim 1, further comprising:
- a charge pump for supplying said first and second hydrostatic transmissions with fluid, said charge pump being disposed outside said housing;

a conduit for fluid in said housing to be sucked into said charge pump, and a conduit for fluid discharged from said charge pump to be supplied into said first and second hydrostatic transmissions in said housing.

32. The integral transaxle apparatus as set forth in claim 31 further comprising:

fluid cooling means provided on said conduit outside said housing.

33. An integral transaxle apparatus for driving and steering a vehicle, comprising:

a housing forming a fluid sump therein;

a pair of driving axles disposed in said housing;

a first hydrostatic transmission system for driving a vehicle;

a second hydrostatic transmission system for steering a vehicle;

and a differential unit disposed in said housing for differentially connecting said pair of driving axles with each other, said differential unit including a pair of planetary gear units, each of said pair of planetary gear units including, a sun gear, wherein said sun gear for each of said pair of planetary gear units is integral with each other, a ring gear having an internal gear, a plurality of planet gears engaging with said sun gear and said internal gear of said ring gear, and a carrier rotatably supporting said plurality of planet gears and fixed onto one of said final output means, wherein said differential unit drivingly connects said first hydrostatic transmission system with said pair of driving axles through a mechanical drive system, and applies two oppositely directed parallel rotation forces caused by the output of said second hydrostatic transmission system onto said respective driving axles.

34. The integral transaxle apparatus as set forth in claim 3, wherein said first hydrostatic transmission further comprises a center section having fluid passages for fluidly connecting said first hydraulic pump and said first hydraulic motor with each other, wherein said center section is a flat plate.

35. The integral transaxle apparatus as set forth in claim 3, wherein said first hydrostatic transmission further comprises a center section having fluid passages for fluidly connecting said first hydraulic pump and said first hydraulic motor with each other, wherein said center section is L-like shaped.

36. The integral transaxle apparatus as set forth in claim 3, wherein said first hydrostatic transmission further comprises a center section having fluid passages for fluidly connecting said first hydraulic pump and said first hydraulic motor with each other, wherein said center section is d-like shaped.

37. The integral transaxle apparatus as set forth in claim 3, wherein said second hydrostatic transmission further comprises a center section having fluid passages for fluidly connecting said second hydraulic pump and said second hydraulic motor with each other, wherein said center section is a flat plate.

38. The integral transaxle apparatus as set forth in claim 3, wherein said second hydrostatic transmission further comprises a center section having fluid passages for fluidly connecting said second hydraulic pump and said second hydraulic motor with each other, wherein said center section is L-like shaped.

39. The integral transaxle apparatus as set forth in claim 3, wherein said second hydrostatic transmission further comprises a center section having fluid passages for fluidly connecting said second hydraulic pump and said second hydraulic motor with each other, wherein said center section is d-like shaped.

40. The integral transaxle apparatus as set forth in claim 3, wherein said first hydrostatic transmission further comprises a first center section having fluid passages for fluidly connecting said first hydraulic pump and said first hydraulic motor with each other, and wherein said second hydrostatic transmission further comprises a second center section having fluid passages for fluidly connecting said second hydraulic pump and said second hydraulic motor with each other, wherein said first center section and said second center section are flat plates.

41. The integral transaxle apparatus as set forth in claim 3, wherein said first hydrostatic transmission further comprises a first center section having fluid passages for fluidly connecting said first hydraulic pump and said first hydraulic motor with each other, and wherein said second hydrostatic transmission further comprises a second center section having fluid passages for fluidly connecting said second hydraulic pump and said second hydraulic motor with each other, wherein said first center section and said second center section are L-like shaped.

42. The integral transaxle apparatus as set forth in claim 3, wherein said first hydrostatic transmission further comprises a first center section having fluid passages for fluidly connecting said first hydraulic pump and said first hydraulic motor with each other, and wherein said second hydrostatic transmission further comprises a second center section having fluid passages for fluidly connecting said second hydraulic pump and said second hydraulic motor with each other, wherein said first center section and said second center section are d-like shaped.

43. The integral transaxle apparatus as set forth in claim 3, wherein said first hydrostatic transmission further comprises a first center section having fluid passages for fluidly connecting said first hydraulic pump and said first hydraulic motor with each other, and wherein said second hydrostatic transmission further comprises a second center section having fluid passages for fluidly connecting said second hydraulic pump and said second hydraulic motor with each other, wherein one of said first center section and said second center section is L-like shaped and the other of said first center section and said second center section is d-like shaped.

44. The integral transaxle apparatus as set forth in claim 3, wherein said first hydrostatic transmission further comprises a first center section having fluid passages for fluidly connecting said first hydraulic pump and said first hydraulic motor with each other, and wherein said second hydrostatic transmission further comprises a second center section having fluid passages for fluidly connecting said second hydraulic pump and said second hydraulic motor with each other, wherein one of said first center section and said second center section is a flat plate and the other of said first center section and said second center section is L-like shaped.

45. The integral transaxle apparatus as set forth in claim 3, wherein said first hydrostatic transmission further comprises a first center section having fluid passages for fluidly connecting said first hydraulic pump and said first hydraulic motor with each other, and wherein said second hydrostatic transmission further comprises a second center section having fluid passages for fluidly connecting said second hydraulic pump and said second hydraulic motor with each other, wherein one of said first center section and said second center section is a flat plate and the other of said first center section and said second center section is d-like shaped.

* * * * *

UNITED STATES PATENT AND TRADEMARK OFFICE
CERTIFICATE OF CORRECTION

PATENT NO.    : 6,312,354 B1
DATED         : November 6, 2001
INVENTOR(S)   : Irikura et al.

It is certified that error appears in the above-identified patent and that said Letters Patent is hereby corrected as shown below:

<u>Title page,</u>
Item [73], Assignee, add -- Tuff Torq Corporation, Morristown, Tennessee (US) --.
Item [56], References Cited, FOREIGN PATENT DOCUMENT, add -- 2-261952 10/1990 (JP) --.

Signed and Sealed this

Eighteenth Day of June, 2002

*Attest:*

*Attesting Officer*

JAMES E. ROGAN
*Director of the United States Patent and Trademark Office*